United States Patent
Yamanaka et al.

(12) 
(10) Patent No.: US 6,351,010 B1
(45) Date of Patent: Feb. 26, 2002

(54) ELECTROOPTICAL DEVICE, SUBSTRATE FOR DRIVING ELECTROOPTICAL DEVICE AND METHODS FOR MAKING THE SAME

(75) Inventors: Hideo Yamanaka; Hisayoshi Yamoto; Yuichi Sato, all of Kanagawa; Hajime Yagi, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/397,099

(22) Filed: Sep. 16, 1999

(30) Foreign Application Priority Data

Sep. 22, 1998 (JP) .......................................... 10-267920
Sep. 30, 1998 (JP) .......................................... 10-277798

(51) Int. Cl.⁷ .......................... H01L 27/01; H01L 27/12; H01L 31/0392
(52) U.S. Cl. .......................... 257/350; 257/59; 257/72; 257/351
(58) Field of Search ............................ 257/59, 72, 350, 257/351

(56) References Cited

U.S. PATENT DOCUMENTS 6,153,893 A * 11/2000 Inoue et al. ................... 257/72
6,246,070 B1 * 6/2001 Yamazaki et al. ............ 257/40

* cited by examiner

Primary Examiner—Ngân V. Ngô
(74) Attorney, Agent, or Firm—Sonnenschein, Nath & Rosenthal

(57) ABSTRACT

Each of an electrooptical device and a driving substrate for the electrooptical device includes a first substrate having a display section provided with pixel electrodes and a peripheral-driving-circuit section provided on the periphery of the display section, a second substrate, and an optical material disposed between the first substrate and the second substrate. A gate section including a gate electrode and a gate-insulating film is formed on one surface of the first substrate, a compound layer having high lattice matching with single-crystal silicon is formed on the surface of the first substrate, and a single-crystal silicon layer is formed on the first substrate including the compound layer and the gate section. The single-crystal silicon layer constitutes a channel region, a source region, and a drain region. In addition, a first bottom-gate thin-film transistor having the gate section is formed below the channel region, the first bottom-gate thin-film transistor constituting at least a part of the peripheral-driving-circuit section.

34 Claims, 77 Drawing Sheets

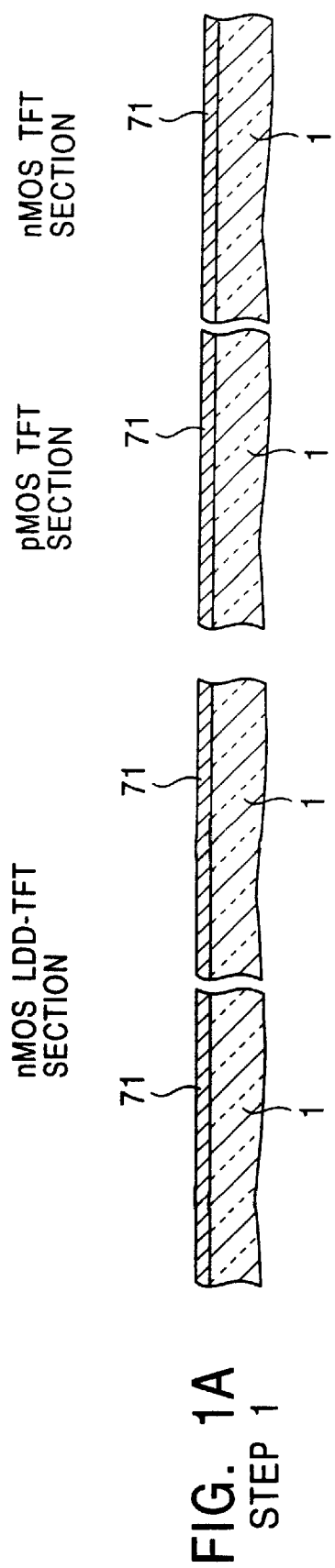
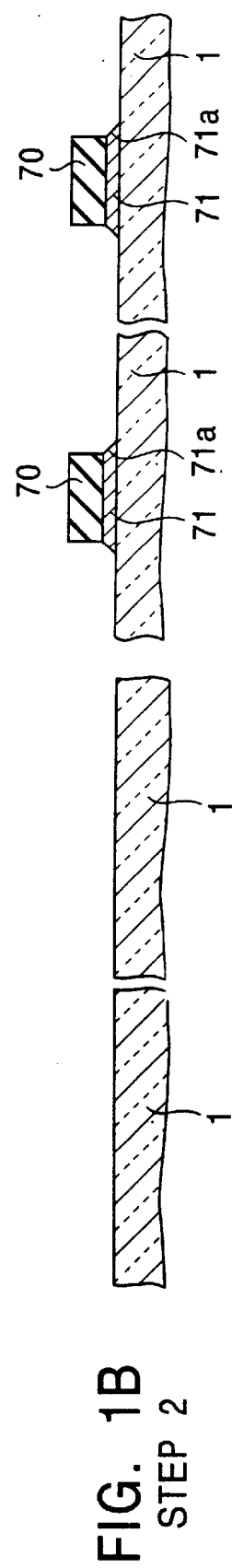
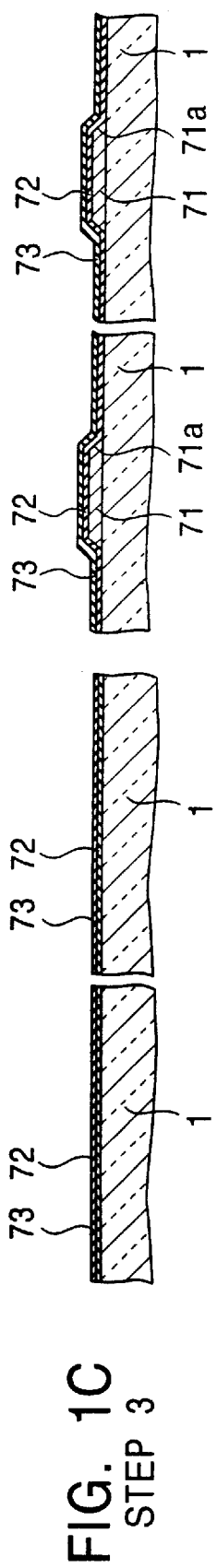
FIG. 1A STEP 1
FIG. 1B STEP 2
FIG. 1C STEP 3

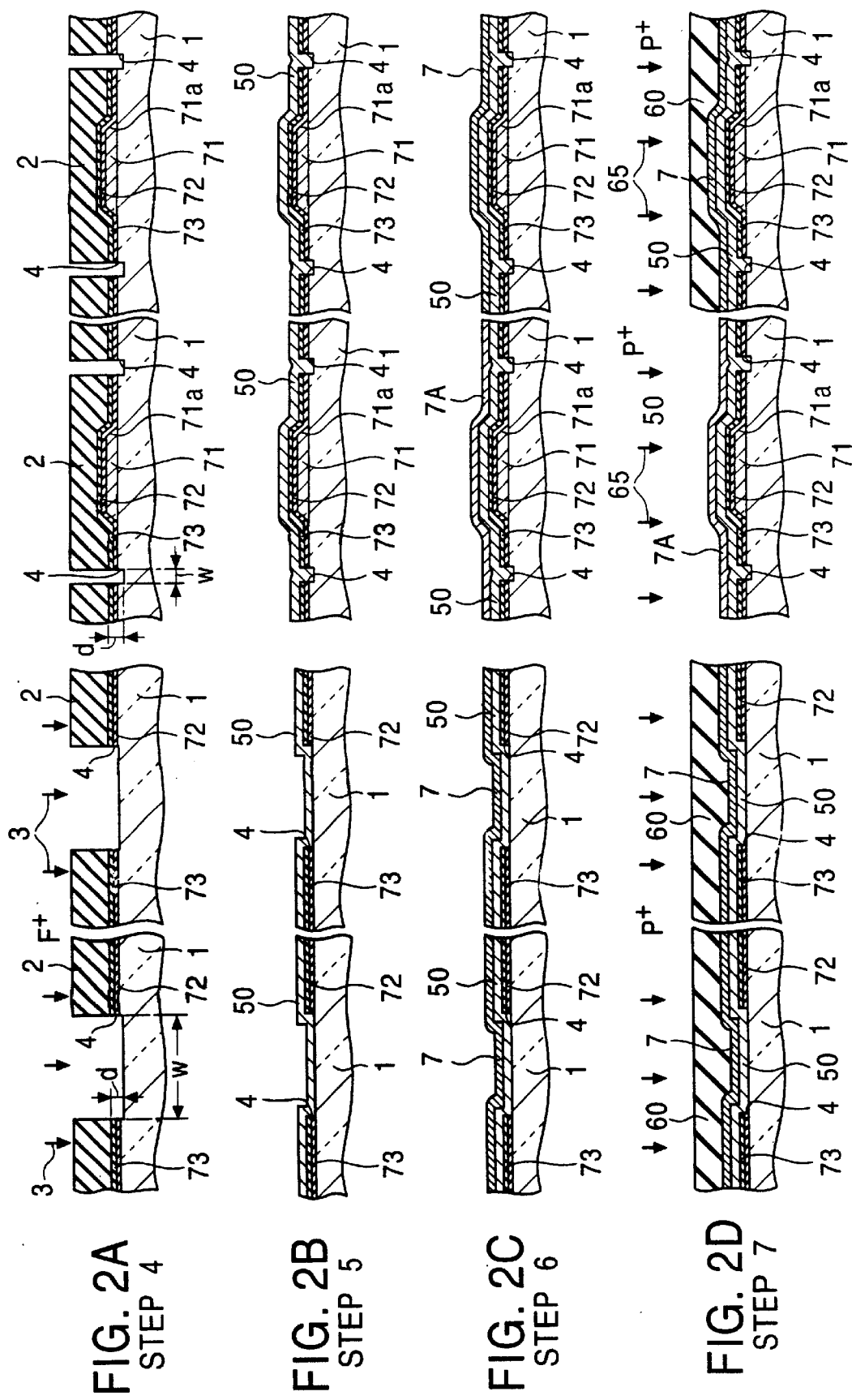

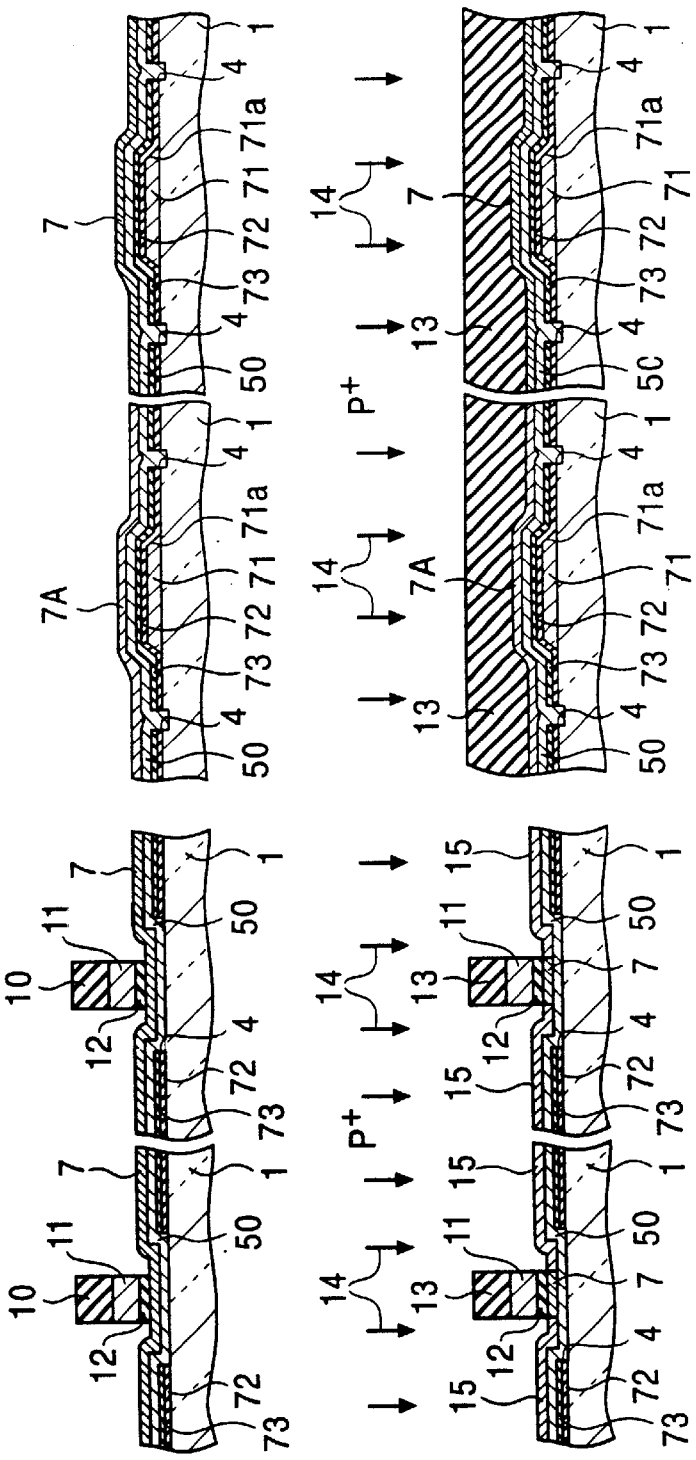
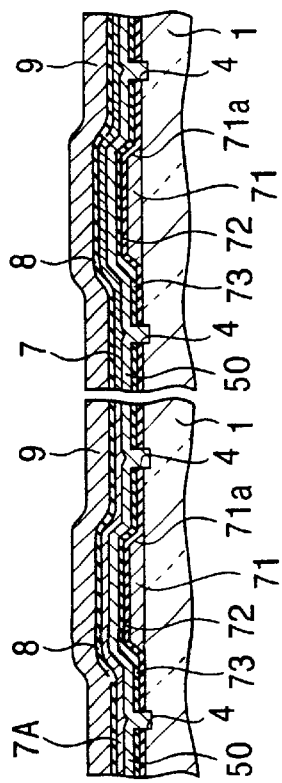
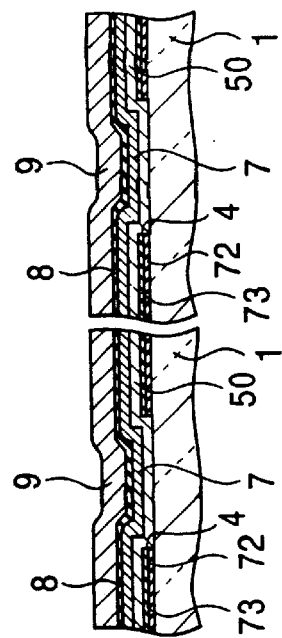
FIG. 3A STEP 8
FIG. 3B STEP 9
FIG. 3C STEP 10

STEP 11

STEP 12

STEP 13

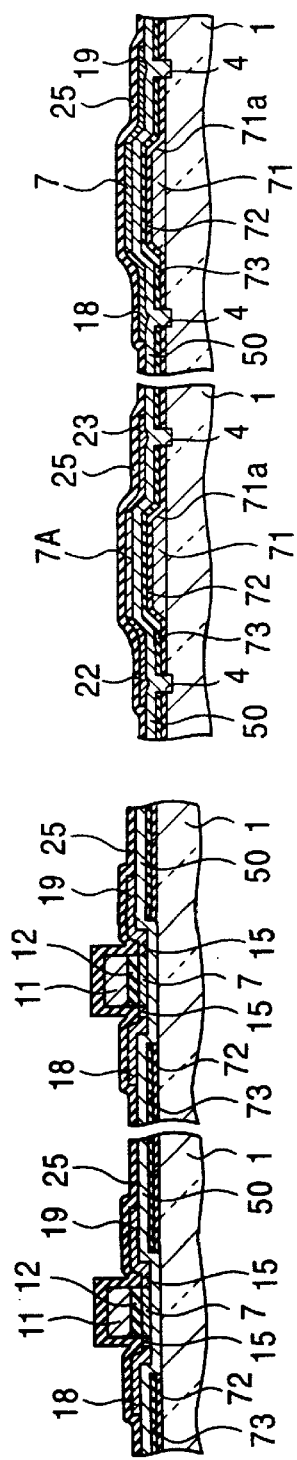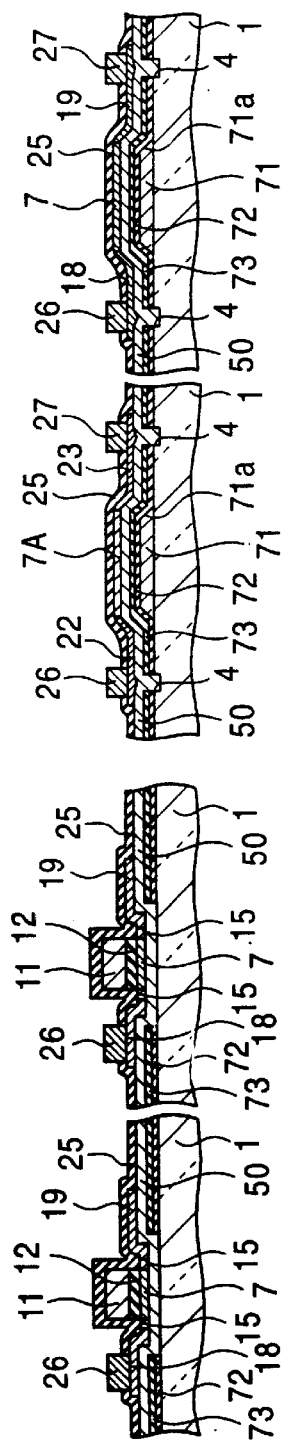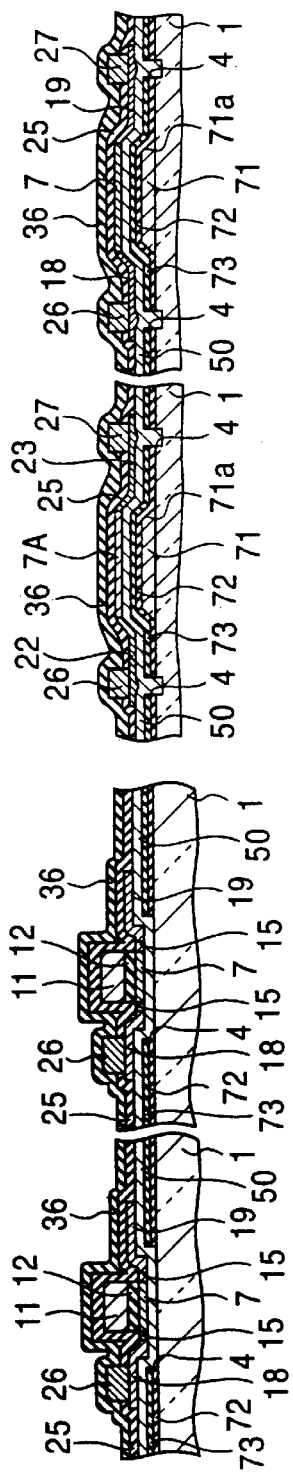
FIG. 5A STEP 14    FIG. 5B STEP 15    FIG. 5C STEP 16

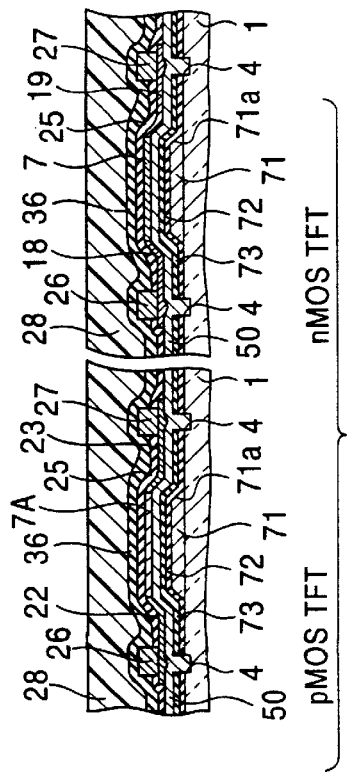
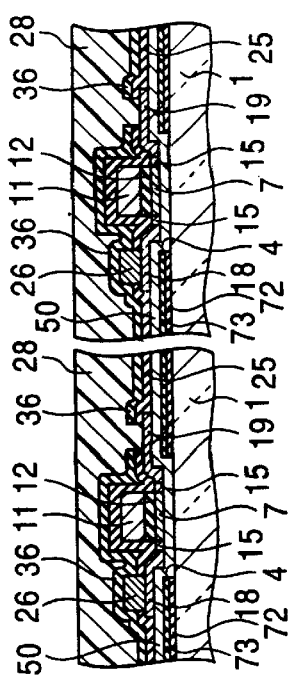
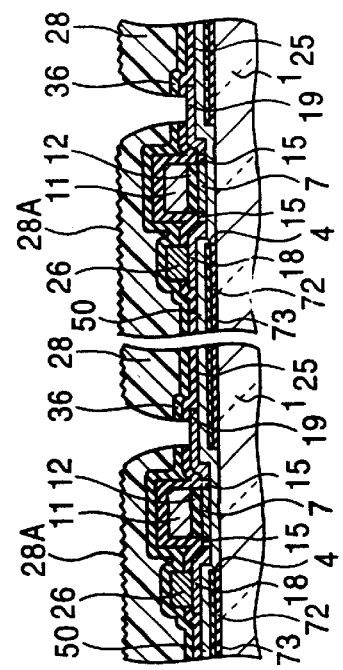
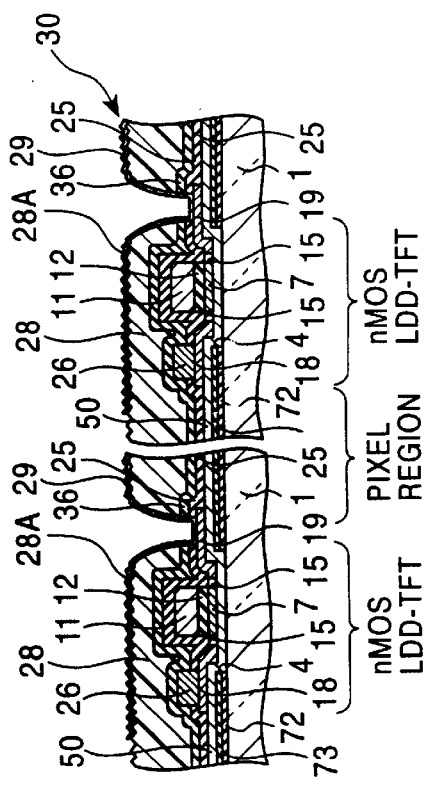
FIG. 6A STEP 17
FIG. 6B STEP 18
FIG. 6C STEP 19

FIG. 13

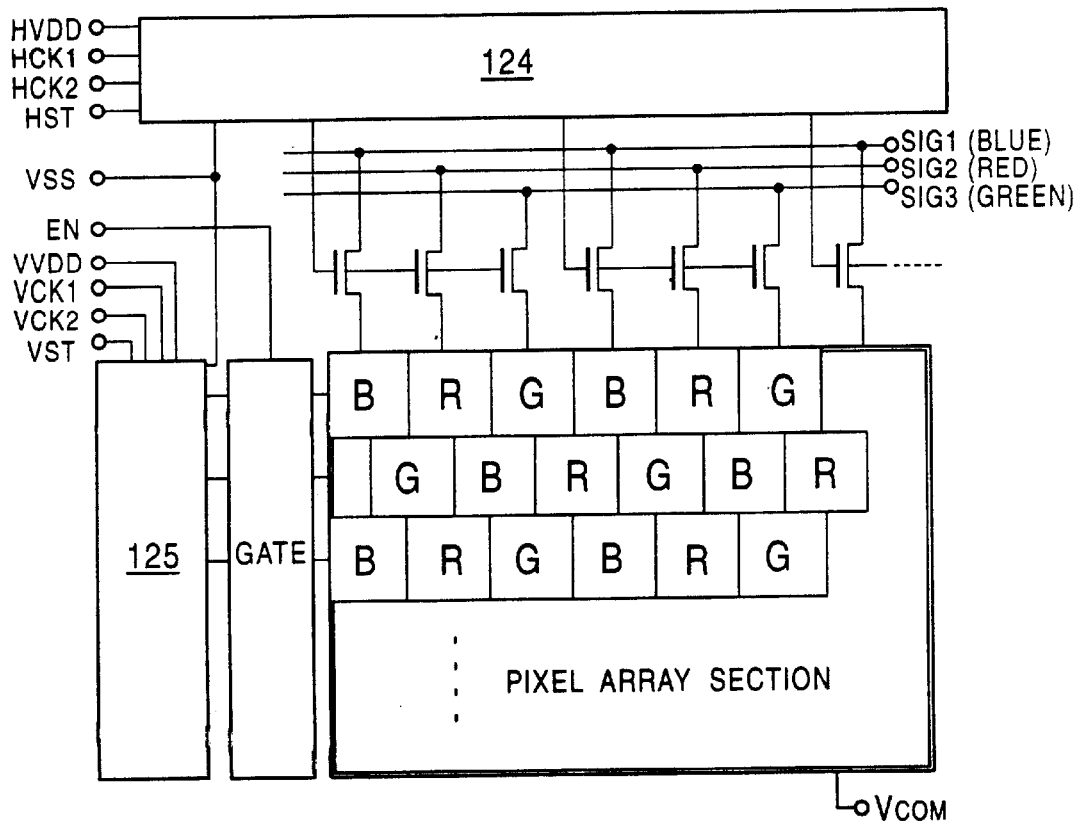

VCOM : COMMON-ELECTRODE VOLTAGE
HVDD : INPUT TERMINAL FOR H-DRIVER
VVDD : INPUT TERMINAL FOR V-DRIVER
HCK1 : CLOCK INPUT TERMINAL FOR DRIVING H-SHIFT REGISTER
HCK2 : CLOCK INPUT TERMINAL FOR DRIVING H-SHIFT REGISTER
VCK1 : CLOCK INPUT TERMINAL FOR DRIVING V-SHIFT REGISTER
VCK2 : CLOCK INPUT TERMINAL FOR DRIVING V-SHIFT REGISTER
HST : START PULSE INPUT TERMINAL FOR DRIVING H-SHIFT REGISTER
VST : START PULSE INPUT TERMINAL FOR DRIVING V-SHIFT REGISTER
VSS : GND TERMINAL FOR H-, V-DRIVERS
SIG1 : VIDEO-SIGNAL INPUT-TERMINAL VOLTAGE (BLUE)
SIG2 : VIDEO-SIGNAL INPUT-TERMINAL VOLTAGE (RED)
SIG3 : VIDEO-SIGNAL INPUT-TERMINAL VOLTAGE (GREEN)

STEP 17

STEP 18

STEP 19

STEP 17

STEP 18

STEP 19

STEP 20

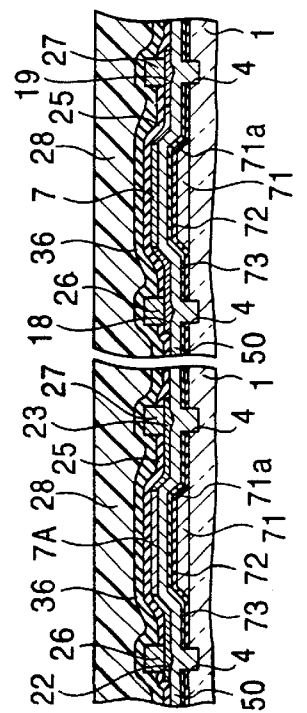
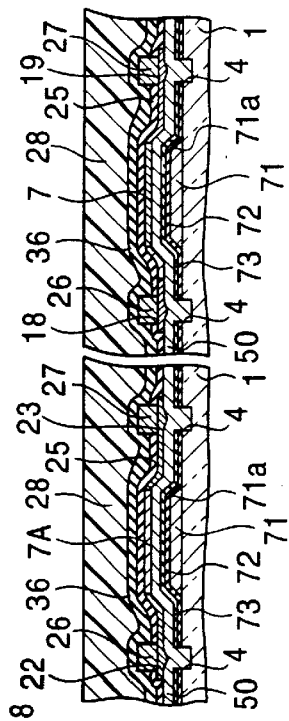
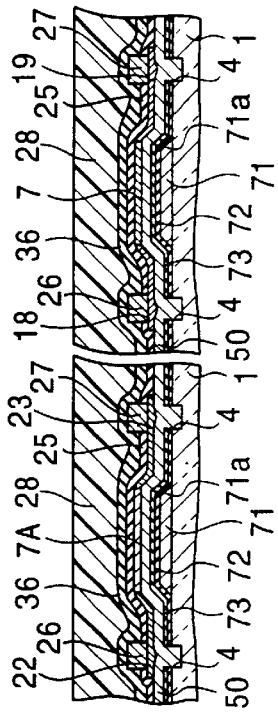
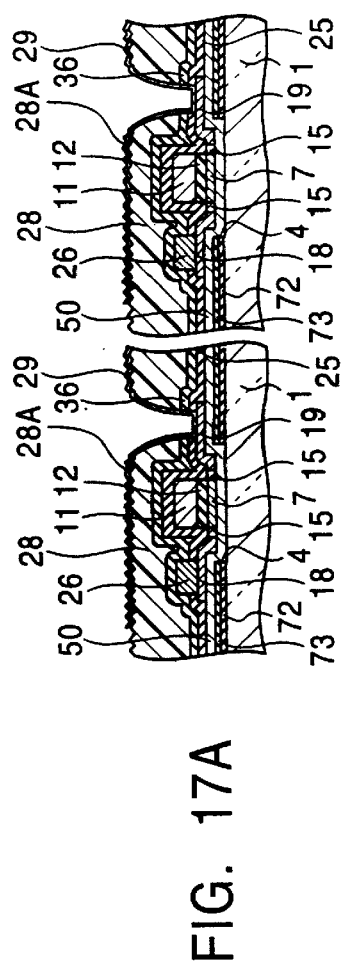
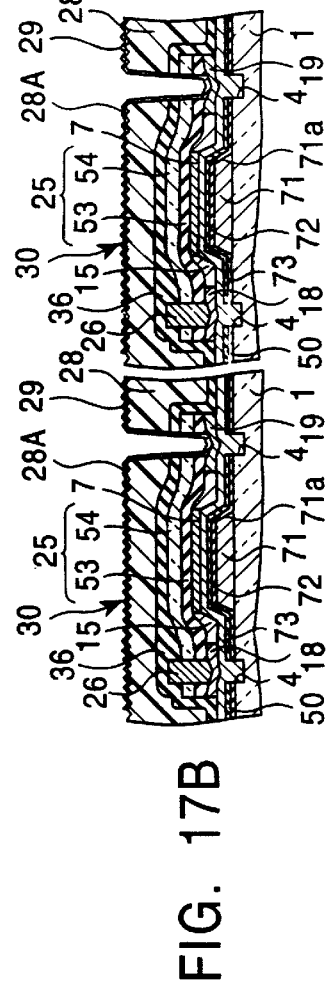
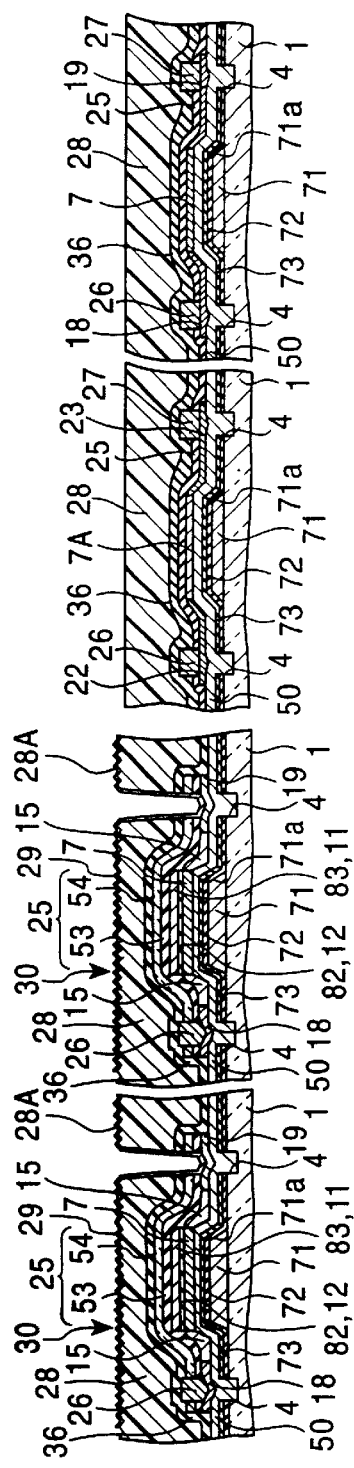
FIG. 17A   FIG. 17B   FIG. 17C

STEP 1

STEP 2

STEP 3

STEP 4

STEP 5

STEP 6

STEP 7

STEP 8

STEP 9

STEP 10

STEP 11

STEP 12

STEP 13

STEP 14

STEP 15

STEP 3

STEP 4

STEP 5

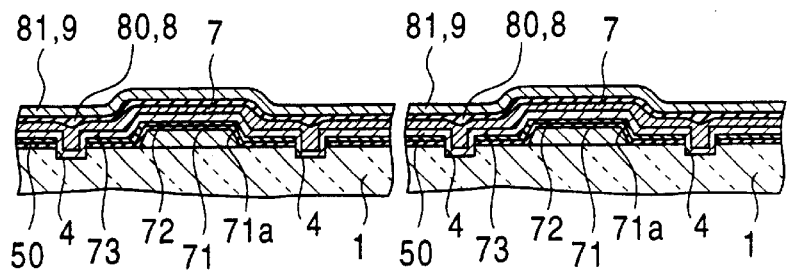
FIG. 23A STEP 7
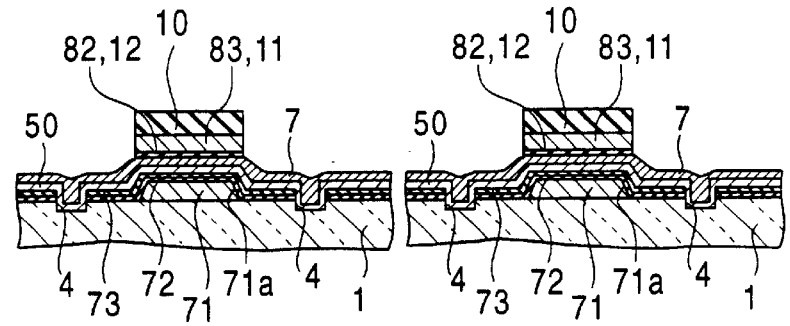
FIG. 23B STEP 8
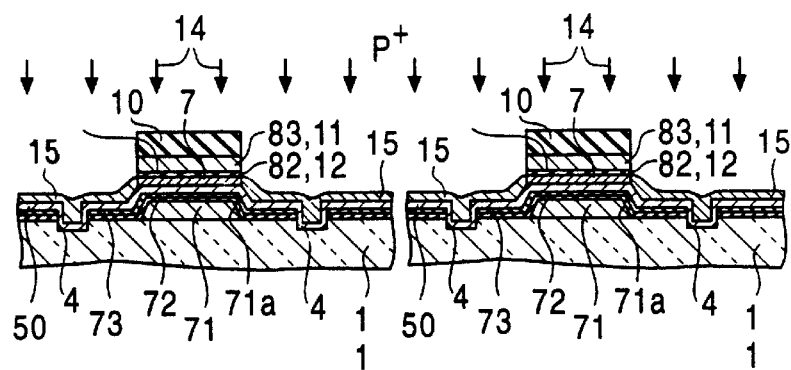
FIG. 23C STEP 9
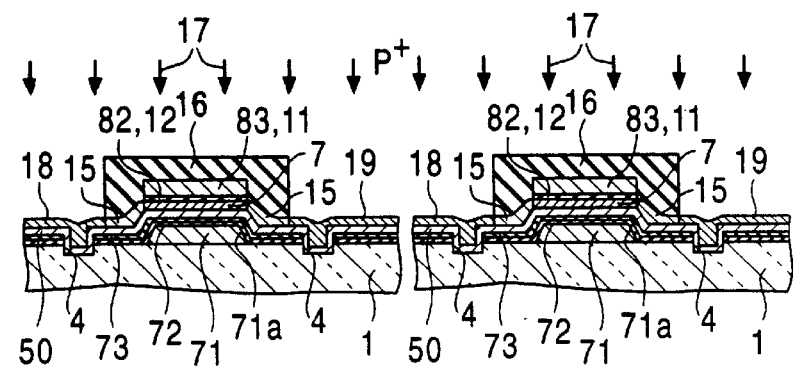
FIG. 23D STEP 10

STEP 11

STEP 12

STEP 13

STEP 14

STEP 15

STEP 16

STEP 17

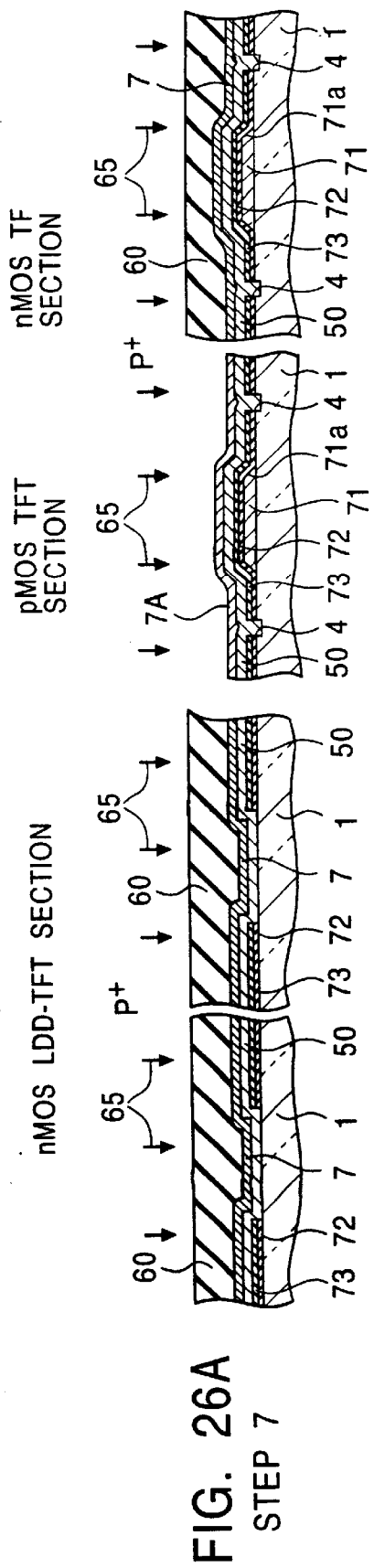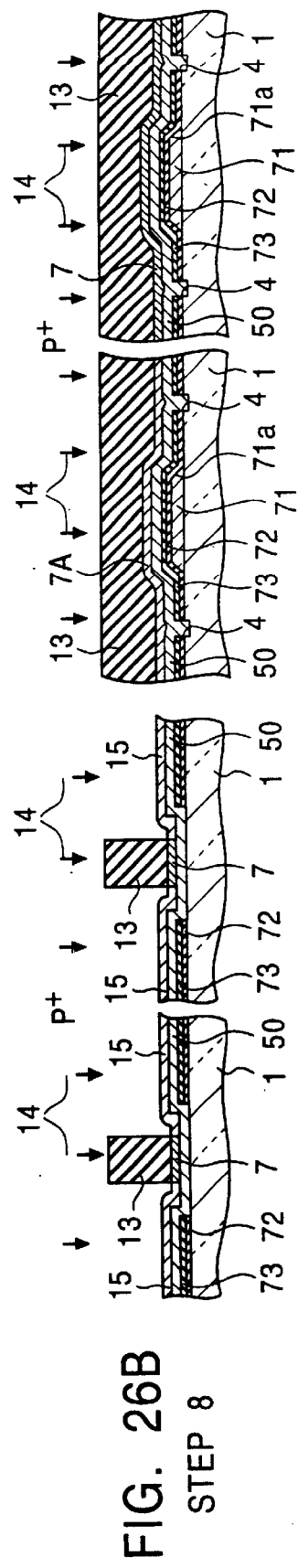
FIG. 26A STEP 7
FIG. 26B STEP 8

STEP 9

STEP 10

STEP 11

STEP 12

STEP 13

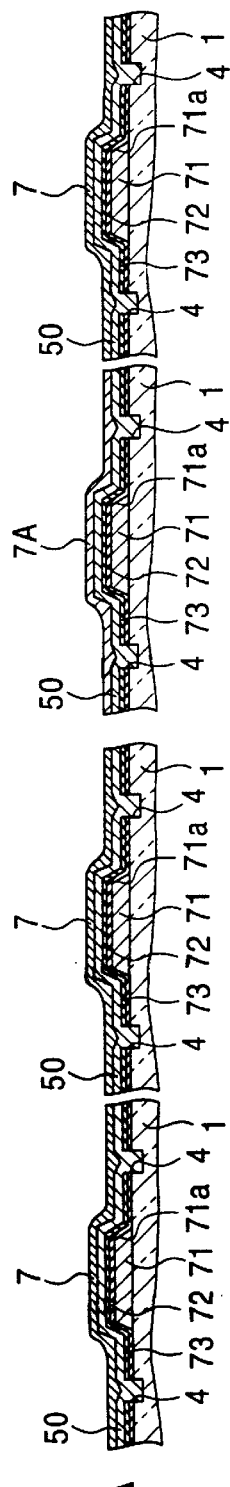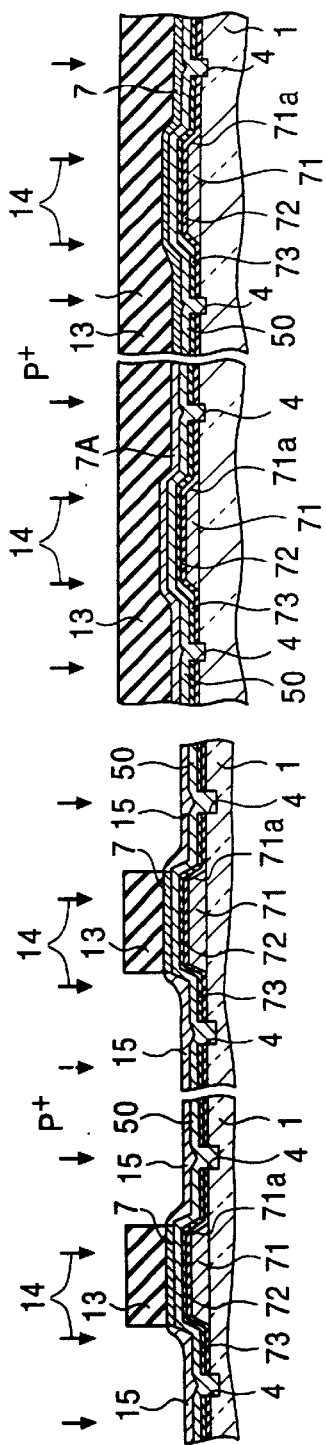
FIG. 29A STEP 6
FIG. 29B STEP 7

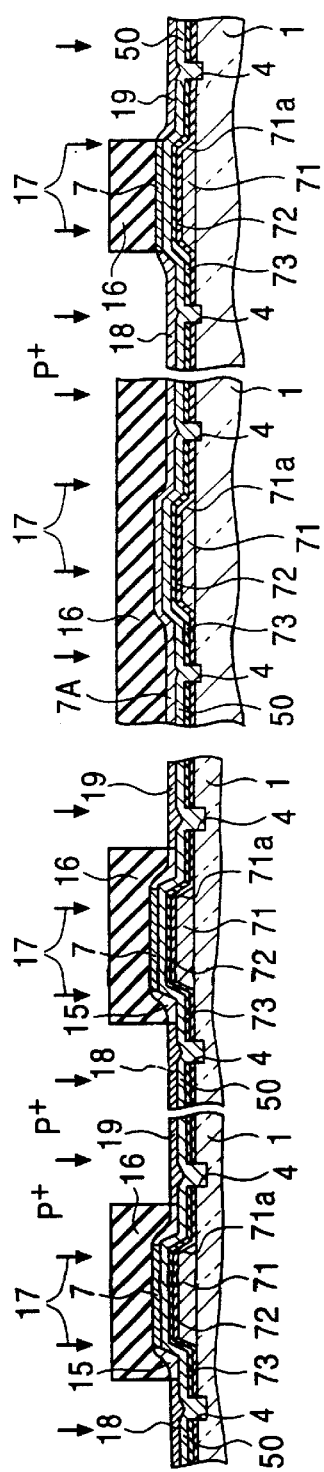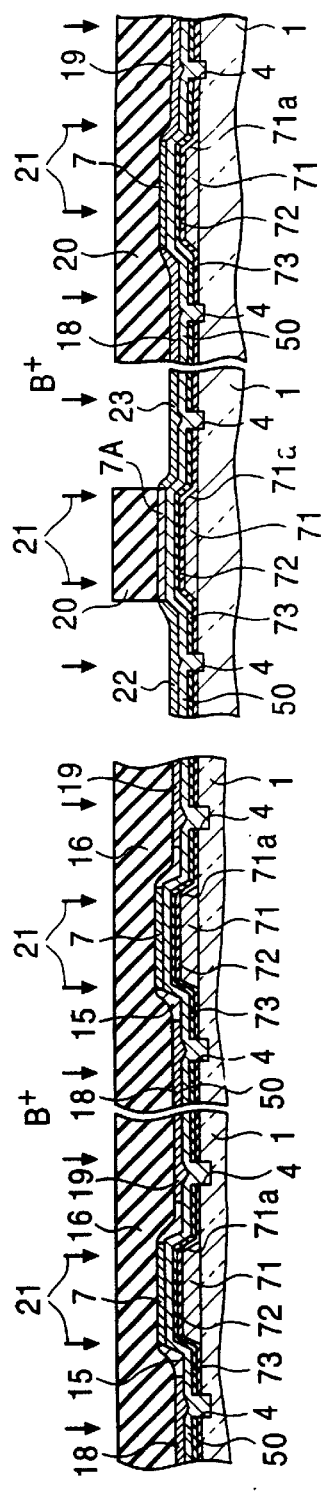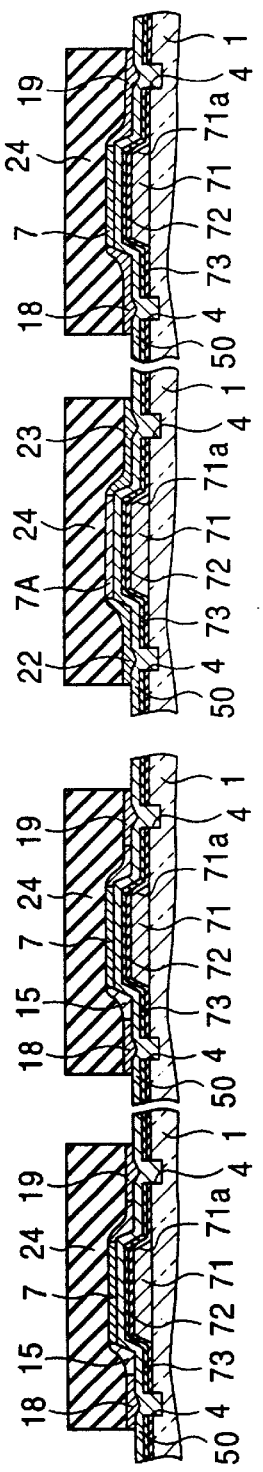
FIG. 30A STEP 8   FIG. 30B STEP 9   FIG. 30C STEP 10

STEP 11

STEP 12

STEP 13

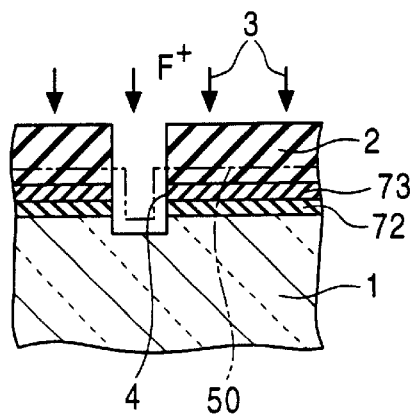
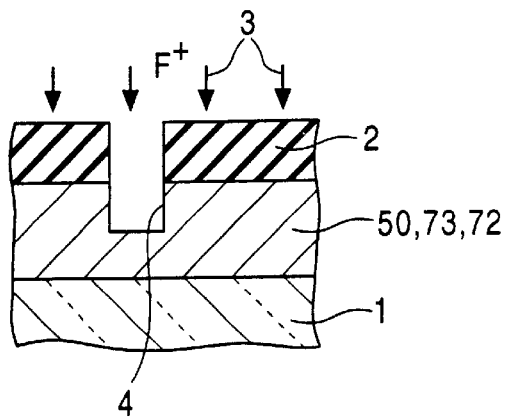
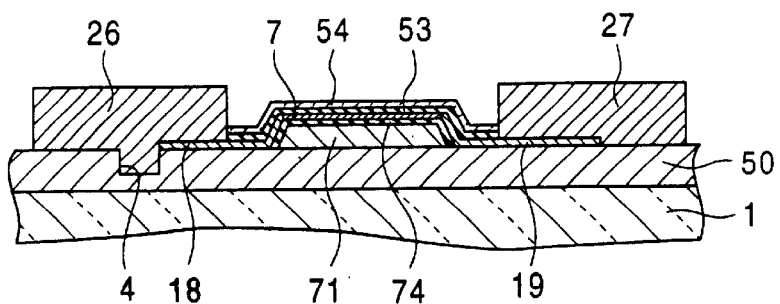
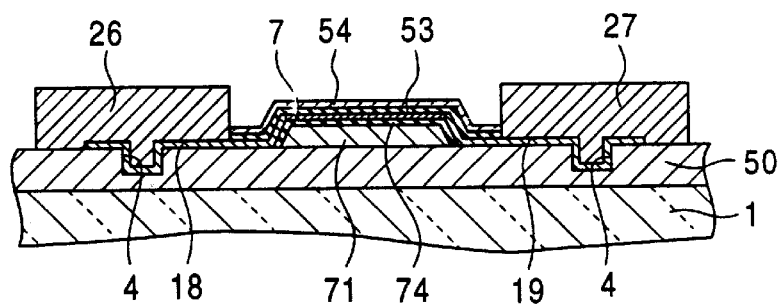
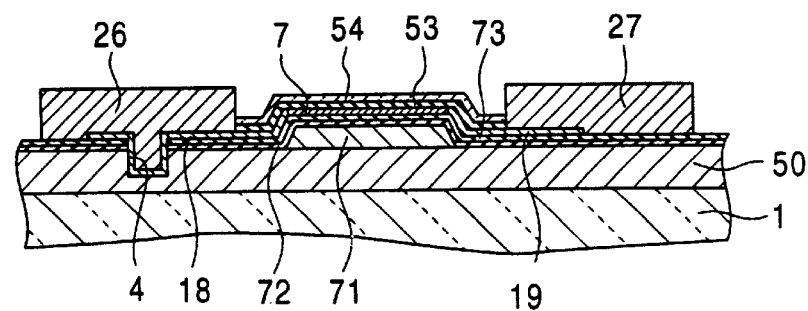

FIG. 37
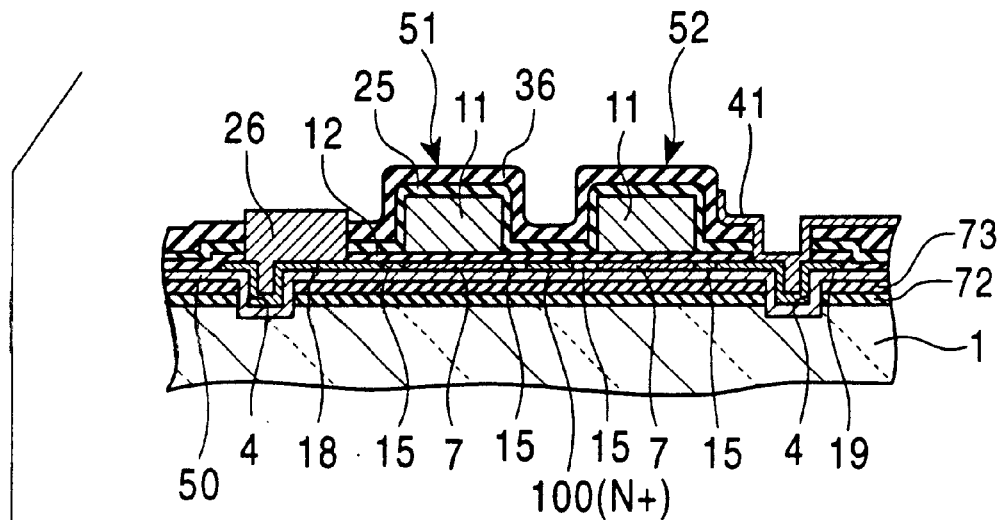
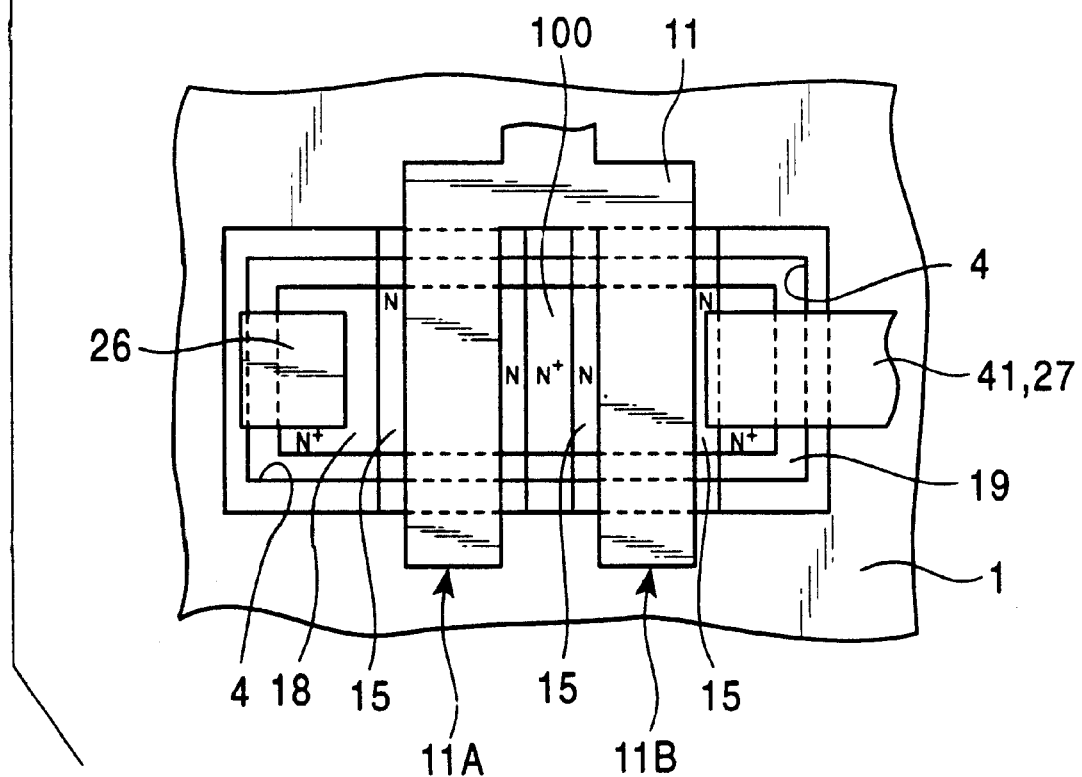

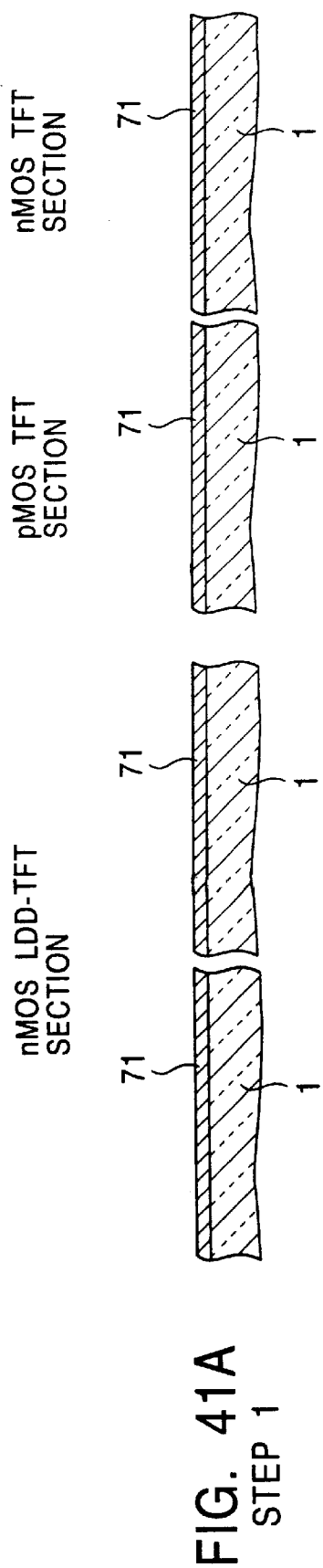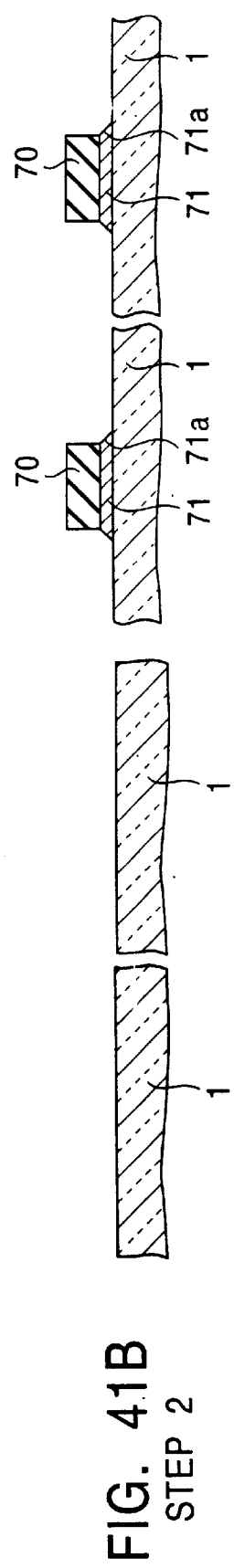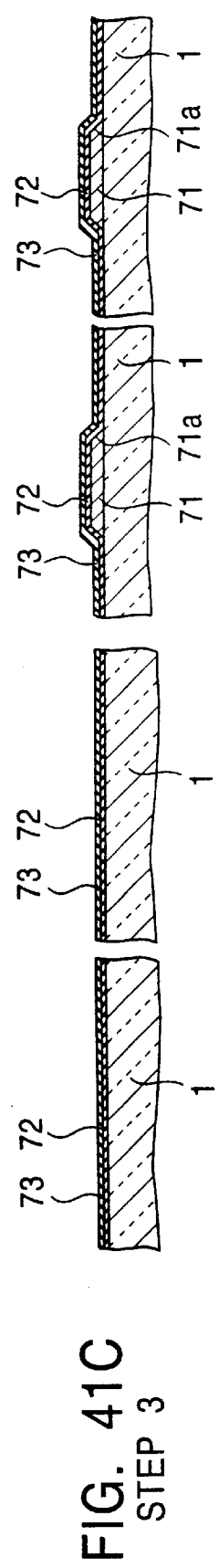
FIG. 41A STEP 1
FIG. 41B STEP 2
FIG. 41C STEP 3

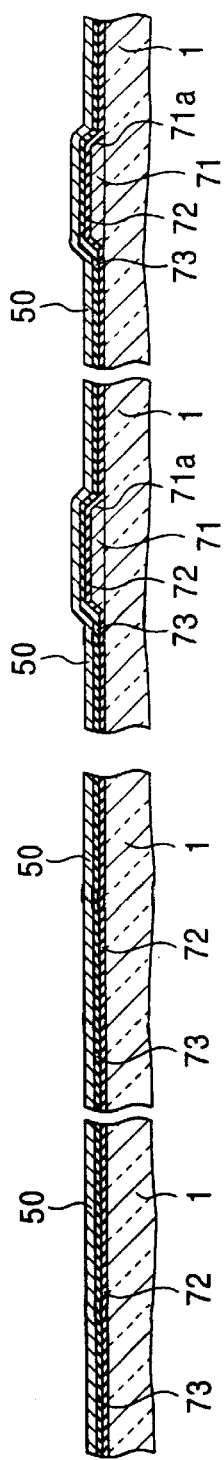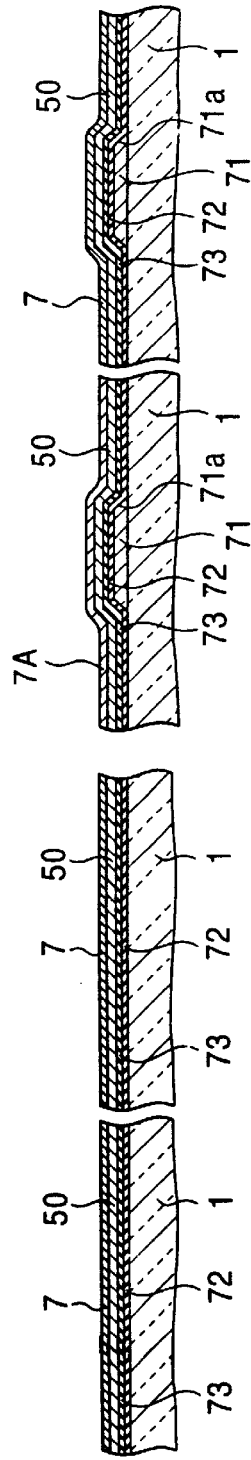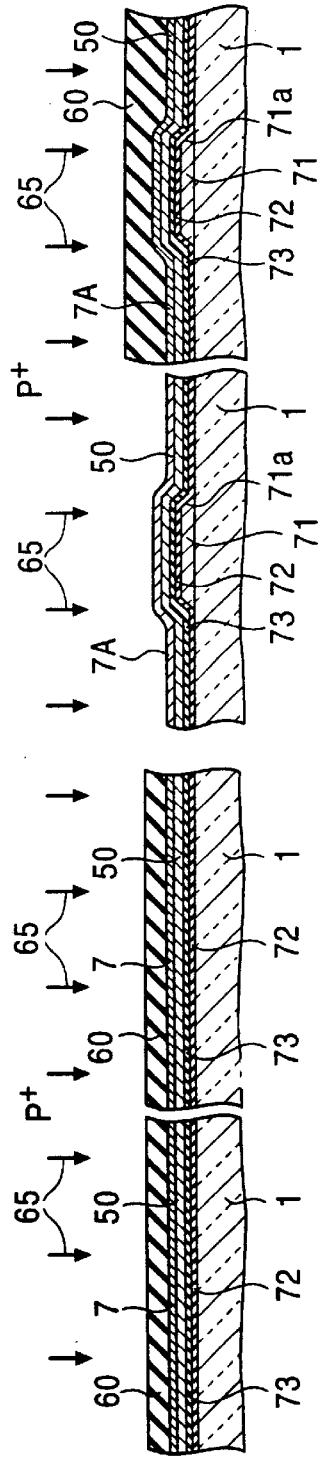
FIG. 42A STEP 4
FIG. 42B STEP 5
FIG. 42C STEP 6

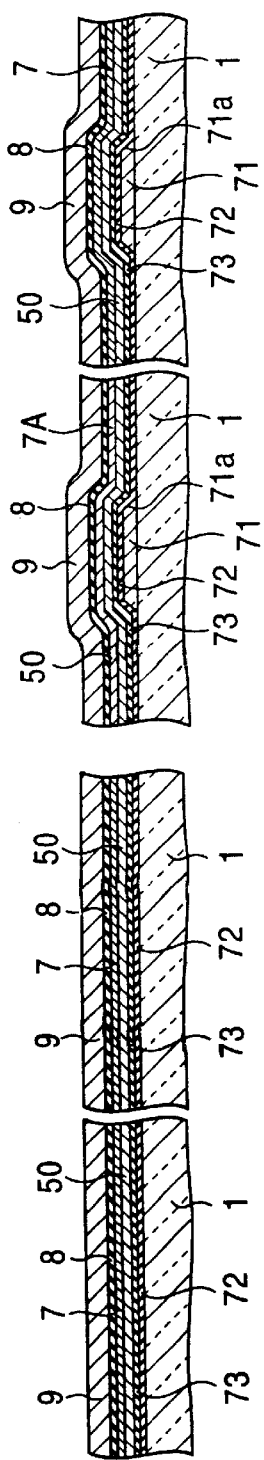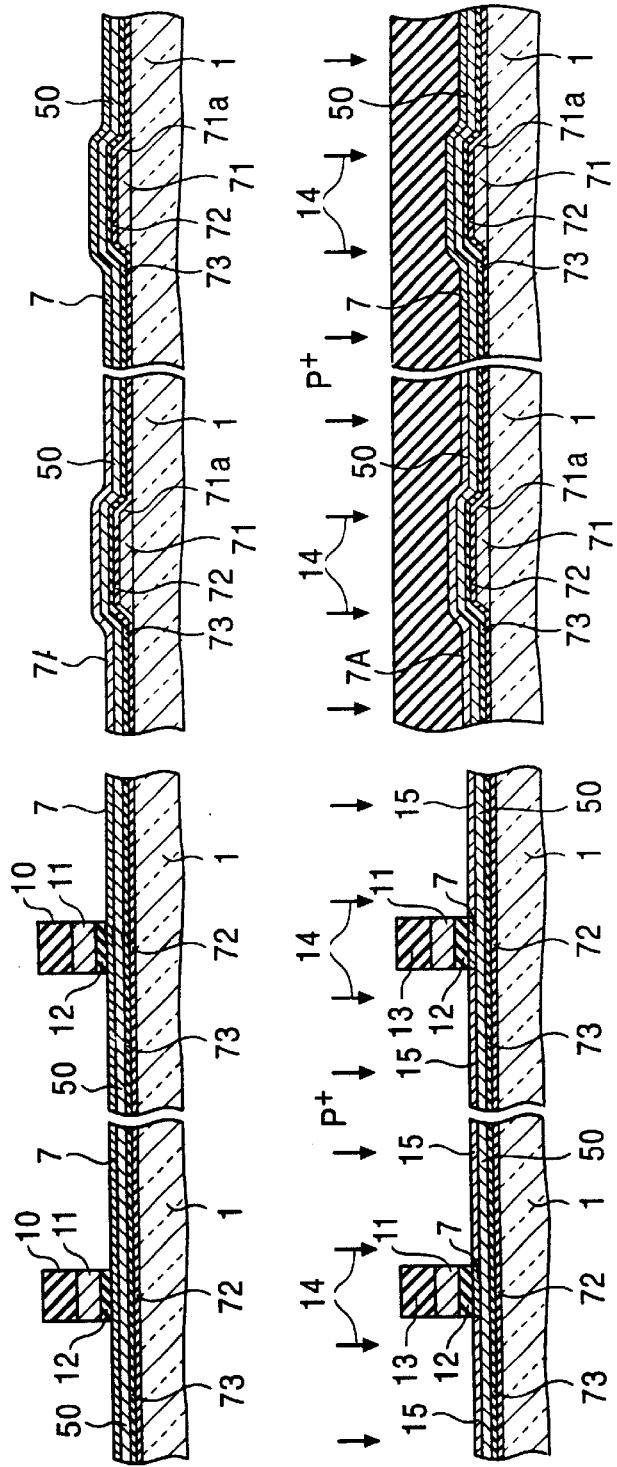
FIG. 43A STEP 7
FIG. 43B STEP 8
FIG. 43C STEP 9

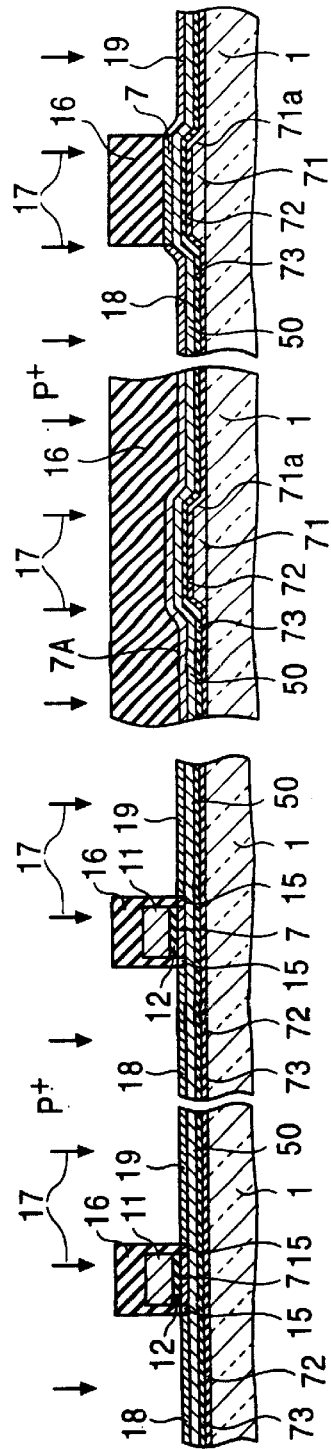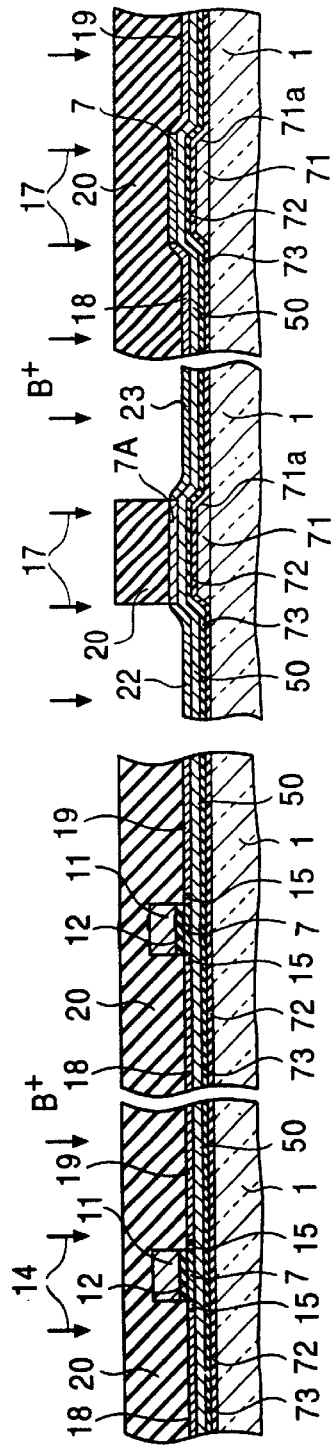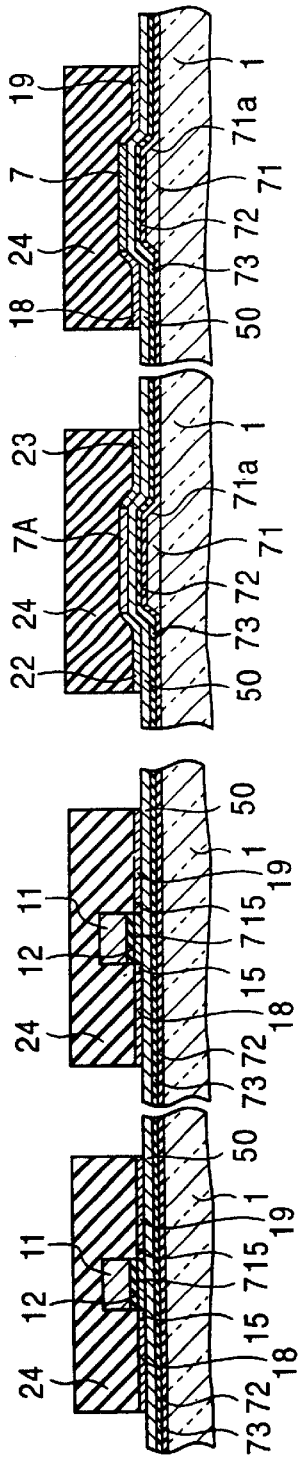
FIG. 44A STEP 10
FIG. 44B STEP 11
FIG. 44C STEP 12

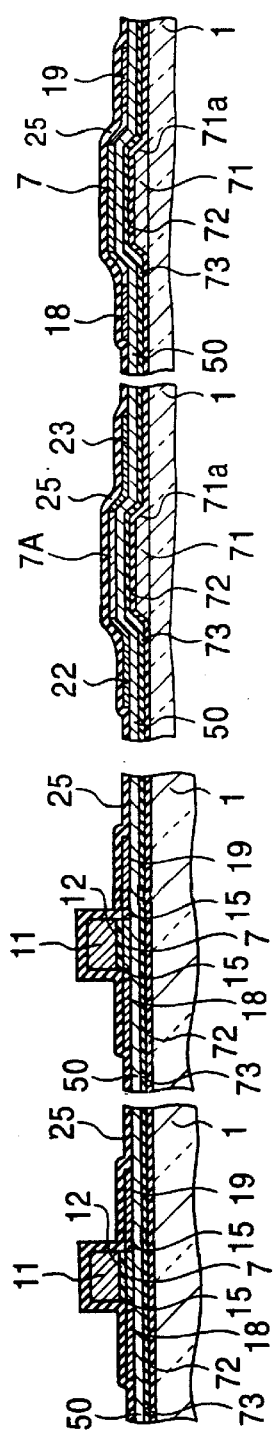
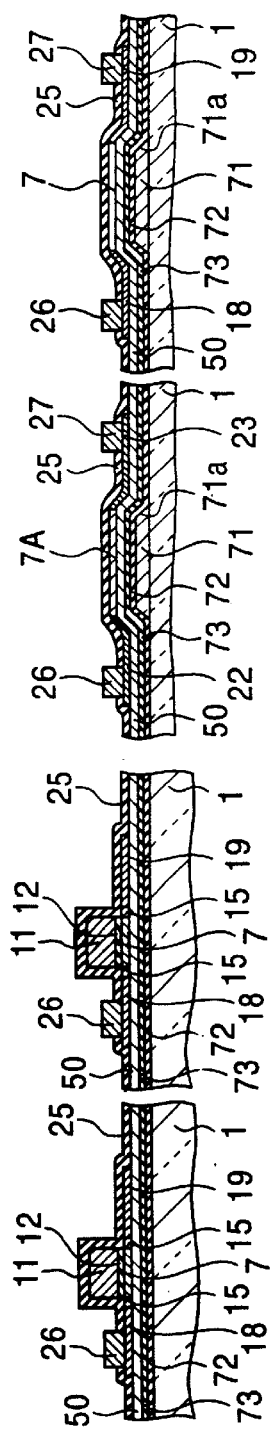
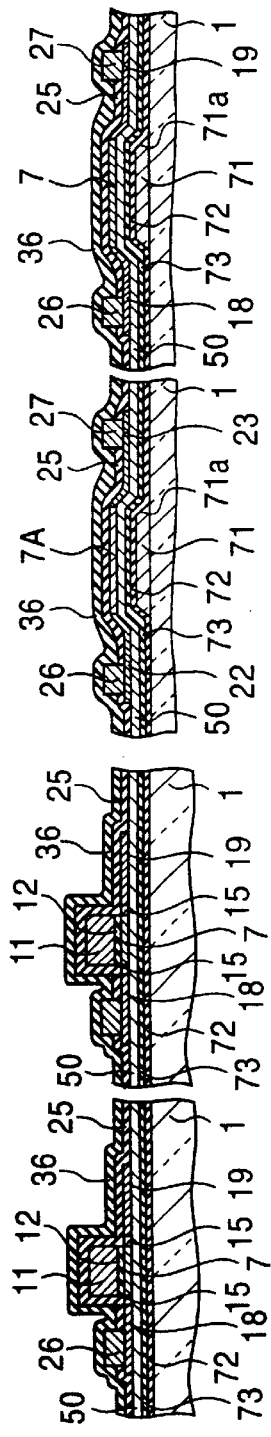
FIG. 45A
STEP 13
FIG. 45B
STEP 14
FIG. 45C
STEP 15

STEP 16

STEP 17

STEP 18

STEP 16

STEP 17

STEP 18

STEP 15

STEP 16

STEP 17

STEP 18

STEP 1

STEP 2

STEP 3

STEP 4

STEP 5

STEP 6

STEP 7

STEP 8

STEP 9

STEP 10

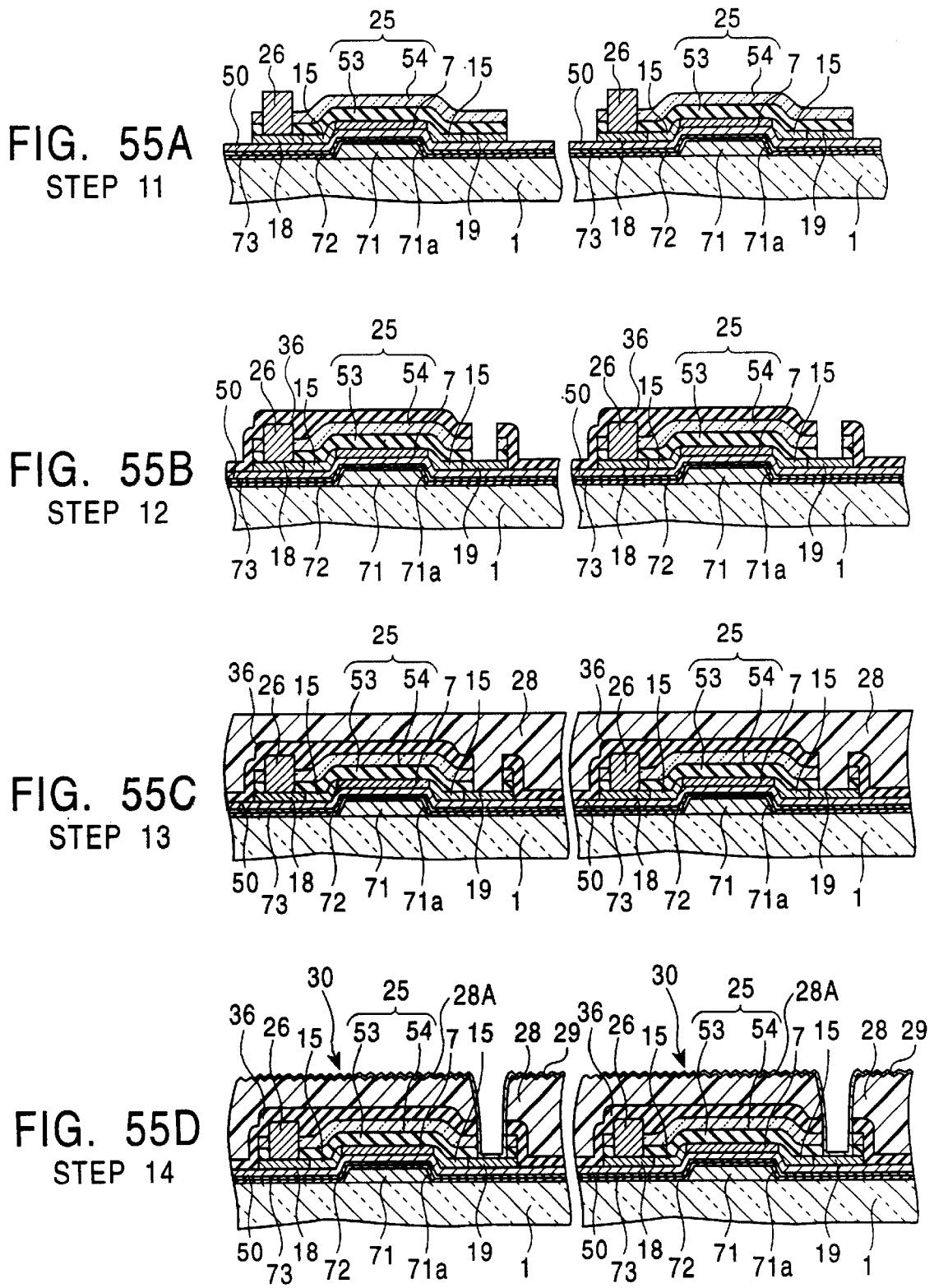
FIG. 55A STEP 11
FIG. 55B STEP 12
FIG. 55C STEP 13
FIG. 55D STEP 14

STEP 3

STEP 4

STEP 5

STEP 6

STEP 7

STEP 8

STEP 9

STEP 10

STEP 11

STEP 12

STEP 13

STEP 14

STEP 15

STEP 16

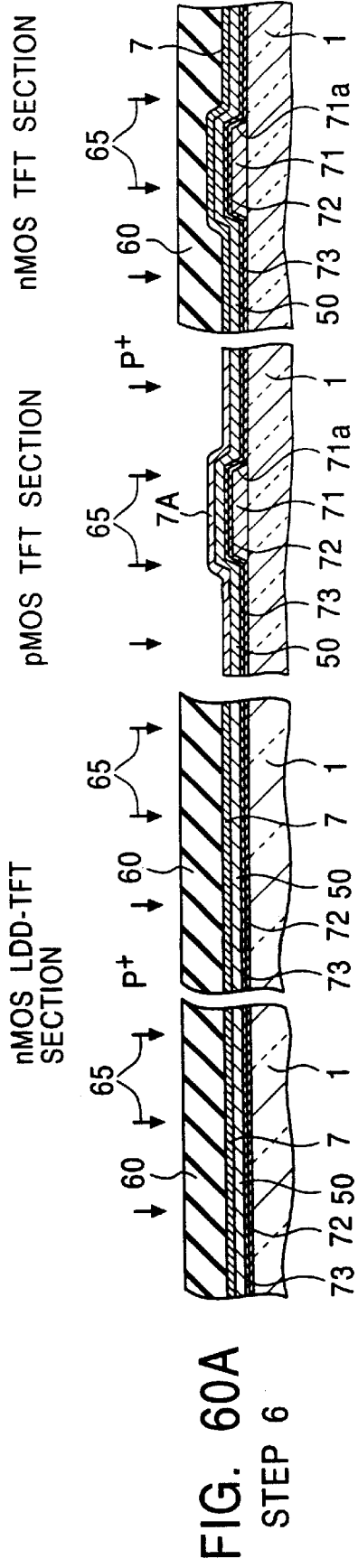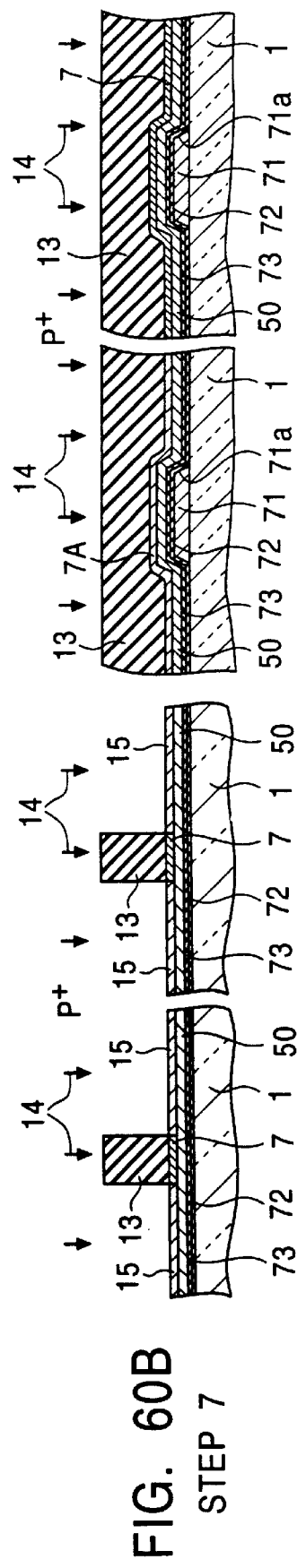
FIG. 60A STEP 6
FIG. 60B STEP 7

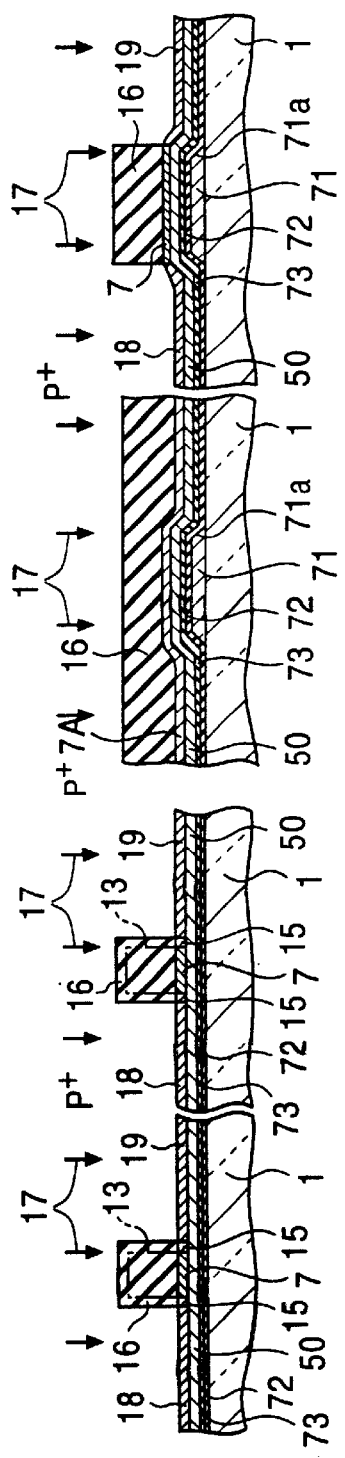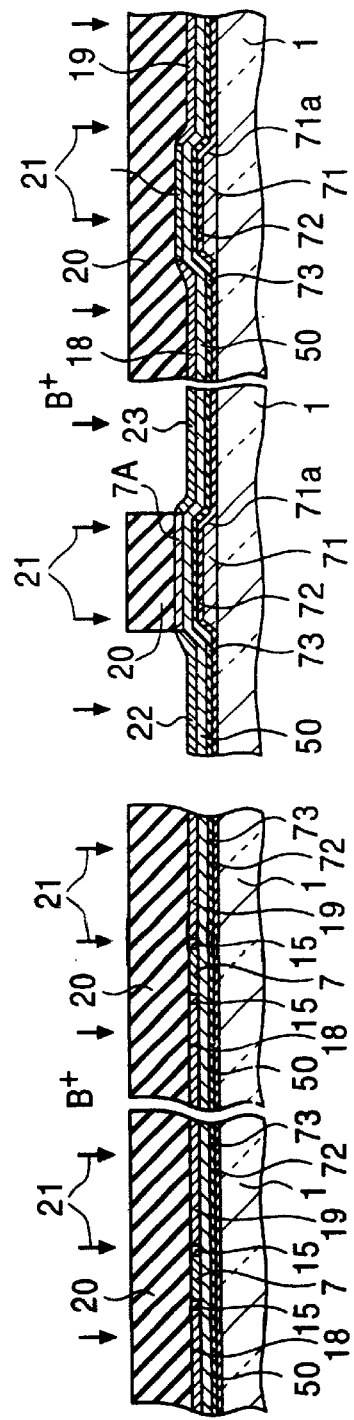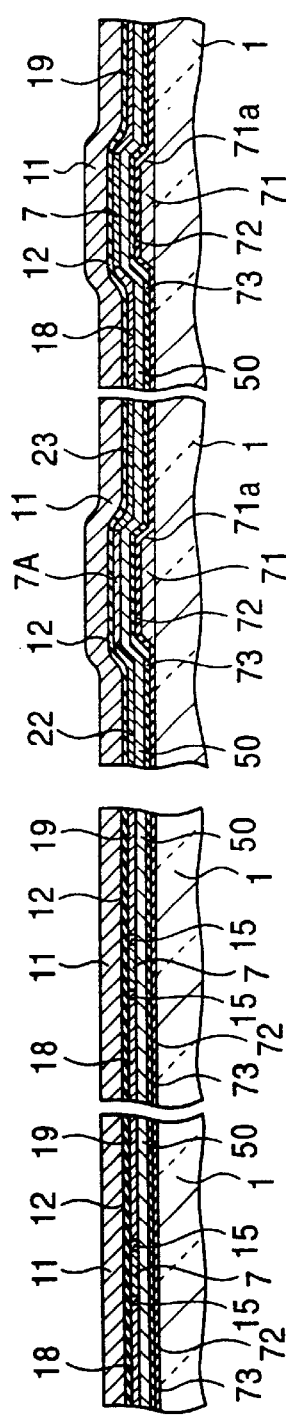
FIG. 61A STEP 8
FIG. 61B STEP 9
FIG. 61C STEP 10

STEP 11

STEP 12

FIG. 63
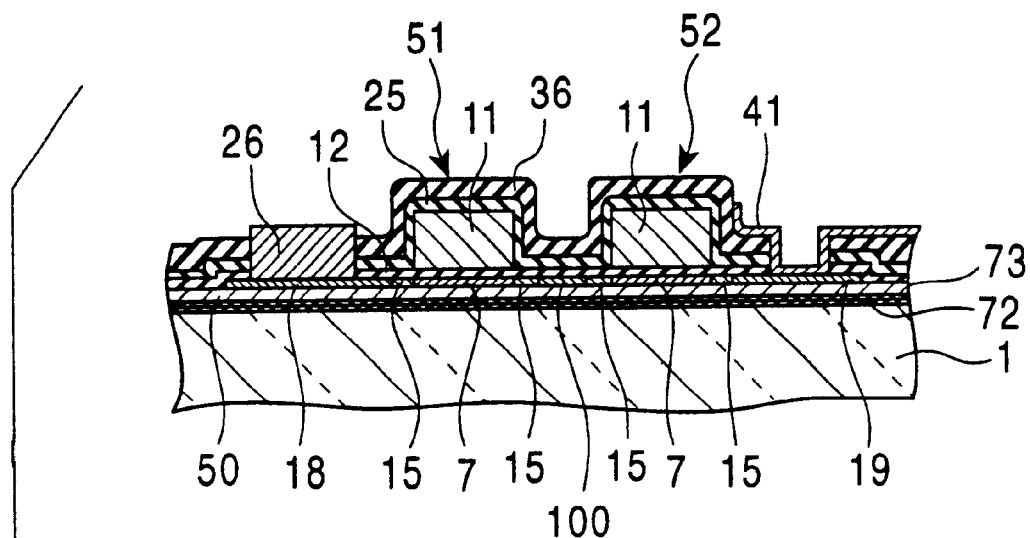
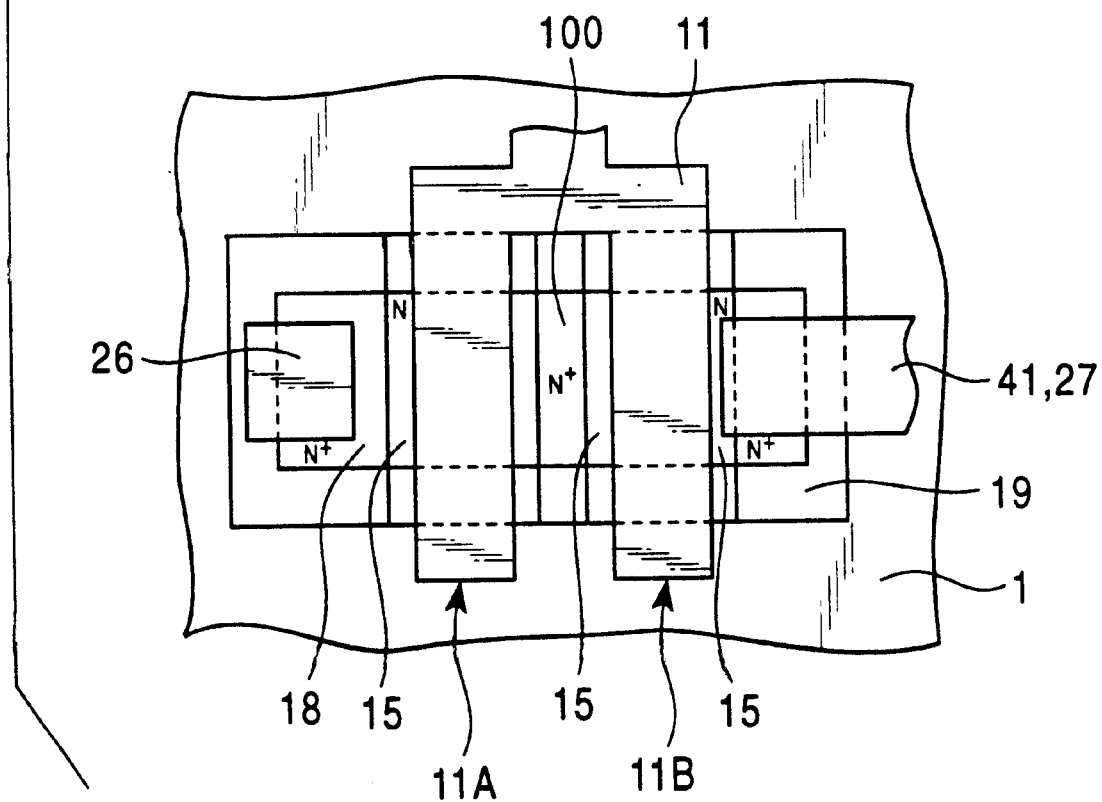

FIG. 65

| No. | PERIPHERAL DRIVING CIRCUIT SECTION | DISPLAY SECTION |
|---|---|---|
| 1 | TOP-GATE TYPE | TOP-GATE TYPE |
| 2 | TOP-GATE TYPE | BOTTOM-GATE TYPE |
| 3 | TOP-GATE TYPE | DUAL-GATE TYPE |
| 4 | TOP-GATE TYPE + BOTTOM-GATE TYPE | TOP-GATE TYPE |
| 5 | TOP-GATE TYPE + BOTTOM-GATE TYPE | BOTTOM-GATE TYPE |
| 6 | TOP-GATE TYPE + BOTTOM-GATE TYPE | DUAL-GATE TYPE |
| 7 | TOP-GATE TYPE + DUAL-GATE TYPE | TOP-GATE TYPE |
| 8 | TOP-GATE TYPE + DUAL-GATE TYPE | BOTTOM-GATE TYPE |
| 9 | TOP-GATE TYPE + DUAL-GATE TYPE | DUAL-GATE TYPE |
| 10 | TOP-GATE TYPE + BOTTOM-GATE TYPE + DUAL-GATE TYPE | TOP-GATE TYPE |
| 11 | TOP-GATE TYPE + BOTTOM-GATE TYPE + DUAL-GATE TYPE | BOTTOM-GATE TYPE |
| 12 | TOP-GATE TYPE + BOTTOM-GATE TYPE + DUAL-GATE TYPE | DUAL-GATE TYPE |

FIG. 66

| No. | TFTS IN PERIPHERAL DRIVING CIRCUIT | | TFT IN DISPLAY SECTION | |
|---|---|---|---|---|
| | GATE STRUCTURE | CHANNEL CONDUCTIVE TYPE | GATE STRUCTURE | CHANNEL CONDUCTIVE TYPE |
| 1 | BOTTOM GATE | p | TOP GATE | p |
| 2 | BOTTOM GATE | p | TOP GATE | n |
| 3 | BOTTOM GATE | n | TOP GATE | n |
| 4 | BOTTOM GATE | n | TOP GATE | p |
| 5 | BOTTOM GATE | c | TOP GATE | p |
| 6 | BOTTOM GATE | c | TOP GATE | n |
| 7 | BOTTOM GATE | c | TOP GATE | c |
| 8 | BOTTOM GATE | p | TOP GATE | c |
| 9 | BOTTOM GATE | n | TOP GATE | c |
| 10 | BOTTOM GATE | p | BOTTOM GATE | p |
| 11 | BOTTOM GATE | p | BOTTOM GATE | n |
| 12 | BOTTOM GATE | n | BOTTOM GATE | n |
| 13 | BOTTOM GATE | n | BOTTOM GATE | p |
| 14 | BOTTOM GATE | c | BOTTOM GATE | p |
| 15 | BOTTOM GATE | c | BOTTOM GATE | n |
| 16 | BOTTOM GATE | c | BOTTOM GATE | c |
| 17 | BOTTOM GATE | p | BOTTOM GATE | c |
| 18 | BOTTOM GATE | n | BOTTOM GATE | c |
| 19 | BOTTOM GATE | p | DUAL GATE | p |
| 20 | BOTTOM GATE | p | DUAL GATE | n |
| 21 | BOTTOM GATE | n | DUAL GATE | n |
| 22 | BOTTOM GATE | n | DUAL GATE | p |
| 23 | BOTTOM GATE | c | DUAL GATE | p |
| 24 | BOTTOM GATE | c | DUAL GATE | n |
| 25 | BOTTOM GATE | c | DUAL GATE | c |
| 26 | BOTTOM GATE | p | DUAL GATE | c |
| 27 | BOTTOM GATE | n | DUAL GATE | c | p : p-CHANNEL TYPE n : n-CHANNEL TYPE c : COMPLEMENTARY TYPE OF COMBINATION OF p-CHANNEL TYPE AND n-CHANNEL TYPE

FIG. 67

| No. | TFTS IN PERIPHERAL DRIVING CIRCUIT | | TFT IN DISPLAY SECTION | |
|---|---|---|---|---|
| | GATE STRUCTURE | CHANNEL CONDUCTIVE TYPE | GATE STRUCTURE | CHANNEL CONDUCTIVE TYPE |
| 28 | BOTTOM GATE | c + n | TOP GATE | p |
| 29 | BOTTOM GATE | c + n | TOP GATE | n |
| 30 | BOTTOM GATE | c + n | TOP GATE | c |
| 31 | BOTTOM GATE | c + p | TOP GATE | p |
| 32 | BOTTOM GATE | c + p | TOP GATE | n |
| 33 | BOTTOM GATE | c + p | TOP GATE | c |
| 34 | BOTTOM GATE | c + n + p | TOP GATE | p |
| 35 | BOTTOM GATE | c + n + p | TOP GATE | n |
| 36 | BOTTOM GATE | c + n + p | TOP GATE | c |
| 37 | BOTTOM GATE | c + n | BOTTOM GATE | p |
| 38 | BOTTOM GATE | c + n | BOTTOM GATE | n |
| 39 | BOTTOM GATE | c + n | BOTTOM GATE | c |
| 40 | BOTTOM GATE | c + p | BOTTOM GATE | p |
| 41 | BOTTOM GATE | c + p | BOTTOM GATE | n |
| 42 | BOTTOM GATE | c + p | BOTTOM GATE | c |
| 43 | BOTTOM GATE | c + n + p | BOTTOM GATE | p |
| 44 | BOTTOM GATE | c + n + p | BOTTOM GATE | n |
| 45 | BOTTOM GATE | c + n + p | BOTTOM GATE | c |
| 46 | BOTTOM GATE | c + n | DUAL GATE | p |
| 47 | BOTTOM GATE | c + n | DUAL GATE | n |
| 48 | BOTTOM GATE | c + n | DUAL GATE | c |
| 49 | BOTTOM GATE | c + p | DUAL GATE | p |
| 50 | BOTTOM GATE | c + p | DUAL GATE | n |
| 51 | BOTTOM GATE | c + p | DUAL GATE | c |
| 52 | BOTTOM GATE | c + n + p | DUAL GATE | p |
| 53 | BOTTOM GATE | c + n + p | DUAL GATE | n |
| 54 | BOTTOM GATE | c + n + p | DUAL GATE | c |

FIG. 68

| No. | TFTS IN PERIPHERAL DRIVING CIRCUIT | | TFT IN DISPLAY SECTION | |
|---|---|---|---|---|
| | GATE STRUCTURE | CHANNEL CONDUCTIVE TYPE | GATE STRUCTURE | CHANNEL CONDUCTIVE TYPE |
| 55 | BOTTOM GATE | p | TOP GATE | p |
| 56 | BOTTOM GATE | p | TOP GATE | n |
| 57 | BOTTOM GATE | n | TOP GATE | n |
| 58 | BOTTOM GATE | n | TOP GATE | p |
| 59 | BOTTOM GATE | c | TOP GATE | p |
| 60 | BOTTOM GATE | c | TOP GATE | n |
| 61 | BOTTOM GATE | c | TOP GATE | c |
| 62 | BOTTOM GATE | p | TOP GATE | c |
| 63 | BOTTOM GATE | n | TOP GATE | c |
| 64 | BOTTOM GATE | p | BOTTOM GATE | p |
| 65 | BOTTOM GATE | p | BOTTOM GATE | n |
| 66 | BOTTOM GATE | n | BOTTOM GATE | n |
| 67 | BOTTOM GATE | n | BOTTOM GATE | p |
| 68 | BOTTOM GATE | c | BOTTOM GATE | p |
| 69 | BOTTOM GATE | c | BOTTOM GATE | n |
| 70 | BOTTOM GATE | c | BOTTOM GATE | c |
| 71 | BOTTOM GATE | p | BOTTOM GATE | c |
| 72 | BOTTOM GATE | n | BOTTOM GATE | c |
| 73 | BOTTOM GATE | p | DUAL GATE | p |
| 74 | BOTTOM GATE | p | DUAL GATE | n |
| 75 | BOTTOM GATE | n | DUAL GATE | n |
| 76 | BOTTOM GATE | n | DUAL GATE | p |
| 77 | BOTTOM GATE | c | DUAL GATE | p |
| 78 | BOTTOM GATE | c | DUAL GATE | n |
| 79 | BOTTOM GATE | c | DUAL GATE | c |
| 80 | BOTTOM GATE | p | DUAL GATE | c |
| 81 | BOTTOM GATE | n | DUAL GATE | c |

FIG. 69

| No. | TFTS IN PERIPHERAL DRIVING CIRCUIT | | TFT IN DISPLAY SECTION | |
|---|---|---|---|---|
| | GATE STRUCTURE | CHANNEL CONDUCTIVE TYPE | GATE STRUCTURE | CHANNEL CONDUCTIVE TYPE |
| 82 | BOTTOM GATE | c + n | TOP GATE | p |
| 83 | BOTTOM GATE | c + n | TOP GATE | n |
| 84 | BOTTOM GATE | c + n | TOP GATE | c |
| 85 | BOTTOM GATE | c + p | TOP GATE | p |
| 86 | BOTTOM GATE | c + p | TOP GATE | n |
| 87 | BOTTOM GATE | c + p | TOP GATE | c |
| 88 | BOTTOM GATE | c + n + p | TOP GATE | p |
| 89 | BOTTOM GATE | c + n + p | TOP GATE | n |
| 90 | BOTTOM GATE | c + n + p | TOP GATE | c |
| 91 | BOTTOM GATE | c + n | BOTTOM GATE | p |
| 92 | BOTTOM GATE | c + n | BOTTOM GATE | n |
| 93 | BOTTOM GATE | c + n | BOTTOM GATE | c |
| 94 | BOTTOM GATE | c + p | BOTTOM GATE | p |
| 95 | BOTTOM GATE | c + p | BOTTOM GATE | n |
| 96 | BOTTOM GATE | c + p | BOTTOM GATE | c |
| 97 | BOTTOM GATE | c + n + p | BOTTOM GATE | p |
| 98 | BOTTOM GATE | c + n + p | BOTTOM GATE | n |
| 99 | BOTTOM GATE | c + n + p | BOTTOM GATE | c |
| 100 | BOTTOM GATE | c + n | DUAL GATE | p |
| 101 | BOTTOM GATE | c + n | DUAL GATE | n |
| 102 | BOTTOM GATE | c + n | DUAL GATE | c |
| 103 | BOTTOM GATE | c + p | DUAL GATE | p |
| 104 | BOTTOM GATE | c + p | DUAL GATE | n |
| 105 | BOTTOM GATE | c + p | DUAL GATE | c |
| 106 | BOTTOM GATE | c + n + p | DUAL GATE | p |
| 107 | BOTTOM GATE | c + n + p | DUAL GATE | n |
| 108 | BOTTOM GATE | c + n + p | DUAL GATE | c |

FIG. 70

| No. | TFTS IN PERIPHERAL DRIVING CIRCUIT | | TFT IN DISPLAY SECTION | |
|---|---|---|---|---|
| | GATE STRUCTURE | CHANNEL CONDUCTIVE TYPE | GATE STRUCTURE | CHANNEL CONDUCTIVE TYPE |
| 109 | BOTTOM GATE | p | TOP GATE | p |
| 110 | BOTTOM GATE | p | TOP GATE | n |
| 111 | BOTTOM GATE | n | TOP GATE | n |
| 112 | BOTTOM GATE | n | TOP GATE | p |
| 113 | BOTTOM GATE | c | TOP GATE | p |
| 114 | BOTTOM GATE | c | TOP GATE | n |
| 115 | BOTTOM GATE | c | TOP GATE | c |
| 116 | BOTTOM GATE | p | TOP GATE | c |
| 117 | BOTTOM GATE | n | TOP GATE | c |
| 118 | BOTTOM GATE | p | BOTTOM GATE | p |
| 119 | BOTTOM GATE | p | BOTTOM GATE | n |
| 120 | BOTTOM GATE | n | BOTTOM GATE | n |
| 121 | BOTTOM GATE | n | BOTTOM GATE | p |
| 122 | BOTTOM GATE | c | BOTTOM GATE | p |
| 123 | BOTTOM GATE | c | BOTTOM GATE | n |
| 124 | BOTTOM GATE | c | BOTTOM GATE | c |
| 125 | BOTTOM GATE | p | BOTTOM GATE | c |
| 126 | BOTTOM GATE | n | BOTTOM GATE | c |
| 127 | BOTTOM GATE | p | DUAL GATE | p |
| 128 | BOTTOM GATE | p | DUAL GATE | n |
| 129 | BOTTOM GATE | n | DUAL GATE | n |
| 130 | BOTTOM GATE | n | DUAL GATE | p |
| 131 | BOTTOM GATE | c | DUAL GATE | p |
| 132 | BOTTOM GATE | c | DUAL GATE | n |
| 133 | BOTTOM GATE | c | DUAL GATE | c |
| 134 | BOTTOM GATE | p | DUAL GATE | c |
| 135 | BOTTOM GATE | n | DUAL GATE | c |

FIG. 71

| No. | TFTS IN PERIPHERAL DRIVING CIRCUIT | | TFT IN DISPLAY SECTION | |
|---|---|---|---|---|
| | GATE STRUCTURE | CHANNEL CONDUCTIVE TYPE | GATE STRUCTURE | CHANNEL CONDUCTIVE TYPE |
| 136 | BOTTOM GATE | c + n | TOP GATE | p |
| 137 | BOTTOM GATE | c + n | TOP GATE | n |
| 138 | BOTTOM GATE | c + n | TOP GATE | c |
| 139 | BOTTOM GATE | c + p | TOP GATE | p |
| 140 | BOTTOM GATE | c + p | TOP GATE | n |
| 141 | BOTTOM GATE | c + p | TOP GATE | c |
| 142 | BOTTOM GATE | c + n + p | TOP GATE | p |
| 143 | BOTTOM GATE | c + n + p | TOP GATE | n |
| 144 | BOTTOM GATE | c + n + p | TOP GATE | c |
| 145 | BOTTOM GATE | c + n | BOTTOM GATE | p |
| 146 | BOTTOM GATE | c + n | BOTTOM GATE | n |
| 147 | BOTTOM GATE | c + n | BOTTOM GATE | c |
| 148 | BOTTOM GATE | c + p | BOTTOM GATE | p |
| 149 | BOTTOM GATE | c + p | BOTTOM GATE | n |
| 150 | BOTTOM GATE | c + p | BOTTOM GATE | c |
| 151 | BOTTOM GATE | c + n + p | BOTTOM GATE | p |
| 152 | BOTTOM GATE | c + n + p | BOTTOM GATE | n |
| 153 | BOTTOM GATE | c + n + p | BOTTOM GATE | c |
| 154 | BOTTOM GATE | c + n | DUAL GATE | p |
| 155 | BOTTOM GATE | c + n | DUAL GATE | n |
| 156 | BOTTOM GATE | c + n | DUAL GATE | c |
| 157 | BOTTOM GATE | c + p | DUAL GATE | p |
| 158 | BOTTOM GATE | c + p | DUAL GATE | n |
| 159 | BOTTOM GATE | c + p | DUAL GATE | c |
| 160 | BOTTOM GATE | c + n + p | DUAL GATE | p |
| 161 | BOTTOM GATE | c + n + p | DUAL GATE | n |
| 162 | BOTTOM GATE | c + n + p | DUAL GATE | c |

FIG. 72

| No. | TFTS IN PERIPHERAL DRIVING CIRCUIT | | TFT IN DISPLAY SECTION | |
|---|---|---|---|---|
| | GATE STRUCTURE | CHANNEL CONDUCTIVE TYPE | GATE STRUCTURE | CHANNEL CONDUCTIVE TYPE |
| 163 | BOTTOM GATE | p | TOP GATE | p |
| 164 | BOTTOM GATE | p | TOP GATE | n |
| 165 | BOTTOM GATE | n | TOP GATE | n |
| 166 | BOTTOM GATE | n | TOP GATE | p |
| 167 | BOTTOM GATE | c | TOP GATE | p |
| 168 | BOTTOM GATE | c | TOP GATE | n |
| 169 | BOTTOM GATE | c | TOP GATE | c |
| 170 | BOTTOM GATE | p | TOP GATE | c |
| 171 | BOTTOM GATE | n | TOP GATE | c |
| 172 | BOTTOM GATE | p | BOTTOM GATE | p |
| 173 | BOTTOM GATE | p | BOTTOM GATE | n |
| 174 | BOTTOM GATE | n | BOTTOM GATE | n |
| 175 | BOTTOM GATE | n | BOTTOM GATE | p |
| 176 | BOTTOM GATE | c | BOTTOM GATE | p |
| 177 | BOTTOM GATE | c | BOTTOM GATE | n |
| 178 | BOTTOM GATE | c | BOTTOM GATE | c |
| 179 | BOTTOM GATE | p | BOTTOM GATE | c |
| 180 | BOTTOM GATE | n | BOTTOM GATE | c |
| 181 | BOTTOM GATE | p | DUAL GATE | p |
| 182 | BOTTOM GATE | p | DUAL GATE | n |
| 183 | BOTTOM GATE | n | DUAL GATE | n |
| 184 | BOTTOM GATE | n | DUAL GATE | p |
| 185 | BOTTOM GATE | c | DUAL GATE | p |
| 186 | BOTTOM GATE | c | DUAL GATE | n |
| 187 | BOTTOM GATE | c | DUAL GATE | c |
| 188 | BOTTOM GATE | p | DUAL GATE | c |
| 189 | BOTTOM GATE | n | DUAL GATE | c |

FIG. 73

| No. | TFTS IN PERIPHERAL DRIVING CIRCUIT | | TFT IN DISPLAY SECTION | |
|---|---|---|---|---|
| | GATE STRUCTURE | CHANNEL CONDUCTIVE TYPE | GATE STRUCTURE | CHANNEL CONDUCTIVE TYPE |
| 190 | BOTTOM GATE | c + n | TOP GATE | p |
| 191 | BOTTOM GATE | c + n | TOP GATE | n |
| 192 | BOTTOM GATE | c + n | TOP GATE | c |
| 193 | BOTTOM GATE | c + p | TOP GATE | p |
| 194 | BOTTOM GATE | c + p | TOP GATE | n |
| 195 | BOTTOM GATE | c + p | TOP GATE | c |
| 196 | BOTTOM GATE | c + n + p | TOP GATE | p |
| 197 | BOTTOM GATE | c + n + p | TOP GATE | n |
| 198 | BOTTOM GATE | c + n + p | TOP GATE | c |
| 199 | BOTTOM GATE | c + n | BOTTOM GATE | p |
| 200 | BOTTOM GATE | c + n | BOTTOM GATE | n |
| 201 | BOTTOM GATE | c + n | BOTTOM GATE | c |
| 202 | BOTTOM GATE | c + p | BOTTOM GATE | p |
| 203 | BOTTOM GATE | c + p | BOTTOM GATE | n |
| 204 | BOTTOM GATE | c + p | BOTTOM GATE | c |
| 205 | BOTTOM GATE | c + n + p | BOTTOM GATE | p |
| 206 | BOTTOM GATE | c + n + p | BOTTOM GATE | n |
| 207 | BOTTOM GATE | c + n + p | BOTTOM GATE | c |
| 208 | BOTTOM GATE | c + n | DUAL GATE | p |
| 209 | BOTTOM GATE | c + n | DUAL GATE | n |
| 210 | BOTTOM GATE | c + n | DUAL GATE | c |
| 211 | BOTTOM GATE | c + p | DUAL GATE | p |
| 212 | BOTTOM GATE | c + p | DUAL GATE | n |
| 213 | BOTTOM GATE | c + p | DUAL GATE | c |
| 214 | BOTTOM GATE | c + n + p | DUAL GATE | p |
| 215 | BOTTOM GATE | c + n + p | DUAL GATE | n |
| 216 | BOTTOM GATE | c + n + p | DUAL GATE | c |

FIG. 75

| TYPE OF SILICON OF MOS TFT | TYPE OF MOS TFT ||
|---|---|---|
| | PERIPHERAL DRIVING CIRCUIT SECTION | DISPLAY SECTION |
| SINNGLE-CRYSTAL | cMOS OR n OR pMOS OR cMOS + pMOS + nMOS | n OR pMOS OR cMOS |
| POLY-CRYSTALLINE | cMOS OR n OR pMOS OR cMOS + pMOS + nMOS | n OR pMOS OR cMOS |
| AMORPHOUS | — | n OR pMOS OR cMOS |

SINGLE-CRYSTAL
SILICON MOS TFT

ELECTROOPTICAL DEVICE, SUBSTRATE FOR DRIVING ELECTROOPTICAL DEVICE AND METHODS FOR MAKING THE SAME

RELATED APPLICATION DATA

The present application claims priority to Japanese Application No. P10-267920 filed Sep. 22,1998 and Japanese Application No. P10-277798 filed Sep. 30,1998 which applications are incorporated herein by reference to the extent permitted by law.

BACKGROUND OF THE INVENTION

1. Field of the Invention

The present invention relates to electrooptical devices, substrates for driving the electrooptical devices and methods for making the electrooptical devices and the substrates. In particular, the present invention relates to a configuration having an active region of a bottom-gate-type thin-film insulating-gate field-effect transistor (hereinafter referred to as bottom-gate-type MOSTFT) using a single-crystal silicon layer, grown by heteroepitaxy on an insulating substrate, and a passive region. Herein, the bottom-gate types include an inverted NSI stagger type and an inverted ISI type. This configuration is suitable for liquid crystal displays etc.

2. Description of the Related Art

Various types of active-matrix liquid crystal displays are known. For example, a liquid crystal display has a display region using amorphous silicon for TFTs and ICs for external driving circuits. Another type of liquid crystal display integrates a display section using solid phase deposition polycrystalline silicon TFTs and driving circuits, as disclosed in Japanese Patent Application Laid-Open No. 6-242433. Integration of a display section using excimer laser annealing polycrystalline silicon TFTs and driving circuits is also known in Japanese Patent Application Laid-Open No. 7-131030.

Although conventional amorphous silicon TFTs have high productivity, they are not suitable for production of p-channel MOSTFTs (hereinafter referred to as pMOSTFTs) due to a low electron mobility of 0.5 to 1.0 $cm^2$/v·sec. Since a peripheral driving section using pMOSTFTs and a display section cannot be formed on the same substrate, the driver IC should be an external component, which is mounted by, for example, a tape automated bonding (TAB) method, which has high production costs. This configuration inhibits production of high-resolution devices. Furthermore, the small electron mobility, as described above, causes a small ON current; hence, the size of the transistors in the display section is inevitably large, resulting in a small aperture ratio of pixels.

Conventional polycrystalline silicon TFTs have an electron mobility of 70 to 100 $cm^2$/v·sec and can facilitate production of high-resolution devices. Thus, liquid crystal displays (LCDS) which use polycrystalline silicon and are integrated with driving circuits have attracted attention. The above electron mobility, however, is insufficient for driving a large LCD of 15 inches or more, and thus ICs for an external driving circuit are required.

TFTs using polycrystalline silicon formed by a solid-phase deposition process require annealing at a temperature of 600° C. or more for several tens of hours and thermal oxidation at approximately 1,000° C. to from a gate $SiO_2$ layer. Thus, the production of such TFTs requires using a semiconductor production system. Thus, the wafer size is limited to 8 to 12 inches and the use of expensive heat-resistant quartz glass is inevitable, resulting in high production cost. Thus, the use of such TFTs is limited to electronic viewfinders (EVF) and audiovisual (AV) projectors.

Polycrystalline silicon TFTs produced by excimer laser annealing have many problems, including unstable output of the excimer lasers, low productivity, increasing price of the apparatus with increasing size, low yield and low quality. These problems are pronounced when large glass substrates having a side of, for example, 1 meter are used.

SUMMARY OF THE INVENTION

It is an object of the present invention to provide an integrated display panel configuration of a display section and a peripheral driving circuit having high image quality, high resolution, a narrow peripheral frame, high efficiency and a large screen.

It is another object of the present invention to provide an integrated display panel configuration capable of using a large glass substrate having a relatively low distortion point, which is produced with high efficiency, and which does not require expensive production facilities.

It is another object of the present invention to provide an integrated display panel configuration enabling easy adjustment of the threshold voltage of the device, which has low resistance capable of high speed operation, and having a large screen.

Each of an electrooptical device and a driving substrate for the electrooptical device includes a first substrate (substrate for drive) having a display section provided with pixel electrodes and a peripheral-driving-circuit section provided on the periphery of the display section, a second substrate (counter substrate), and an optical material disposed between the first substrate and the second substrate. A gate section including a gate electrode and a gate-insulating film is formed on one surface of the first substrate, a compound layer having high lattice matching with single-crystal silicon is formed on the surface of the first substrate, and a single-crystal silicon layer is formed on the first substrate including the compound layer and the gate section. The single-crystal silicon layer constitutes a channel region, a source region, and a drain region. In addition, a first bottom-gate thin-film transistor having the gate section is formed below the channel region, the first bottom-gate thin-film transistor constituting at least a part of the peripheral-driving-circuit section.

The thin-film transistor in accordance with the present invention may be a field effect transistor (FET) or a bipolar transistor, and the field effect transistor may be a MOS type or a junction type.

Another aspect of the present invention is a method for making the electrooptical device or the driving substrate for the electrooptical device. The method includes a step for forming a gate section comprising a gate electrode and a gate-insulating film on one surface of the first substrate; a step forming a compound layer having high lattice matching with the single-crystal silicon on the surface of the first substrate; a deposition step for heteroepitaxially depositing a single-crystal silicon layer on the first substrate having the step and the gate section by a catalytic CVD process or a high-density plasma-enhanced CVD process using the compound layer as a seed; a step for treating the single-crystal silicon layer through a predetermined process to form a channel region, a source region and a drain region; and a step for forming a bottom-gate first thin-film transistor having the gate section below the channel region and constituting at least a part of the peripheral-driving-circuit section.

In accordance with the present invention, a single-crystal silicon layer is formed by heteroepitaxy on a substrate using a compound layer, such as a crystalline sapphire film, having high lattice matching with single crystal silicon, as a seed, by a catalytic CVD process or a high-density plasma-enhanced CVD process, and is used for bottom-gate MOSTFTs in a peripheral driving circuit of a driving substrate, such as an active-matrix substrate, and bottom-gate MOSTFTs in a peripheral driving circuit of an electrooptical device, such as a liquid crystal device (LCD) integrating a display section and the peripheral driving circuit. The following points (A) to (G) are advantages in the present invention. (A) A single-crystal silicon layer having a high electron mobility of 540 $cm^2$/v·sec or more is deposited by heteroepitaxy using a compound layer formed on a substrate as a seed having high lattice matching with the single crystal silicon. Thus, an electrooptical device, such as a display thin-film semiconductor device having a high-speed driver, can be produced.

(B) Since the single-crystal silicon layer has high electron and hole mobility comparable to a single-crystal silicon substrate, single-crystal silicon bottom-gate MOSTFTs can form an integrated configuration of a display section including nMOSTFTs, pMOSTFTs or cMOSTFTs having high switching characteristics and a lightly-doped drain (LDD) structure moderating the electric field intensity and the leakage current and a peripheral driving circuit including cMOSTFTs, nMOSTFTs, and/or pMOSTFTs having high driving characteristics. Such an integrated configuration facilitates production of a large display panel with high quality, high definition, a narrow frame, and high efficiency. Since the single-crystal silicon layer has high hole mobility, a peripheral driving circuit for driving electrons and holes independently or in combination can be provided and integrated with display TFTs of nMOS, pMOS or cMOS LDD-type. In a compact or medium panel, either of a pair of vertical peripheral driving circuits may be omitted.

(C) The single-crystal silicon layer can be formed on the compound layer as a seed for heteroepitaxy by a low-temperature film deposition process, such as a catalytic CVD process at a substrate temperature of 200 to 800° C. and particularly 300 to 400° C. Thus, the single-crystal silicon layer can be uniformly formed on the substrate, and a glass substrate or an organic substrate, which is inexpensive and has a low distortion point, excellent properties and a large size, can be used.

(D) The method in accordance with the present invention does not include annealing at a middle temperature (approximately 600° C.) for several ten hours or excimer laser annealing and an expensive production facility. Thus, the method has high productivity with low production costs.

(E) In the heteroepitaxy in the present invention, a single-crystal silicon layer having a variety of P- or N-type conductivity types and high mobility can be readily produced by adjusting the crystallinity of the compound layer such as the crystalline sapphire layer, the ratio of gases in the catalytic CVD process, and the heating temperature and the cooling rate of the substrate. Thus, the threshold voltage (Vth) of the device can be readily controlled and the device can operate at a high rate due to reduced resistance.

(F) When the single-crystal silicon layer is deposited by the catalytic CVD, the layer is doped with an adequate amount of Group III or V impurity, such as boron, phosphorus, antimony, arsenic, bismuth or aluminum, so that the type and the concentration of the impurity in the epitaxial single-crystal silicon, that is, the type (P-type or N-type) and the carrier concentration are controlled without limitation.

(G) The compound layer such as the crystalline sapphire layer functions as a diffusion barrier against various atoms and can suppress diffusion of impurities from the glass substrate.

BRIEF DESCRIPTION OF THE DRAWINGS

FIGS. 1A to 1C are cross-sectional views showing production steps of a liquid crystal display (LCD) in accordance with a first embodiment of the present invention;

FIGS. 2A to 2D are cross-sectional views showing the subsequent production steps of the LCD in accordance with the first embodiment of the present invention;

FIGS. 3A to 3C are cross-sectional views showing the subsequent production steps of the LCD in accordance with the first embodiment of the present invention;

FIGS. 5A to 5C are cross-sectional views showing the subsequent production steps of the LCD in accordance with the first embodiment of the present invention;

FIGS. 6A to 6C are cross-sectional views showing the subsequent production steps of the LCD in accordance with the first embodiment of the present invention;

FIG. 13 is an outline view showing a configuration of the LCD in accordance with the first embodiment of the present invention;

FIGS. 17A to 17C are cross-sectional views showing main sections of LCDs in accordance with a third embodiment of the present invention;

FIGS. 23A to 23D are cross-sectional views showing production steps of a LCD in accordance with the third embodiment of the present invention;

FIGS. 26A and 26B are cross-sectional views showing production steps of a LCD in accordance with a fourth embodiment of the present invention;

FIGS. 29A and 29B are cross-sectional views showing production steps of a LCD in accordance with a fourth embodiment of the present invention;

FIGS. 30A to 30C are cross-sectional views showing the subsequent production steps of the LCD in accordance with the fourth embodiment of the present invention;

FIGS. 33A to 33E are cross-sectional views of main section of the LCD in the production steps in accordance with the fourth embodiment;

FIG. 37 is a plan view and a cross-sectional view, respectively, of a main section of a LCD in accordance with a sixth embodiment of the present invention;

FIGS. 41A to 41C are cross-sectional views showing production steps of a LCD in accordance with an eighth embodiment of the present invention;

FIGS. 42A to 42C are cross-sectional views showing the subsequent production steps of the LCD in accordance with the eighth embodiment of the present invention;

FIGS. 43A to 43C are cross-sectional views showing the subsequent production steps of the LCD in accordance with the eighth embodiment of the present invention;

FIGS. 44A to 44C are cross-sectional views showing the subsequent production steps of the LCD in accordance with the eighth embodiment of the present invention;

FIGS. 45A to 45C are cross-sectional views showing the subsequent production steps of the LCD in accordance with the eighth embodiment of the present invention;

FIGS. 55A to 55D are cross-sectional views showing the subsequent production steps of the LCD in accordance with the tenth embodiment;

FIGS. 60A and 60B are cross-sectional views showing production steps of a LCD in accordance with an eleventh embodiment of the present invention;

FIGS. 61A to 61C are cross-sectional views showing the subsequent production steps of the LCD in accordance with the eleventh embodiment;

FIG. 63 is a cross-sectional view and a plan view, respectively, of a main section of a LCD in accordance with a twelfth embodiment of the present invention;

FIG. 65 is a table showing combinations of TFTs in a display section and a peripheral-driving-circuit section of a LCD in accordance with a thirteenth embodiment of the present invention;

FIG. 66 is a table showing combinations of TFTs in the display section and the peripheral-driving-circuit section of the LCD in accordance with the thirteenth embodiment of the present invention;

FIG. 67 is a table showing combinations of TFTs in the display section and the peripheral-driving-circuit section of the LCD in accordance with the thirteenth embodiment of the present invention;

FIG. 68 is a table showing combinations of TFTs in the display section and the peripheral-driving-circuit section of the LCD in accordance with the thirteenth embodiment of the present invention;

FIG. 69 is a table showing combinations of TFTs in the display section and the peripheral-driving-circuit section of the LCD in accordance with the thirteenth embodiment of the present invention;

FIG. 70 is a table showing combinations of TFTs in the display section and the peripheral-driving-circuit section of the LCD in accordance with the thirteenth embodiment of the present invention;

FIG. 71 is a table showing combinations of TFTs in the display section and the peripheral-driving-circuit section of the LCD in accordance with the thirteenth embodiment of the present invention;

FIG. 72 is a table showing combinations of TFTs in the display section and the peripheral-driving-circuit section of the LCD in accordance with the thirteenth embodiment of the present invention;

FIG. 73 is a table showing combinations of TFTs in the. display section and the peripheral-driving-circuit section of the LCD in accordance with the thirteenth embodiment of the present invention;

FIG. 75 is a table showing combinations of TFTs in the display section and the peripheral-driving-circuit section of the LCD in accordance with the thirteenth embodiment of the present invention;

DESCRIPTION OF THE PREFERRED EMBODIMENTS

Figure 4A:
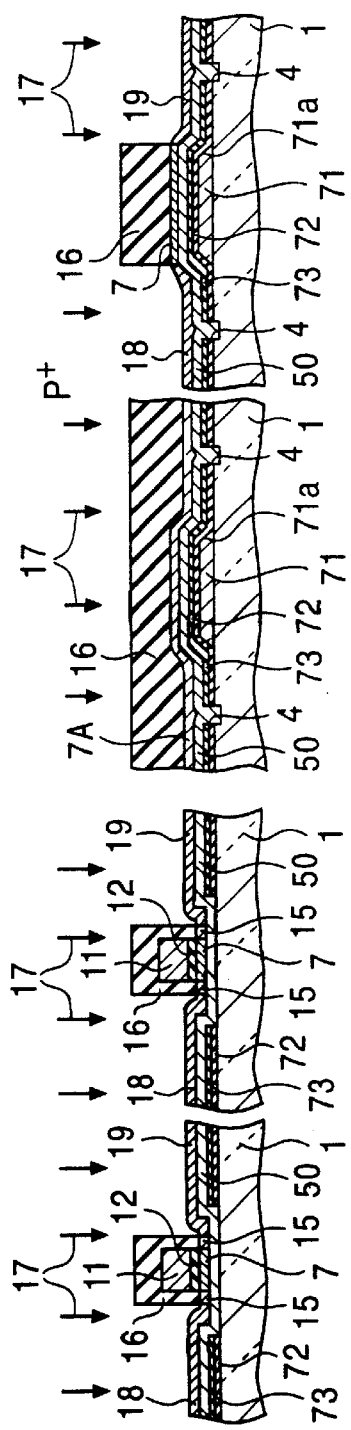
FIGS. 4A to 4C are cross-sectional views showing the subsequent production steps of the LCD in accordance with the first embodiment of the present invention.

In the present invention, the single crystal silicon layer is preferably treated to form a channel region, a source region and a drain region so that the bottom-gate first thin film transistor having a gate section on the channel region constitutes at least a part of the peripheral-driving-circuit section.

An insulating substrate is used as the first substrate. The compound layer comprises a compound selected from the group consisting of sapphire ($Al_2O_3$), a spinel-type compound (for example, $MgO \cdot Al_2O_3$), calcium fluoride ($CaF_2$), strontium fluoride ($SrF_2$), barium fluoride ($BaF_2$), boron phosphide (BP), and yttrium oxide (($Y_2O_3$)m)-zirconium oxide (($ZrO_2$)$_{1-m}$).

The single-crystal silicon layer can be a catalytic CVD process using the compound layer as a seed at a substrate temperature of 200 to 800° C. The entire substrate may be uniformly heated using an electrical furnace or a lamp, or a part of the substrate may be locally heated by a laser beam or an electron beam.

In the catalytic CVD process, the single-crystal silicon layer is preferably deposited on the substrate by catalytic decomposition of a silicon hydride gas as the major component using a catalyst heated to a temperature lower than the melting point of the silicon, for example, 800 to 2,000° C.

The silicon hydride gas may be silane, such as monosilane, disilane, trisilane or tetrasilane. The catalyst may be at least one selected from the group consisting of tungsten, thorium-oxide-containing tungsten, molybdenum, platinum, palladium, silicon, alumina, metallized ceramic, and silicon carbide.

In the present invention, an insulating substrate and particularly a glass substrate having a low distortion point or a heat-resistant organic substrate can be used as the substrate. Thus, a single-crystal silicon layer can be formed on a large glass substrate having an area of, for example, 1 $m^2$. Since the substrate temperature in the catalytic CVD process is low as described above, a glass having a low distortion point of 470 to 670° C. can be used as the glass substrate. Such a substrate is inexpensive and a long thin substrate can be readily prepared. A single-crystal silicon thin-film can be formed continuously or discontinuously on the long glass or organic substrate by heteroepitaxy.

Since the components of the glass having the low distortion point rapidly diffuse into the upper layer, a thin diffusion-barrier layer composed of, for example, silicon nitride (SiN) having a thickness of 50 to 200 nm is preferably formed to suppress such diffusion.

In the catalytic CVD process, the gas may contain a doping gas, such as phosphorus hydride ($PH_3$) or boron hydride ($B_2H_6$) to dope the single-crystal silicon layer to an n or p type, respectively, and thus to form nMOSTFTs or pMOSTFTs, respectively. Furthermore, this process can produce cMOSTFTs.

As described above, the single-crystal silicon layer deposited by heteroepitaxy on the substrate can be applied to channel regions, source regions, and drain regions of bottom-gate MOSTFTs constituting at least parts of the peripheral driving circuit. The types and concentrations of impurities in these regions are controlled.

Thin-film transistors in the peripheral-driving-circuit section and the display section may constitute n-channel, p-channel or complementary insulating-gate field-effect transistors. For example, thin-film transistors may comprise a combination of a complementary type and an n-channel type, a complementary type and a p-channel type, or a complementary type, an n-channel type and a p-channel type. At least a part of the thin-film transistors in the peripheral-driving-circuit section and the display section preferably has a single lightly-doped drain (LDD) structure between the gate and the drain. The single LDD structure may be provided between the gate and the source, or a double LDD structure may be between the gate and the source and between the gate and the drain.

Preferably, the MOSTFT constitutes a LDD-type TFT of an nMOS, a pMOS or a cMOS in the display section, and a cMOSTFT, an nMOSTFT, a pMOSTFT, or a mixture thereof, in the peripheral-driving-circuit section.

In the present invention, a step is preferably formed on the insulating substrate and/or the SiN film provided thereon. The step forms an indented section having a cross-section in which a side face is perpendicular to or slanted to the bottom face so as to have a basilar angle of preferably 90° or less. Preferably, the step functions as a seed for epitaxy of the single-crystal silicon layer. Preferably, the step is formed along at least one side of a device region including the channel region, the source region and the drain region of the active device, such as the first thin-film transistor. Alternatively, the step may be formed along at least one side of a device region including the passive device, for example, a resistor when the resistor is formed of the single-crystal silicon layer.

In this case, the compound layer may be formed on the insulating substrate having the step of the given shape which is formed at the given position as the seed of epitaxy. Alternatively, a step having a given shape may be formed on the compound layer and the single-crystal silicon layer may be formed on the compound layer having the step. Since the step, in addition to the compound layer, functions as a seed, the resulting single-crystal silicon layer has higher crystallinity.

The first thin-film transistor such as MOSTFT may be formed on the interior and/or the exterior of the indented section of the substrate. The step may be formed by a dry etching process, such as a reactive ion etching process.

In the present invention, the second thin film transistor may be a top-gate, bottom-gate or dual-gate type which has a channel region, a source region and a drain region formed of a single-crystal, polycrystalline or amorphous silicon layer formed on the substrate having the step, and which has a gate section above and/or below the channel region. Also, the step has a cross-section in which a side face is perpendicular to or slanted to the bottom face so as to have a basilar angle of preferably 90° or less, and functions as a seed for epitaxy of the single-crystal silicon layer. The second thin-film transistor may be formed on the interior and/or the exterior of the indented section of the substrate. The source, drain and channel regions may be formed of the single-crystal silicon layer formed by graphoepitaxy, as in the first thin-film transistor.

Also, in the second thin-film transistor, the types and the concentrations of Group III or V impurities in the single-crystal, polycrystalline or polycrystalline layer may be control. Furthermore, the step may be formed along at least one side of a device region including the channel region, the source region and the drain region. Preferably, the gate electrode below the single-crystal, polycrystalline, or amorphous silicon layer is trapezoidal. A diffusion-barrier layer may be provided between the first substrate and the single-crystal, polycrystalline or amorphous silicon layer.

The source or drain electrodes of the first and/or second thin film transistors are preferably formed on the region including the steps.

The first thin-film transistor may comprise at least the bottom-gate type among a top-gate type having a gate section above the channel region, a bottom-gate type having a gate section below the channel region, and a dual-gate type having one gate section above and one below the channel region, and the switching device for switching the pixel electrodes in the display section may comprise one of a top-gate second thin-film transistor, a bottom-gate second thin-film transistor and a dual-gate second thin-film transistor. In such a case the gate electrode provided below the channel region may be formed of a heat resistant material, or the upper-gate electrode of the second thin-film transistor and the gate electrode of the first thin-film transistor may be composed of a common material.

The peripheral-driving-circuit section may further comprises at least one of a top-gate, bottom-gate or dual-gate thin-film transistor having a channel region of a polycrystalline or amorphous silicon layer and a gate region formed above and/or below the channel region, and may comprise a diode, a resistor, a capacitor and an inductor, each comprising a single-crystal, polycrystalline or amorphous silicon layer.

Thin-film transistors in the peripheral driving circuit and/or the display section have a single-gate or a multi-gate configuration.

When each n- or p-channel thin-film transistor in the peripheral-driving-circuit section and the display section is a dual-gate type, the upper- or lower-gate electrode is electrically opened or a given negative voltage for the n-channel type or a given positive voltage for the p-channel type is applied so that the dual-gate type thin-film transistors operate as bottom- or bottom-gate type thin-film transistors.

The thin-film transistor in the peripheral-driving-circuit section may be the first thin-film transistor of an n-channel, p-channel or complementary type, and the thin-film transistor in the display section may be an n-channel, p-channel or complementary type when the channel region is a single-crystal silicon layer, a polycrystalline silicon layer, or an amorphous silicon layer.

In a preferred embodiment, the single-crystal silicon layer is deposited, an upper-gate section including a gate insulating film and a gate electrode is formed on the single-crystal silicon layer, and then the single-crystal silicon layer is doped with a Group III or V impurity through the upper-gate section as a mask to form the channel region, the source region and the drain region.

When the second thin-film transistor is a bottom-gate type or a dual-gate type, a lower-gate electrode composed of a heat resistant material is provided below the channel region, and a gate insulating film is formed on the gate electrode to form a lower-gate section, and the second thin-film transistor is formed by the same production steps including the step for forming the step (indented section) as those in the first thin-film transistor. In such a case, the upper-gate electrode of the second thin-film transistor and the gate electrode of the first thin-film transistor may be composed of a common material.

The single-crystal silicon layer formed on the lower-gate section may be doped with a Group III or V impurity to form a source region and a drain region and may be subjected to activation treatment.

Alternatively, the source and drain regions of the second thin-film transistor may be formed by ion-implantation of the above impurity on the single-crystal silicon layer through a resist mask and may be subjected to activation treatment, and then the upper-gate electrode of the second thin-film transistor may be formed after the formation of the gate insulating film.

When the second thin-film transistor is a top-gate type, the source and drain regions of the first and second thin-film transistors may be formed on the single-crystal silicon layer by ion implantation of the impurity through a resist mask and may be subjected to activation treatment, and then the gate sections including the gate insulating film and the gate electrode of the second thin-film transistor may be formed.

Alternatively, when the second thin-film transistor is a top-gate type, the gate section including the gate insulating film and the gate electrode composed of a heat resistant material of the second thin-film transistor may be formed on the single-crystal silicon layer, and then the source and drain regions of the first and second thin-film transistors may be formed by ion implantation of the impurity through a resist mask and may be subjected to activation treatment.

The remaining resist mask used when the LDD structure is formed may be used when ion implantation for forming the source and drain regions is performed.

The substrate may be optically opaque or transparent, and may be provided with pixel electrodes for a reflective or transmissive display.

The display section has a lamination configuration of the pixel electrodes and a color filter layer and the color filter is formed on the display array section. Thus, the aperture ratio and the luminance are improved and costs can be decreased due to omission of a color filter substrate and improved productivity.

When the pixel electrodes are reflective electrodes, unevenness is preferably imparted to a resin film so that the resin film has optimized reflective characteristics and viewing-angle characteristics, and then the pixel electrodes are formed. When the pixel electrodes are transparent electrodes, the surface is preferably planarized by a transparent planarization film and then the pixel electrodes are formed on the planarized plane.

The display section is illuminated or dimmed by driving the above-described MOSTFTs. The display section may comprise, for example, a liquid crystal display (LCD), an electroluminescent (EL) display, a field emission display (FED), a light-emitting polymer display (LEPD), or a light-emitting diode (LED) display. In this case, a plurality of pixel electrodes is arranged in a matrix in the display section and a switching device is connected to each pixel electrode.

The present invention will now be described in more detail with reference to the following preferred embodiments.

First Embodiment

FIG. 1A to FIG. 13 show a first embodiment of the present invention.

Figure 11:
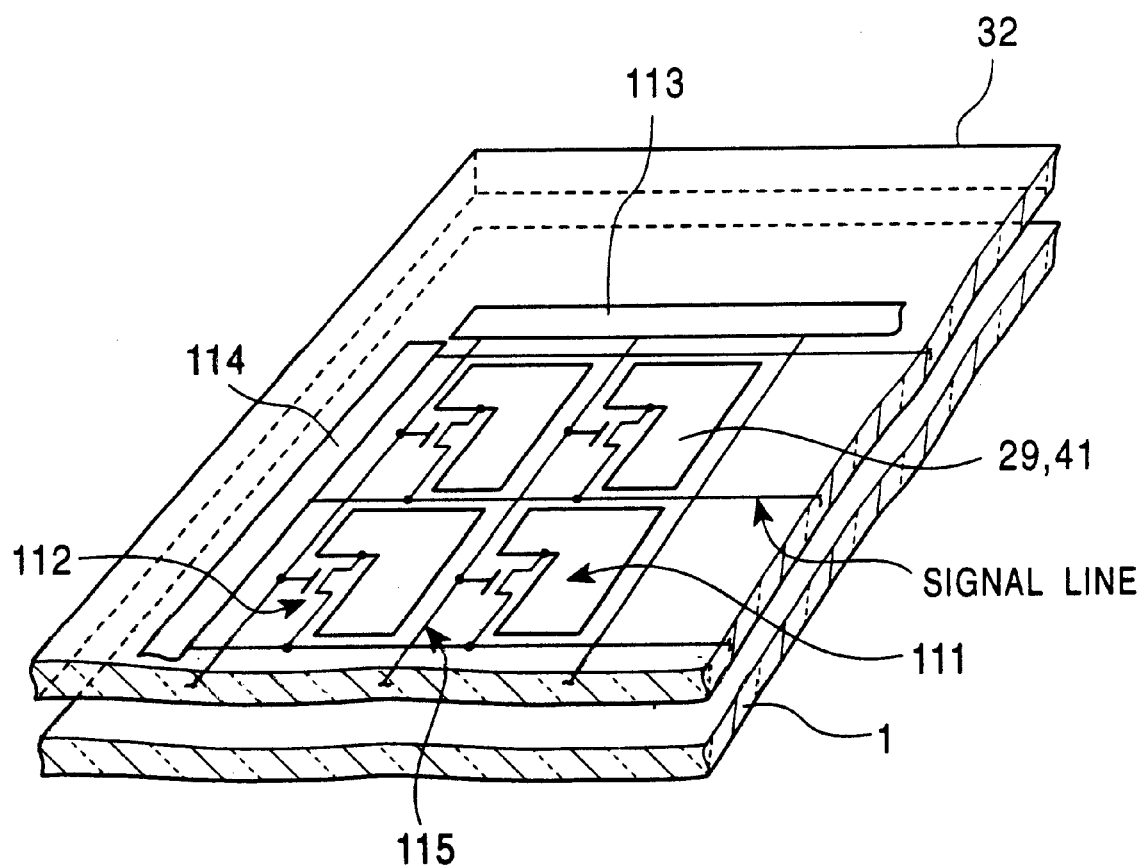
FIG. 11 is an outlined isometric view of a LCD in accordance with a first embodiment of the present invention.
Figure 12:
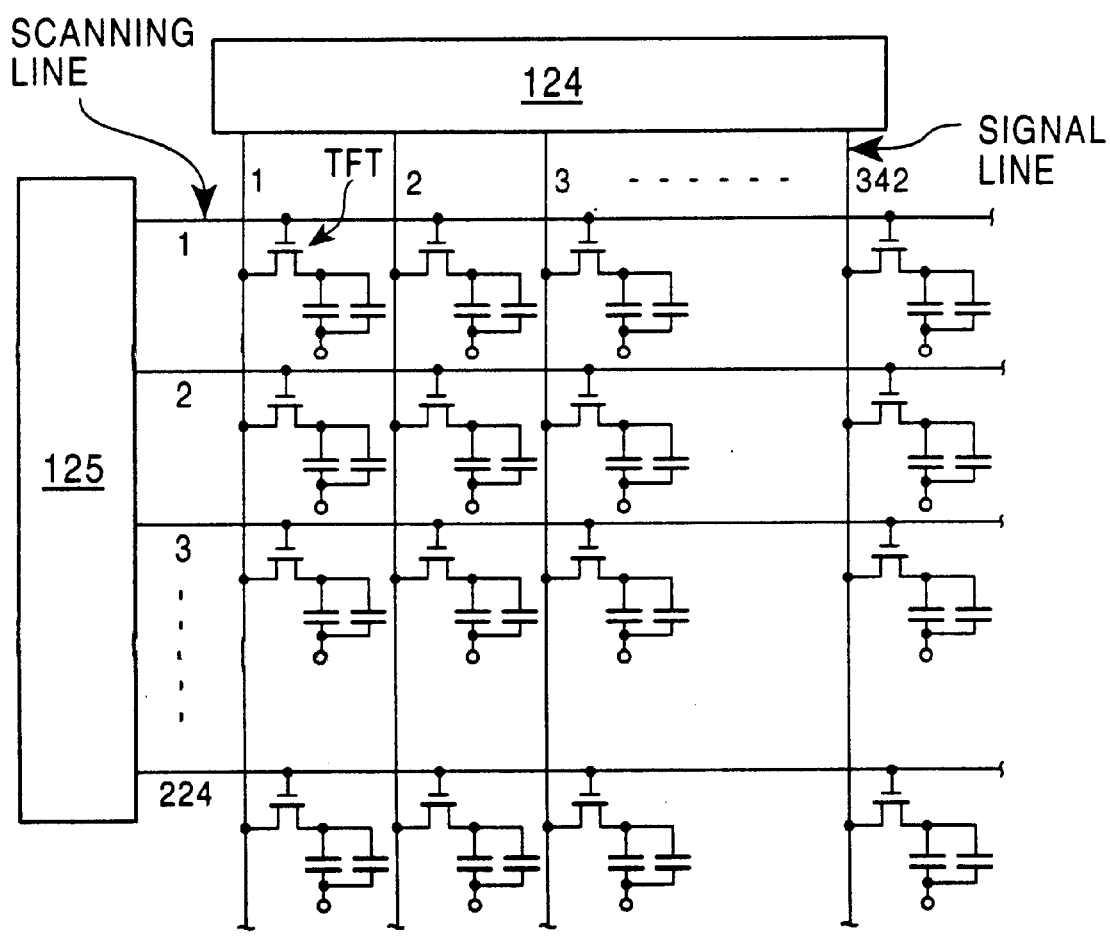
FIG. 12 is an equivalent circuit diagram of the LCD in accordance with the first embodiment of the present invention.

The first embodiment relates to an active-matrix reflective liquid crystal display (LCD) having bottom-gate MOSTFTs formed of a single-crystal silicon layer which is formed by heteroepitaxy on a compound layer as a seed, such as a crystalline sapphire layer. The compound layer is formed on a step or indented section provided on a substrate. FIGS. 11 to 13 show an overall layout of the reflective LCD.

With reference to FIG. 11, the active-matrix reflective LCD has a flat panel configuration including a main substrate 1 (active-matrix substrate) and a counter substrate 32 which are bonded to each other with a spacer provided therebetween (not shown in the drawing). A space between the main substrate 1 and the counter substrate 32 is filled with a liquid crystal (not shown in the drawing). A display section 111 including pixel electrodes 29 or 41 arranged in a matrix and switching devices 112 for driving the pixel electrodes. A vertical peripheral-driving-circuit section 113 and a horizontal peripheral-driving-circuit section 114 connected to the display section 111 are also provided on the main substrate 1. In the drawing numeral 115 represents a gate bus line or a scanning line.

Each switching device in the display section is composed of an nMOS, pMOS, or CMOS top-gate TFT having a LDD structure in accordance with the present invention. In the peripheral-driving-circuit sections 113 and 114, cMOS, nMOS and/or pMOS bottom-gate TFTs in accordance with the present invention are formed as circuit components. The horizontal peripheral-driving-circuit section 114 includes a H shift register 124 for supplying data signals, which drive TFTs of pixels in a data bus line or signal line, and the vertical peripheral-driving-circuit section 115 includes a V shift register 125 for driving the gates of the TFTs of the pixels in a gate bus line or a scanning line. The horizontal and vertical driving circuits are typically provided on two sides of the display section. The driving circuits may be a dot-sequential analog type or a line-sequential digital type.

With reference to FIG. 12, the TFTs are arranged at intersections of gate bus lines and orthogonal data bus lines. The TFTs write image information into liquid crystal capacitors ($C_{LC}$) and the charge in the liquid crystal capacitors is retained until the next information is written. Since the channel resistance of each TFT is not sufficient to retain the information, a storage or auxiliary capacitor ($C_s$) is provided in parallel to the liquid crystal capacitor to suppress a decreased voltage due to a leakage current. Characteristics required for TFTs used in the pixel or display region are different from characteristics required for TFTs used in the peripheral driving circuits. An important property of the TFTs in the pixel region is to control an OFF current and to retain an ON current. Providing TFTs having a LDD structure in the display section can reduce an electric field between the gate and the drain and thus reduce the effective electric field applied to the channel region, the OFF current and a change in characteristics. The production process, however, is complicated, the size of the device is inevitably increased, and the ON current is decreased. Thus, the design must be optimized to meet the purpose.

Among the usable liquid crystals are TN liquid crystals (nematic liquid crystals used in a TN mode of active-matrix driving), super-twisted nematic (STN) liquid crystals, guest-host (GH) liquid crystals, phase change (PC) liquid crystals, ferroelectric liquid crystals (FLCs), antiferroelectric liquid crystals (AFLCs), and polymer dispersion-type liquid crystals (PDLCs).

With reference to FIG. 13, the system of and the method for driving the peripheral driving circuits will now be described. The driving circuits include a gate driving circuit 115 and a data driving circuit 114. These driving circuits have shift registers 125 and 124. Each shift resistor generally may be a CMOS circuit including both pMOSTFTs and nMOSTFTs or may be a circuit including either pMOSTFTs or nMOSTFTs. A circuit generally used is a cMOSTFT or CMOS circuit in view of the operational speed, reliability, and low power consumption.

The scanning driving circuit includes shift registers and buffers and supplies pulses to lines in synchronism with a horizontal scanning period. The data driving circuit may be a dot-sequential driving system or a line-sequential driving system. The dot-sequential driving system shown in the drawing has a relatively simplified configuration and writes display signals directly into pixels through analog switches under control of the shift registers. The signals are sequentially written into pixels in a line within a scanning time for the line (R, G and B in the drawing schematically represent red, green and blue pixels).

With reference to FIG. 1A to FIG. 10F, the active-matrix reflective LCD in this embodiment will be described based on the production steps. In FIGS. 1A to 6C, the left side of each drawing shows the production step of the display section and the right side shows the production step of the peripheral-driving-circuit section.

With reference to FIG. 1A (STEP 1), a sputtering film 71 of a molybdenum-tantalum (Mo—Ta) alloy with a thickness of 500 to 600 nm is formed on a main surface of an insulating substrate 1 of borosilicate glass, quartz glass, or a transparent crystalline glass.

With reference to FIG. 1B (STEP 2), a photoresist 70 having a given pattern is formed thereon and then the Mo—Ta film is subjected to taper etching using the photoresist as a mask to form a trapezoidal gate electrode 71 having side faces 71a which has a gentle slope of 20 to 45 degrees.

With reference to FIG. 1C (STEP 3), the photoresist 70 is removed, and a SiN film 72 with a thickness of approximately 100 nm and then a $SiO_2$ film 73 with a thickness of approximately 200 nm are deposited on the entire substrate 1 including the Mo—Ta film 71 by a plasma enhanced CVD process to form a gate insulating film.

With reference to FIG. 2A (STEP 4), a photoresist 2 having a given pattern is formed at least in a TFT-forming region, and the substrate 1 is irradiated with, for example, F⁻ions 3 from $CF_4$ plasma through the photoresist as a mask to form a plurality of steps 4 having a desired shape and a desired size on the gate insulating film and the substrate 1 by a general photolithographic or photoetching process, such as a reactive ion etching process.

The materials used as the insulating substrate include highly heat resistant materials, such as quartz glass, transparent crystalline glass, and ceramic. An opaque ceramic substrate and a lowly transparent crystalline glass cannot be used for transmissive LCDs described later. The insulating substrate generally has a diameter of 8 to 12 inches and a thickness of 700 to 800 nm. The steps 4 functions as seeds for heteroepitaxy of single-crystal silicon, as described below, and have a depth d of 0.1 to 0.4 μm, a width w of 2 to 10 μm, a length l (the direction perpendicular to the drawing) of 10 to 20 μm, and a basilar angle (between the bottom face and the side face) which is a right angle. In order to prevent diffusion of Na ions etc. from the glass substrate, a SIN film with a thickness of 50 to 200 nm and a silicon oxide (hereinafter $SiO_2$) film with a thickness of approximately 100 nm, if necessary, may be previously formed on the substrate 1.

With reference to FIG. 2B (STEP 5), the photoresist 2 is removed, and then a crystalline sapphire layer 50 with a thickness of 20 to 200 nm is formed at least in the TFT-forming region including the step 4. The crystalline sapphire film 50 may be formed by oxidation of gaseous trimethylaluminum with an acidic gas such as oxygen or moisture and then crystallization by a high-density plasma enhanced CVD process or a catalytic CVD process (disclosed in, for example, Japanese Patent Application Laid-Open No. 63-40314).

With reference to FIG. 2C (STEP 6), a single-crystal silicon film 7 with a thickness of several μm to 0.005 μm (typically 0.1 μ) is deposited by heteroepitaxy on the entire surface including the steps 4 by a catalytic CVD process disclosed, for example, in Japanese Patent Application Laid-Open No. 63-40314. Since the underlying gate electrode 71 has side faces 71a having a gentle slope, the single-crystal silicon layer 7 can be deposited without discontinuities at the steps 4. In STEP 6, the substrate temperature is generally 200 to 600° C. when the substrate 1 is composed of borosilicate glass or 600 to 800° C. when the substrate 1 is ceramic.

Figure 8:
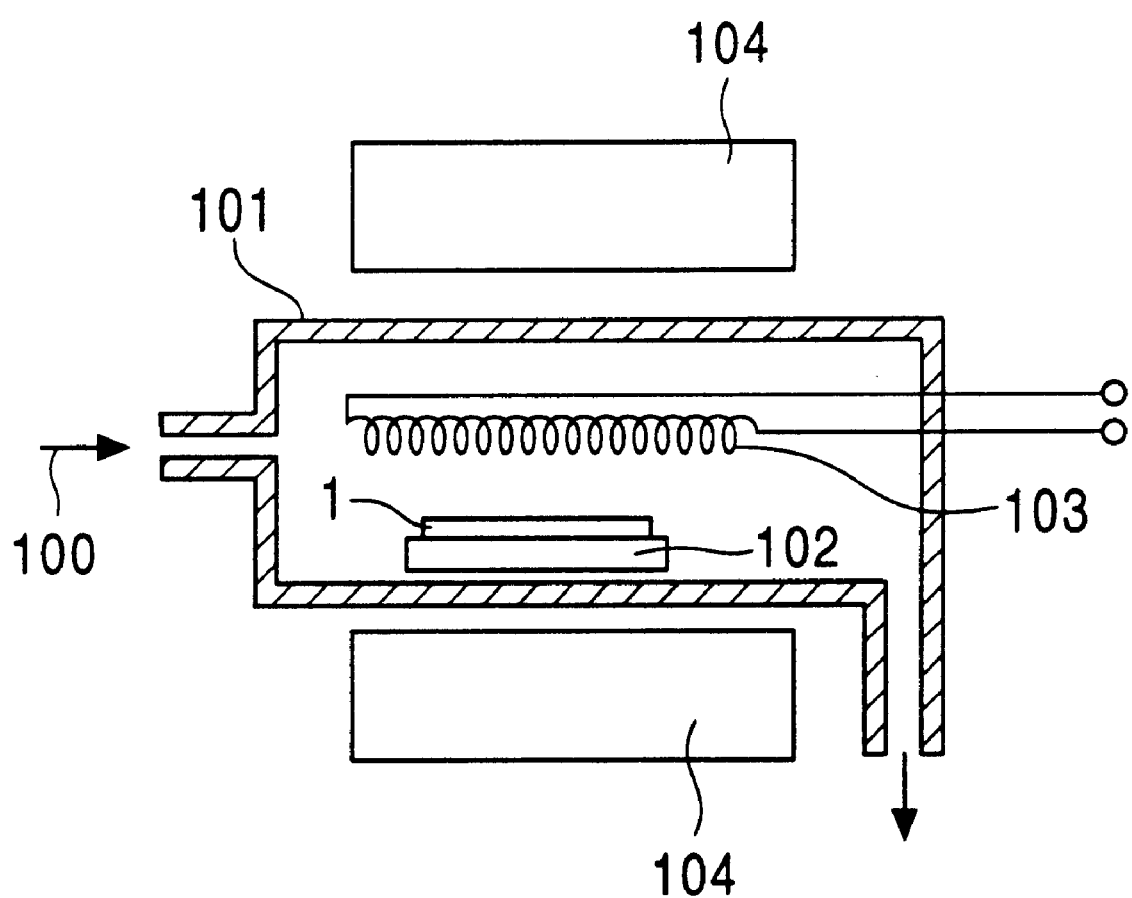
FIG. 8 is an outlined view of a catalytic CVD system used in production of LCDs.

The catalytic CVD process may be performed using a system shown in FIG. 8. A silicon hydride gas 100, such as monosilane or disilane, and an optional doping gas, such as $B_2H_6$, $PH_6$, or $AsH_3$, are introduced in a deposition chamber 101 via a supply pipe. The deposition chamber 101 includes a susceptor 102 for supporting the substrate 1, and a coiled catalyst 103 opposing to the susceptor 102 therein. The substrate 1 is heated by an external heating means 104, for example, an electric heater. The catalyst 103 is, for example, resistant wire, and is activated by being heated at 800 to 2,000° C. and particularly approximately 1700° C. for tungsten.

The nitrogen atmosphere in the deposition chamber 101 is replaced with hydrogen lasting approximately 15 to 20 minutes and the deposition chamber 101 is heated to approximately 200 to 800° C. so that the silane gas is catalyzed by the catalyst 103 and the formed silicon atoms are deposited on the substrate maintained at a low temperature, for example, 300° C. The deposition time depends on the thickness of the epitaxially-deposited layer. After the deposition, the deposition chamber is cooled and the hydrogen atmosphere is replaced with nitrogen. High-energy silicon atoms and groups thereof are thereby formed by catalysis by the catalyst 103 and pyrolysis and deposited on the crystalline sapphire film 50 including the steps 4. Thus, the silicon film can be deposited at a temperature which is significantly lower than the deposition temperature in a conventional thermal or plasma enhanced CVD process.

The entire substrate 1 may be uniformly heated using an electrical furnace or a lamp, or a particular part of the substrate 1, for example, a TFT-forming region may be locally heated by a laser beam or an electron beam.

Figure 9A:
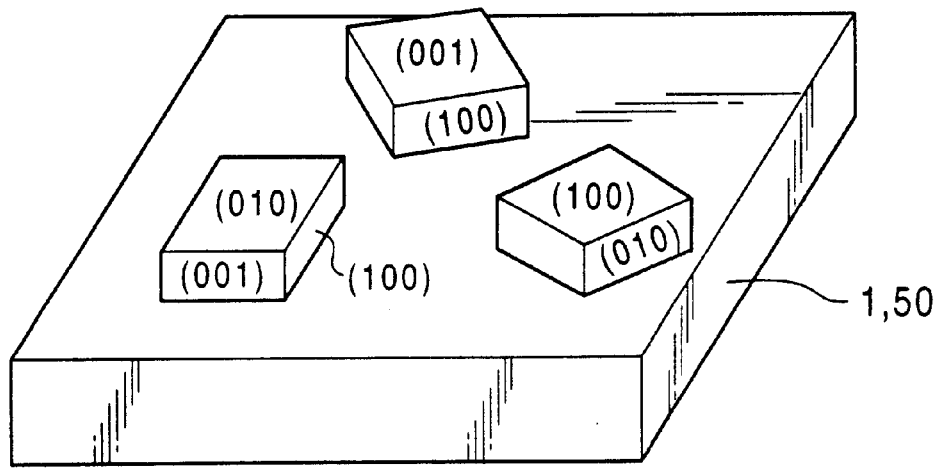
FIGS. 9A and 9B are schematic isometric views showing deposition of silicon crystals on an amorphous substrate.
Figure 9B:
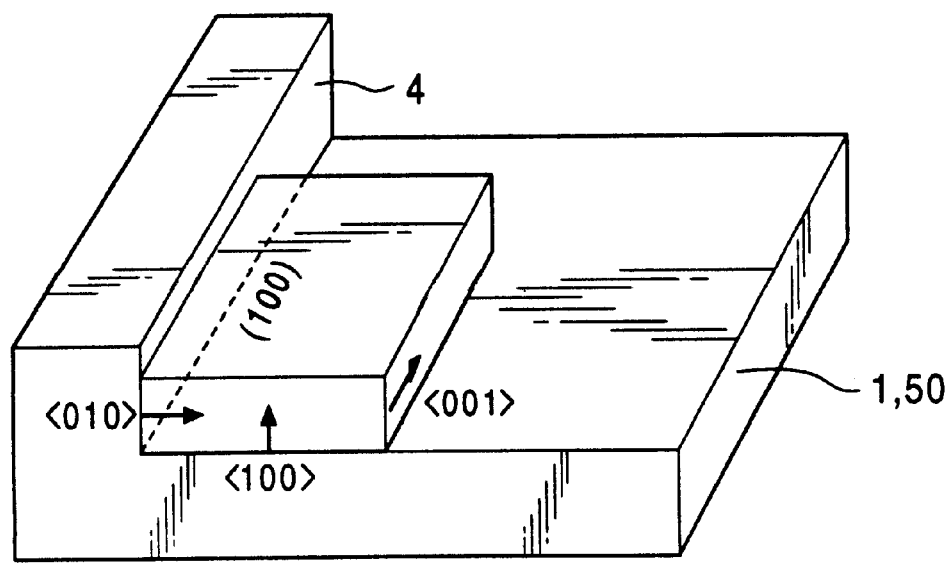
Figure 10A:
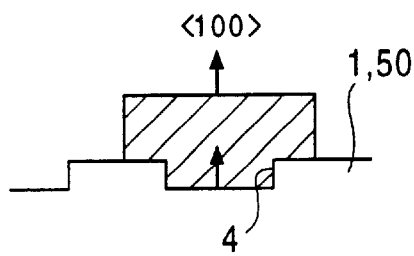
FIGS. 10A to 10F are cross-sectional views showing the shapes of the step and the orientation of the deposited silicon crystal in graphoepitaxy.
Figure 10B:
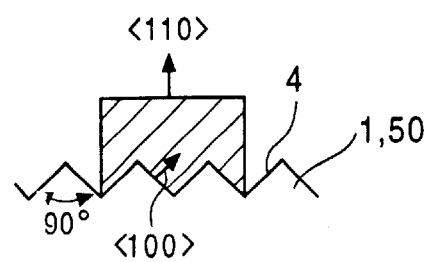
Figure 10C:
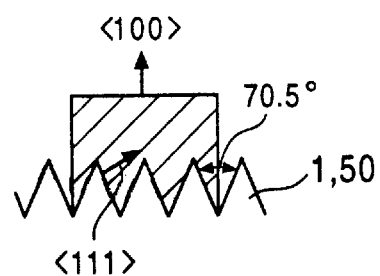
Figure 10D:
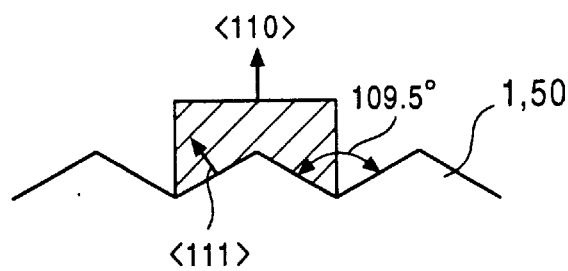
Figure 10E:
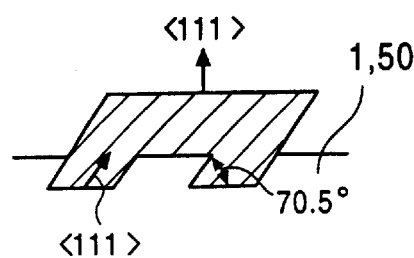
Figure 10F:
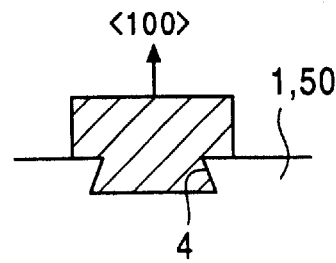

Since the deposited single-crystal silicon layer 7 shows high lattice matching with the crystalline sapphire film 50, for example, a (100) plane heteroepitaxially grows on the substrate. The steps also contribute to the heteroepitaxy including known graphoepitaxy and the resulting single-crystal silicon layer 7 has high crystallinity. As shown in FIG. 9, when an epitaxy layer is formed on a vertical wall such as a step 4 provided on an amorphous substrate (glass substrate) 1, the (100) plane of a single-crystal is grown along the side face of the step 4, as shown in FIG. 9B, whereas a crystal having random plane orientation is grown on a flat amorphous substrate 1, as shown in FIG. 9A. The size of the single-crystal grain increases in proportion to the temperature and the time. When the temperature is lowered or when the time is shortened, the distance between the steps is decreased. The orientation of the grown crystal can be controlled by changing the shape of the steps, as shown in FIGS. 10A to 10F. When MOS transistors are formed, the (100) plane is most frequently used. Accordingly, the step 4 can have any cross-sectional shape which facilitates crystal growth. For example, the angle at the bottom corner (basilar angle) may be a right angle. Alternatively, the side wall may be inclined inwardly or outwardly. The basilar angle of the step 4 is preferably 90° or less and the bottom corner is preferably slightly rounded.

Next, using the single crystal silicon layer 7 as channel regions, bottom-gate MOSTFTs are formed in the peripheral-driving-circuit section, and top-gate MOSTFTs are formed in the display section.

Since the concentration of the impurity fluctuates in the epitaxial single-crystal silicon layer 7, the entire surface is doped with a P-type impurity, for example, adequate amounts of boron ions to adjust the specific resistance. Furthermore, the pMOSTFT-forming region is selectively doped with an N-type impurity to form an N-type well. For example, the p-channel TFT-forming region is masked with a photoresist (not shown in the drawing) and is doped with P-type impurity ions such as B+ at 10 kV and at a dose of $2.7×10^{11}$ atoms/cm² to adjust the specific resistance. With reference to FIG. 2D (STEP 7), in order to control the concentration of the impurity in the pMOSTFT-forming region, the nMOSTFT-forming region is masked with a photoresist 60 and is doped with N-type impurity ions 65 such as P+ at 10 kV and at a dose of $1×10^{11}$ atoms/cm² to form an n-type well 7A.

With reference to FIG. 3B (STEP 9), a photoresist pattern 10 is formed in the step regions (indented sections) of the TFT sections in the display region and of the TFT sections of the peripheral driving region by any conventional photolithographic process. By continuous etching, gate electrodes 11 of the Mo—Ta alloy film 9 and gate insulating films 12 of SiN—SiO₂ are formed and the single-crystal silicon layer 7 is exposed. The Mo—Ta alloy film 9 is etched using an acidic solution, SiN is etched by plasma etching using gaseous CF₄, and SiO₂ is etched using a hydrofluoric acid solution.

With reference to FIG. 3C (STEP 10), all of the nMOSTFTs and pMOSTFTs in the peripheral driving region and the gate sections of the nMOSTFTs in the display region are covered with a photoresist 13. The exposed source and drain regions of the nMOSTFTs are doped with, for example, phosphorus ions 14 by ion implantation at 20 kV and at a dose of $5×10^{13}$ atoms/cm² to form LDD sections 15 of an N⁻- type layer by self-alignment.

With reference to FIG. 4A (STEP 11), all of the pMOSTFTs in the peripheral driving region, the gate sections of the nMOSTFTs in the peripheral driving region, and the gate sections and the LDD sections of the nMOSTFTs in the display region are covered with a photoresist 16. The exposed regions are doped with phosphorus or arsenic ions 17 by ion implantation at 20 kV and at a dose of $5×10^{15}$ atoms/cm² to form source sections 18, drain sections 19 and the LDD sections 15 of an N⁺-type layer of the nMOSTFTs.

Figure 4B:
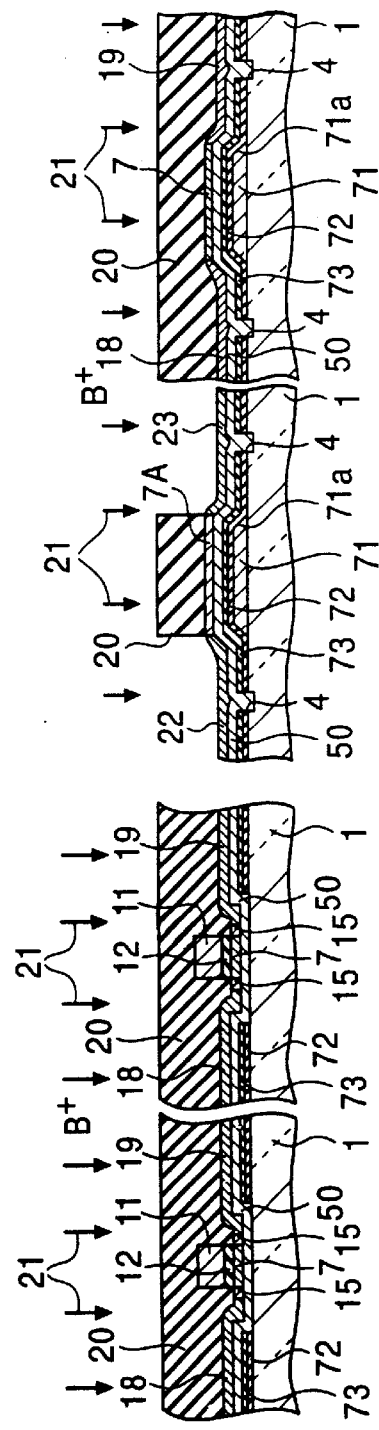

With reference to FIG. 4B (STEP 12), all of the nMOSTFTs in the peripheral driving region and the display region and the gate sections of the pMOSTFTs in the peripheral driving region are covered with a photoresist 20. The exposed regions are doped with boron ions 21 by ion implantation at 10 kV and at a dose of $5×10^{15}$ atoms/cm² to form source sections 22 and drain sections 23 of a P⁺-type layer of the pMOSTFTs. In the case of an nMOS peripheral driving circuit, this step is not necessary since the circuit does not have a pMOSTFT.

Figure 4C:
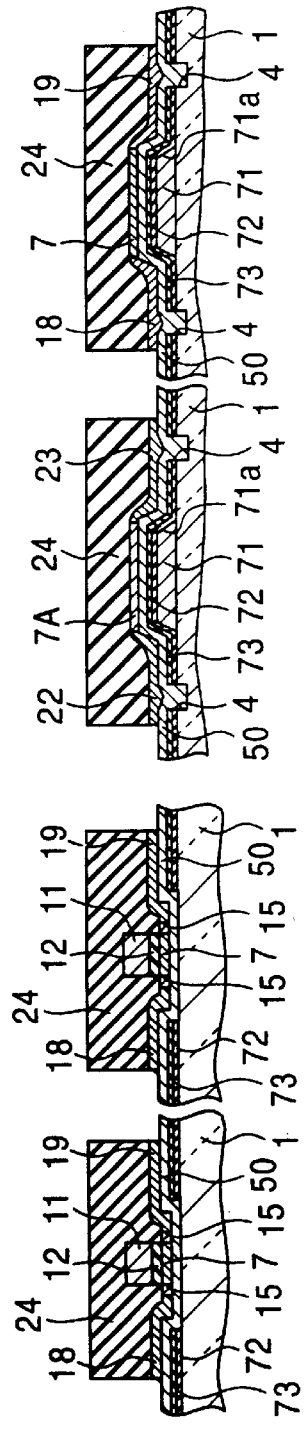

With reference to FIG. 4C (STEP 13), in order to island the active device sections including TFTs and diodes and the passive device sections including resistors and inductors, photoresist layers 24 are provided on all of the active device sections and the passive device sections in the peripheral driving region and the display section, and the single-crystal silicon layer 7 in other sections is removed by a conventional photolithographic process or an etching process using a hydrofluoric acid solution.

With reference to FIG. 5A (STEP 14), a SiO₂ film having a thickness of approximately 200 nm and then a phosphosilicate glass (PSG) film having a thickness of approximately 300 nm are continuously deposited to form a protective film 25 on the entire surface by a plasma-enhanced CVD process, a high-density plasma-enhanced CVD process or a catalytic CVD process.

In such a state, the single-crystal silicon layer is activated. Since activation treatment is performed at approximately 1,000° C. for approximately 10 seconds using, for example, a halogen lamp, the gate electrode composed of the Mo—Ta alloy having a high melting point is durable during the annealing for activation. The Mo—Ta alloy can be used for not only the gate section but also lead lines over a wide range. In the activation, excimer laser annealing requiring high process costs is generally not used. If excimer laser annealing is used, overlapping scanning of 90% or more is preferably performed on the entire surface or selectively the active device section and the passive device section using XeCl (wavelength: 308 nm).

With reference to FIG. 5B (STEP 15), contact holes are formed in all of the source-drain sections of the TFTs in the peripheral driving circuit and the source sections of the TFTs in the display region, by a conventional photolithographic process and an etching process.

A sputtering film having a thickness of 500 to 600 nm is formed on the entire surface. The sputtering film may be composed of pure aluminum, an aluminum alloy, for example, 1%-silicon containing aluminum or 1%- to 2%-copper containing aluminum, or pure copper. By a conventional photolithographic process and an etching process, source electrodes 26 of all TFTs in the peripheral driving circuit and the display region and drain electrodes 27 in the peripheral driving circuit are formed, and data lines and gate lines are simultaneously formed. Next, these are subjected to sintering at approximately 400° C. for 1 hour in a forming gas containing nitrogen and hydrogen.

With reference to FIG. 5C (STEP 16), an insulating film 36 composed of a PSG film with a thickness of approximately 300 nm and a SiN film with a thickness of approximately 300 nm is formed on the entire surface by a plasma-enhanced CVD process, a high-density plasma-enhanced CVD process, or a catalytic CVD process. Next, contact holes are formed in the drain sections of TFTs in the display region. It is not necessary to remove the SiO₂, PSG and SiN films in the pixel sections.

Basic requirements of a reflective liquid crystal display are to reflect the light incident on the display towards the interior of the liquid crystal panel and to scatter the light, because the direction of the incident light is uncertain although the position of the observer with respect to the display is substantially fixed. Thus, the reflector must be designed on the assumption that a point light source is located at any position. As shown in FIG. 6A (STEP 17), a photosensitive resin film 28 having a thickness of 2 to 3 μm is formed on the entire surface by spin coating. Next, as shown in FIG. 6B (STEP 18), an uneven pattern is formed in at least the pixel region by a conventional photolithographic process and an etching process so that the pixel section has optimized reflective characteristics and viewing-angle characteristics. The uneven pattern is subjected to reflow to form a lower portion of the reflective face of an uneven surface 28A. Contact holes are simultaneously formed in the resin film in the drain sections of TFTs in the display region.

With reference to 6C (STEP 19), a pure aluminum or 1%-silicon containing aluminum sputtering film having a thickness of 400 to 500 nm is deposited on the entire surface. The sputtering film at the region other than the pixel sections is removed by a general photolithographic process and an etching process to form uneven aluminum reflective sections 29 which are connected to the drain sections 19. The reflective sections 29 are used as pixel electrodes for displaying. Next, these are subjected to sintering at approximately 300° C. for 1 hour in a forming gas to enhance the contact. Pure silver or a silver alloy may be used instead of the pure aluminum or aluminum alloy to increase the reflectance.

As described above, an active-matrix substrate 30 integrating a display section and a peripheral-driving-circuit section is produced by forming a single-crystal silicon layer 7 over the steps 4 as seeds for low-temperature heteroepitaxy and by forming CMOS circuits, each including top-gate nMOSLDD-TFTs, and bottom-gate pMOSTFTs and nMOSTFTs, in the display section and the peripheral-driving-circuit section using the single-crystal silicon layer 7.

Figure 7:
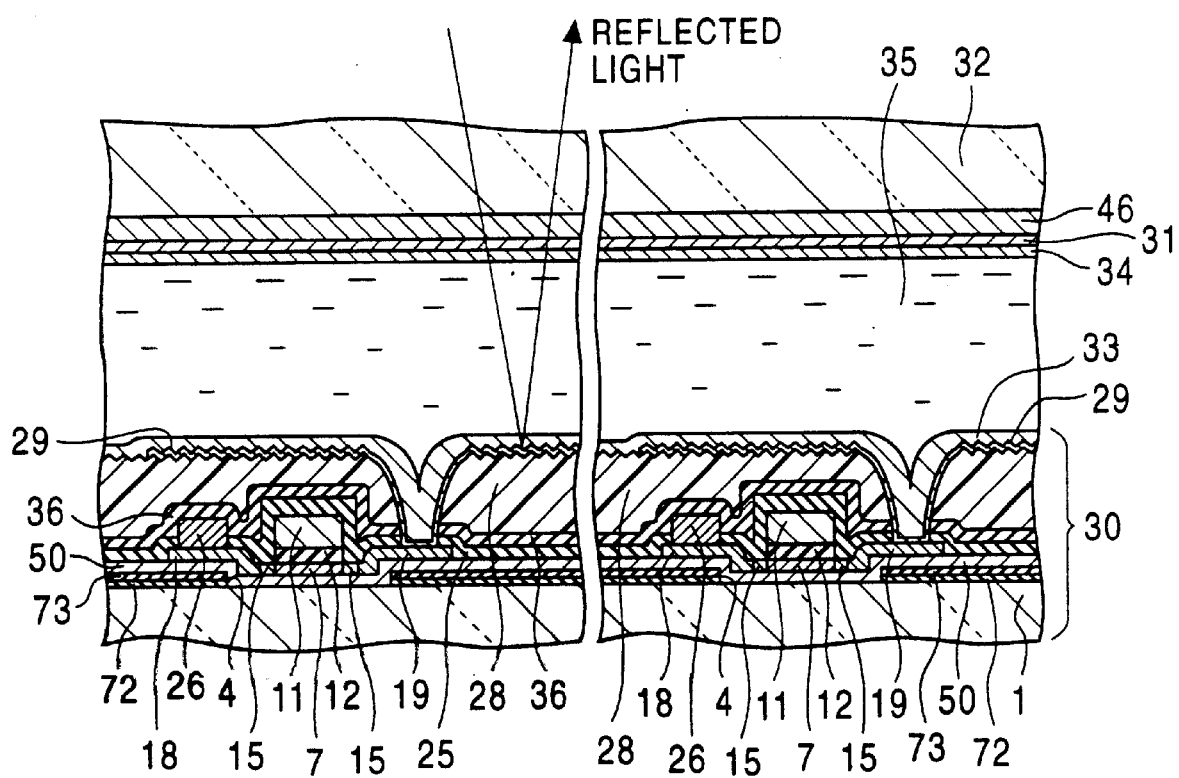
FIG. 7 is a cross-sectional view of a main section of the LCD of the first embodiment.

With reference to FIG. 7, a method for making a reflective liquid crystal display using the active-matrix substrate (driving substrate) 30 will now be described. Hereinafter, the active-matrix substrate is referred to as a TFT substrate.

When a liquid crystal cell in this LCD is produced by double-side assembly (suitable for medium to large liquid crystal panels of 2 inches or more), polyimide alignment films 33 and 34 are formed one surface of the TFT substrate 30 and one surface having a solid indium tin oxide (ITO) electrode of a counter electrode 32, respectively. The polyimide alignment films are formed by roll coating or spin coating so that thicknesses are in a range of 50 to 100 nm and are cured at 180° C. for 2 hours.

The TFT substrate 30 and the counter substrate 32 are aligned by rubbing or by an optical method. Rubbing may be performed using cotton or rayon. Cotton is preferable in view of dust produced by rubbing and retardation. In optical alignment, liquid crystal molecules are aligned by noncontact linearly polarized UV light irradiation. The polymer alignment film can also be formed by polarized or unpolarized light which is diagonally incident. Among such polymer films are polymethyl methacrylate polymers containing azobenzene.

After washing with water or isopropyl alcohol to remove the rubbing dust, a common material is applied to the TFT substrate 30 whereas a sealing agent is applied to the counter electrode 32. The common material may be an acrylic, epoxy-acrylate or epoxy adhesive containing a conductive filler. The sealing agent may be an acrylic, epoxy-acrylate or epoxy adhesive. Curing may be performed by heating, UV irradiation, or a combination thereof. A combination of heating and UV irradiation is preferable due to high overlapping accuracy and ready working operations.

Spacers are distributed on the counter substrate 32 to form a given gap and the counter substrate 32 is overlapped with the TFT substrate 30 so that an alignment mark of the counter substrate 32 is precisely aligned to an alignment mark of the TFT substrate 30. The sealing agent is preliminarily cured by UV irradiation, and then cured by heat.

A liquid crystal panel is formed by scribing the composite of the TFT substrate 30 and the counter electrode 32.

The gap between the two substrates 30 and 32 is filled with a liquid crystal 35. The injection port is sealed with an UW-curable adhesive and washed with isopropyl alcohol. Any type of liquid crystal may be used, and a nematic liquid crystal used in a twisted nematic mode having high-speed response is generally used.

The liquid crystal 35 is aligned by heating and then rapid cooling.

Flexible lead lines are connected to the panel electrode extraction section of the TFT substrate 30 by thermal compressive bonding using an anisotropic conductive film, and then a polarizer is bonded to the counter electrode 32.

When the liquid crystal panel is produced by single-side assembly (suitable for compact liquid crystal panels of 2 inches or less), polyimide alignment films 33 and 34 are formed one surface of the TFT substrate 30 and one surface of the counter electrode 32, respectively, and then these alignment films 33 and 34 are aligned by rubbing or non-contact optical alignment using linearly polarized UV light.

The TFT substrate 30 and the counter substrate 32 are divided into segments by dicing or scribing and are washed with water or isopropyl alcohol. A common material is applied to each divided TFT substrate 30 whereas a sealing agent containing spacers is applied to each counter substrate 32. These substrates are overlapped with each other. The subsequent process is substantially the same as above.

The counter substrate 32 of the reflective LCD is a color filter (CF) substrate having a color filter layer 46 provided below the ITO electrode 31. The light from the counter substrate 32 is effectively reflected by the reflective film 29 and is emitted from the counter substrate 32.

When the TFT substrate 30 has an on-chip color filter (OCCF) structure in which the TFT substrate 30 has a color filter, an ITO electrode or an ITO electrode with a black mask is directly bonded to the counter electrode 32.

When the storage capacitor ($C_s$) shown in FIG. 12 is provided in the pixel section, a dielectric layer (not shown in the drawing) provided on the substrate 1 is connected to the drain region 19 of the single-crystal silicon.

As described above, this embodiment has the following noticeable advantages.

(A) The crystalline sapphire film 50 is formed as a seed on the substrate 1 provided with the steps 4 having a predetermined size and a shape, and the single-crystal silicon layer 7 is deposited by low-temperature heteroepitaxy thereon (heating during the heteroepitaxy is performed at a relatively low temperature of 200 to 800° C. and preferably 300 to 400° C). As a result, the single-crystal silicon layer 7 has high crystallinity and a high electron mobility of 540 $cm^2$/v·sec or more which enables production of a LCD having high-performance drivers.

(B) The single-crystal silicon layer has higher electron or hole mobility, comparable with that of a single-crystal silicon substrate and is higher than that of conventional amorphous and polycrystalline silicon thin-films. In the integrated configuration of the display section and the peripheral-driving-circuit section, nMOS, pMOS, or cMOS bottom-gate TFTs of a LDD structure in the display section have high switching characteristics and a low leakage current, and bottom-gate TFTs of cMOS, nMOS, CMOS, or a combination thereof in the peripheral-driving-circuit section have high driving characteristics. Thus, the display panel has high image quality, high definition, a narrow frame, a large screen and a high luminescent efficiency. Since the single-crystal silicon layer 7 has sufficiently high hole mobility, the peripheral driving circuit can drive by only electrons or holes, or by a combination thereof. In compact to medium panels, one of a pair of vertical peripheral driving circuits may be omitted.

(C) Since the silicon epitaxy can be performed at a temperature of 800° C. or less, the single-crystal silicon layer 7 can be uniformly formed on the insulating substrate at a relatively low temperature of, for example, 200 to 600° C. or less. Quartz glass, crystallized glass or ceramic can be used as a substrate. Furthermore, inexpensive substrate materials having low distortion points and excellent physical properties, such as borosilicate glass and heat resistant organic compounds, can be used as substrates without restriction. Thus, a large substrate can be used.

(D) Since this process does not require long-term annealing at a medium temperature nor excimer annealing, which is essential for solid phase epitaxy, this process has high productivity and does not require expensive facilities, resulting in reduced production costs.

(E) In the heteroepitaxy, a single-crystal silicon layer having a variety of p-type impurity concentrations and a high mobility can be readily produced by controlling the crystallinity of the crystalline sapphire film, the gas composition in the catalytic CVD process, the shape of the steps, the heating temperature of the substrate, and the concentration of the added N- or P-type impurity. Thus, the threshold voltage ($V_{th}$) can be readily controlled and the resulting low resistance facilitates high-speed operations.

(F) When a color filter is provided on the display array, the aperture ratio of the display panel and the luminance are improved, and costs are decreased due to omission of a color filter substrate and improved productivity.

(G) The material layer such as the crystalline sapphire layer serves as a diffusion barrier for various atoms and suppresses diffusion of impurities from the glass substrate.

Second Embodiment

Figure 14A:
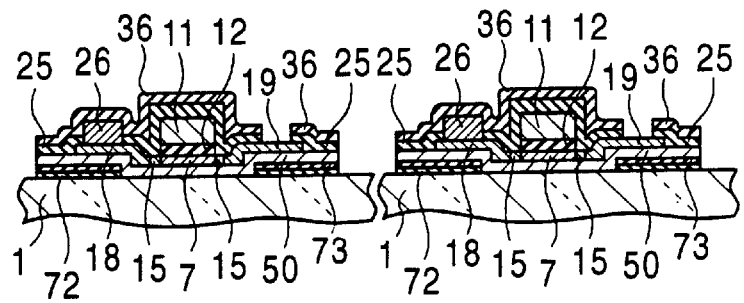
FIGS. 14A to 14C are cross-sectional views showing production steps of a LCD in accordance with a second embodiment of the present invention.

FIGS. 14A to 14C, 15, and 16A to 16D show a second embodiment of the present invention. This embodiment includes a transmissive LCD having top-gate MOSTFTs in a display section and bottom-gate MOSTFTs in a peripheral-driving-circuit section. The transmissive LCD is produced through STEP 1 in FIG. 1A to STEP 16 in FIG. 5C and then through the following processes. With reference to FIG. 14A (STEP 17), contact holes 19 for drain sections of display TFTs are formed in the insulating films 25 and 36 and unnecessary $SiO_2$, PSG and SiN films in the pixel opening section are removed to improve transmittance.

Figure 14B:
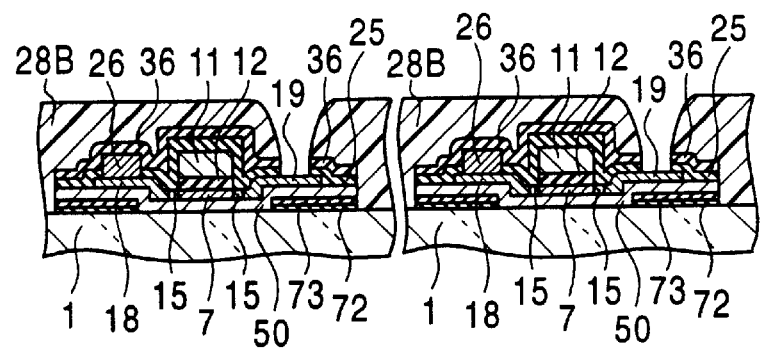

With reference to FIG. 14B (STEP 18), a planarization film 28B, which is composed of an acrylic photosensitive transparent resin and has a thickness of 2 to 3 µm, is formed on the entire surface by spin coating etc., and then contact holes for drains of display TFTs are formed in the transparent resin 28B. The transparent resin 28B is cured at a given condition.

Figure 14C:
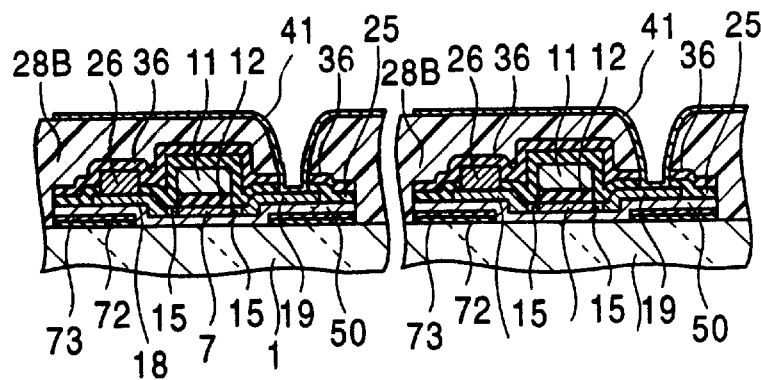

With reference to FIG. 14C (STEP 19), an ITO sputtering film having a thickness of 130 to 150 nm is formed on the entire surface, and then an ITO transparent electrode 41 in contact with the drain section 19 of the display TFT is formed by photolithography and etching. Next, annealing in a forming gas at 200 to 250° C. for 1 hour is performed to reduce the contact resistance between the drain of each TFT in the display section and the ITO and to improve the transparency of the ITO.

Figure 15:
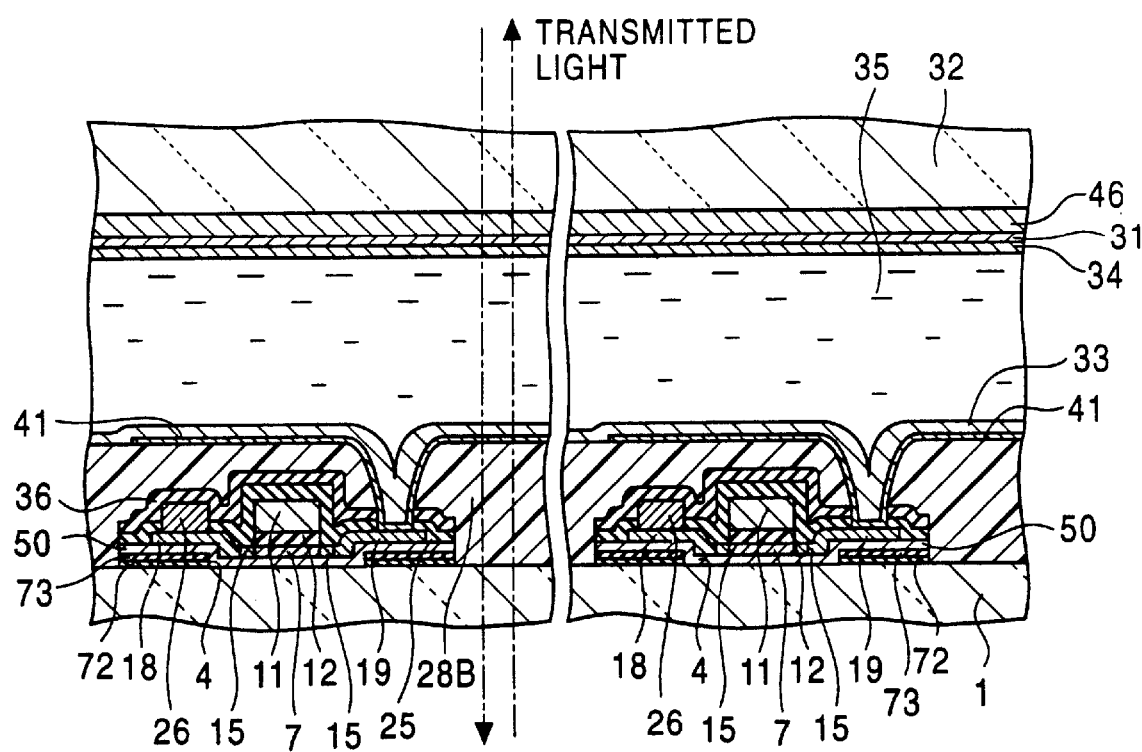
FIG. 15 is a cross-sectional view of a main section of the LCD of the second embodiment.

With reference to FIG. 15, a transmissive LCD is assembled using this TFT substrate 1 and a counter substrate 32 as in the first embodiment. In this embodiment, a polarizer is also provided on the TFT substrate 1. Although transmission light from the TFT substrate 1 is used in this transmissive LCD as shown by a solid line in the drawing, transmission light from the counter substrate 32 may be used as shown by a dotted line in the drawing.

An on-chip color-filter (OCCF) structure and an on-chip black (OCB) structure may be made from this transmissive LCD, as follows.

Figure 16A:
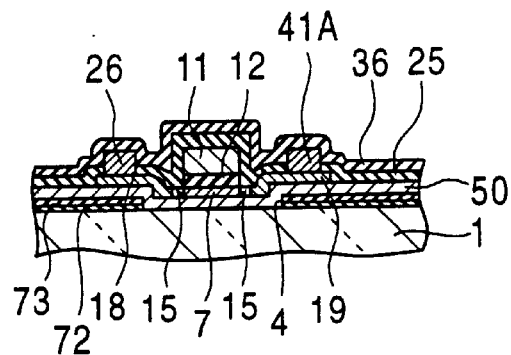
FIGS. 16A to 16D are cross-sectional views showing production steps of the LCD in accordance with the second embodiment of the present invention.

After performing STEPS 1 to 16 shown in FIGS. 1A to 5C, contact holes are also formed at the drain sections of the PSG-$SiO_2$ insulating film 25 as shown in FIG. 16A (STEP 17), and an aluminum layer 41A for a drain electrode is formed. Next, a SiN-PSG insulating film 36 is formed.

Figure 16B:
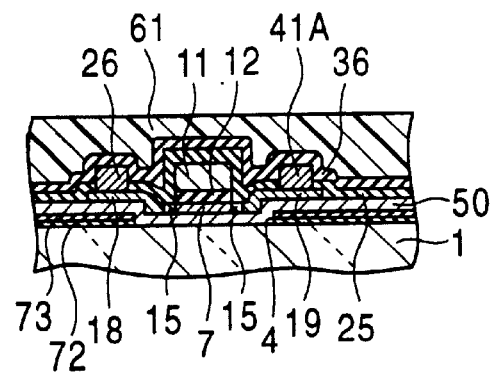
Figure 16C:
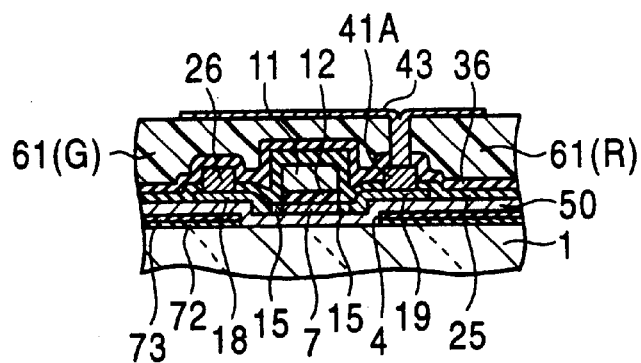

With reference to FIG. 16B (STEP 18), a photoresist 61 containing a red, green or blue pigment having a thickness of 1 to 1.5 µm is formed on the corresponding color segments. With reference to FIG. 16C (STEP 19), color filter layers 61(R), 61(G) and 61(B) are formed by a general photolithographic process (OCCF structure). Contact holes are also formed at the drain sections. An opaque ceramic substrate or glass or heat resistant resin having low transmittance cannot be used.

With reference to FIG. 16C (STEP 19), a metal shading layer 43 as a black mask layer is formed over the contact holes connecting to the drains of the display TFTs and over the color filter layer by a patterning process. For example, a molybdenum film having a thickness of 200 to 250 nm is formed by a sputtering process and is then patterned to form a given shape for shading the display TFTs (OCB structure).

Figure 16D:
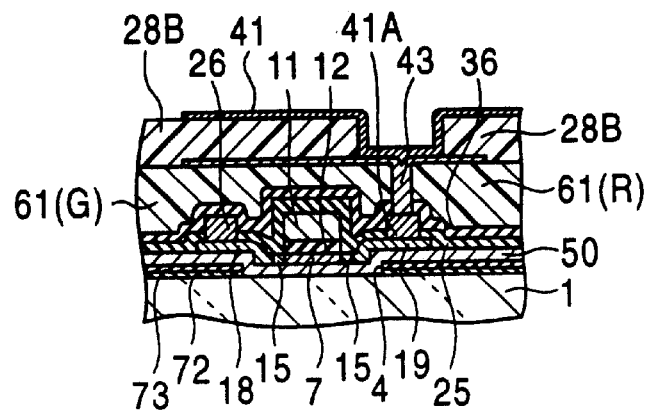

With reference to FIG. 16D (STEP 20), a planarization film 28B composed of a transparent resin is formed, and then an ITO transparent electrode 41 is formed so as to connect to the shading layer 43 through the contact holes provided in the planarization film.

The color filter 61 and the shading layer or black mask 43 formed on the display array section improves the aperture ratio of the liquid crystal display panel and decreases electrical power consumption of the display module including a back light.

Third Embodiment

FIGS. 17A to 25C show a third embodiment of the present invention. In this embodiment, the peripheral-driving-circuit section includes a CMOS driving circuit including bottom-gate pMOSTFTs and nMOSTFTs as in the first embodiment. The display section is a reflective type and includes TFTs having various gate configurations.

The display section shown in FIG. 17A includes top-gate nMOSLDD-TFTs as in the first embodiment, the display section shown in FIG. 17B includes bottom-gate nMOSLDD-TFTs, and the display section shown in FIG. 17C includes dual-gate nMOSLDD-TFTs. These TFTs can be produced by the same process for the bottom-gate MOSTFTs in the peripheral-driving-circuit section. The dual-gate MOSTFT has higher driving ability and is suitable for high-speed switching. Furthermore, the upper or lower gate may be selectively used as a top- or bottom-gate type during operation.

In the bottom-gate MOSTFT shown in FIG. 17B, a gate electrode 71 is composed of, for example, molybdenum or tantalum, and a gate insulting film is composed of a SiN film 72 and a $SiO_2$ film 73. A channel region and the like using the single-crystal silicon layer are formed on the gate insulating film as in the bottom-gate MOSTFT in the peripheral-driving-circuit section. In the dual-gate MOSTFT shown in FIG. 17C, the lower-gate section is substantially the same as that in the bottom-gate MOSTFT and the upper-gate section includes an upper-gate electrode 74 formed on a gate insulating film 82 composed of a $SiO_2$ film and a SiN film. In all the cases, each gate section is formed in the exterior of the corresponding step 4 as a seed for heteroepitaxy.

A method for making the bottom-gate MOSTFT will be described with reference to FIGS. 18A to 22D, and a method for making the dual-gate MOSTFT will be described with reference to FIGS. 23A to 25C. The method for making the bottom-gate MOSTFT in the peripheral-driving-circuit section is shown above with reference to FIGS. 1A to 6C.

Figure 18A:
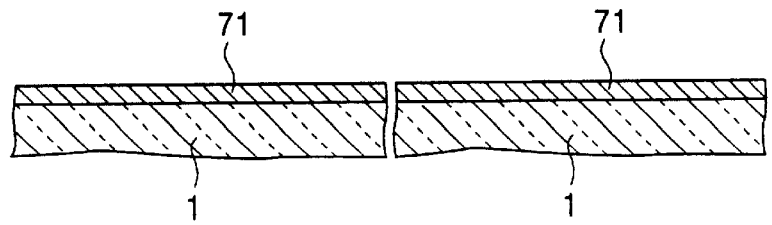
FIGS. 18A to 18C are cross-sectional views showing production steps of a LCD in accordance with the third embodiment of the present invention.

With reference to FIG. 18A (STEP 1), in the production of the bottom-gate MOSTFT in the display section, a molybdenum-tantalum alloy film 71 having a thickness of 500 to 600 nm is formed on a substrate 1 by sputtering.

Figure 18B:
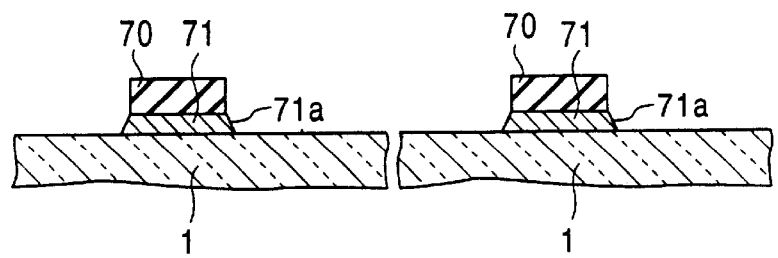

With reference to FIG. 18B (STEP 2), a photoresist 70 having a given pattern is formed and the molybdenum-tantalum alloy film 71 is subjected to taper etching using the photoresist 70 as a mask to form a gate electrode 71 having a trapezoidal side base 71a with a gentle angle of 20 to 45 degree.

Figure 18C:
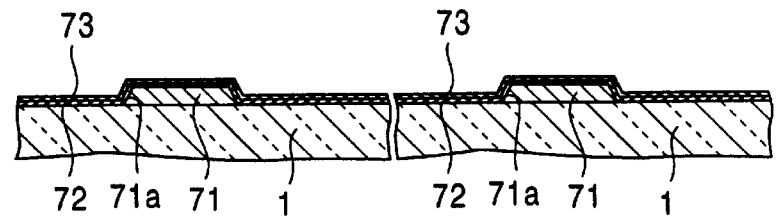

With reference to FIG. 18C (STEP 3), after the photoresist 70 is removed, a SiN film 72 having a thickness of approximately 100 nm and then a SiO$_2$ film 73 having a thickness of approximately 200 nm are deposited on the substrate 1 including the molybdenum-tantalum alloy film 71 by a plasma-enhanced CVD process to form a gate insulating film.

Figure 19A:
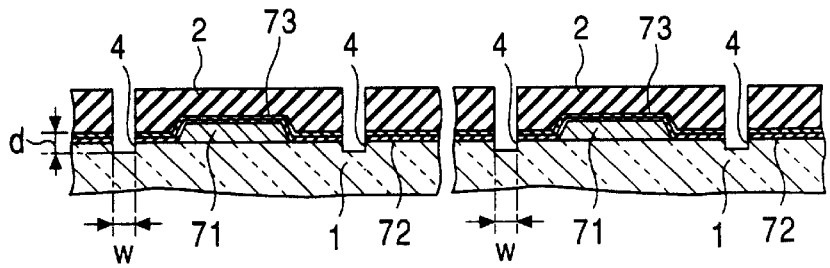
FIGS. 19A to 19D are cross-sectional views showing the subsequent production steps of the LCD in accordance with the third embodiment of the present invention.

With reference to FIG. 19A (STEP 4), a photoresist 2 having a given pattern is formed in at least the TFT-forming region, as in STEP 4 shown in FIG. 2A, and a plurality of steps or indented sections 4 having a proper shape and size are formed in the gate insulating film and the substrate 1 through a mask of the photoresist 2, as described above. The steps 4 function as seeds for heteroepitaxy of the single-crystal silicon layer, facilitates the deposition and crystallization of the single-crystal silicon layer, and have a depth d of 0.3 to 0.4 $\mu$m, a width w of 2 to 3 $\mu$m, a length (in the direction perpendicular to the drawing) of 10 to 20 $\mu$m, and an basilar angle (between the bottom and the side wall) which is a right angle.

Figure 19B:
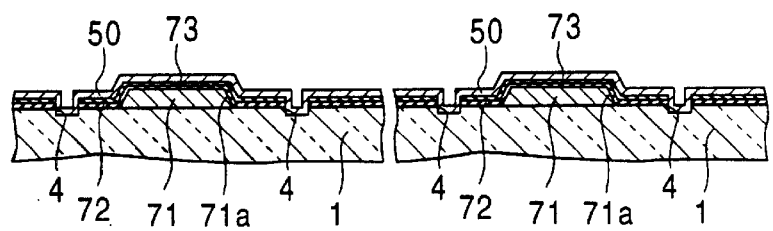

With reference to FIG. 19B (STEP 5), the photoresist 2 is removed, and a crystalline sapphire film 50 having a thickness of 20 to 200 nm is formed in at least the TFT-forming region including the steps 4 on one main surface of the insulating substrate 1, as in STEP 5 shown in FIG. 2B.

Figure 19C:
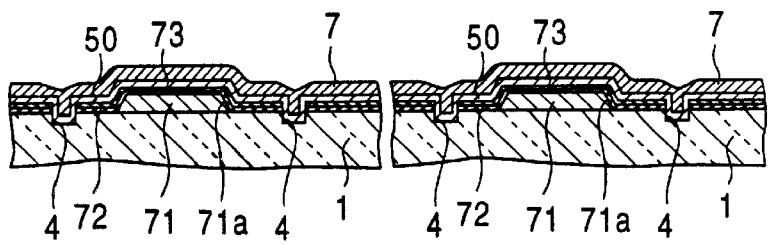

With reference to FIG. 19C (STEP 6), a single-crystal silicon film 7 with a thickness of several $\mu$m to 0.005 $\mu$m (typically 0.1 $\mu$) is deposited by heteroepitaxy thereon, as in STEP 6 shown in FIG. 2C. Since the underlying gate electrode 71 has side faces 71a having a gentle slope, the single-crystal silicon layer 7 can be deposited without discontinuities at the steps 4.

Figure 19D:
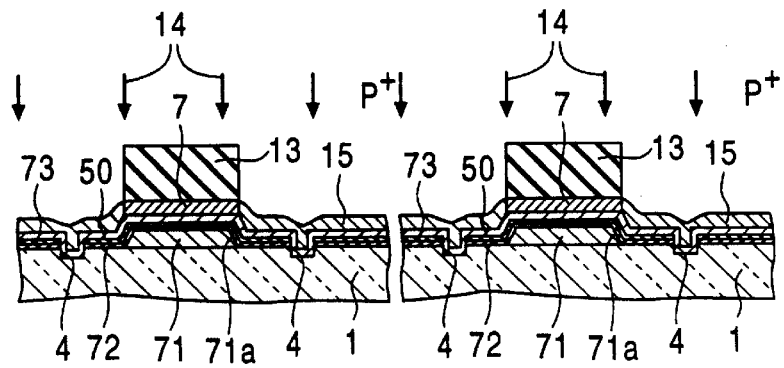

With reference to FIG. 19D (STEP 7), STEP 7 shown in FIG. 2D through STEP 9 shown in FIG. 3B are performed, then the gate section of the nMOSTFT in the display region is covered with a photoresist 13, and the exposed source and drain regions of the nMOSTFTs are doped with phosphorus ions 14 to form LDD sections 15 of an N$^-$-type layer by self-alignment, as in STEP 10 shown in FIG. 3C. The bottom gate electrode 71 facilitates alignment of the photoresist 13 as a mask and suppresses misalignment.

Figure 20A:
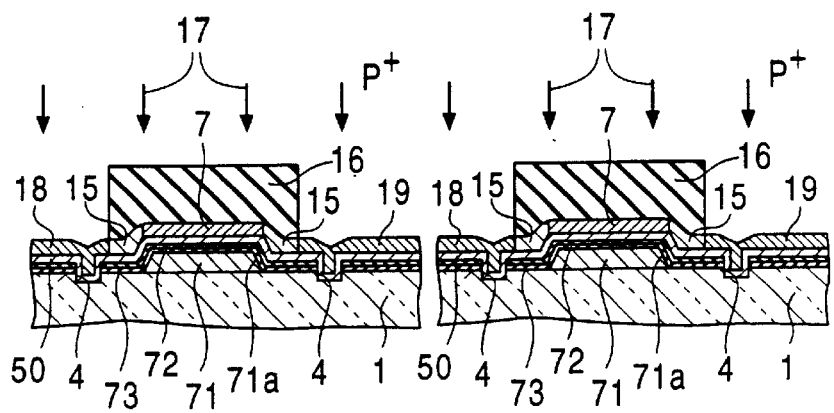
FIGS. 20A to 20D are cross-sectional views showing the subsequent production steps of the LCD in accordance with the third embodiment of the present invention.

With reference to FIG. 20A (STEP 8), the gate sections and the LDD sections of the nMOSTFTs are covered with a photoresist 16, as in STEP 11 shown in FIG. 4A. The exposed regions are doped with phosphorus or arsenic ions 17 by ion implantation to form source sections 18 and drain sections 19 of N$^+$-type layers of the nMOSTFTs.

Figure 20B:
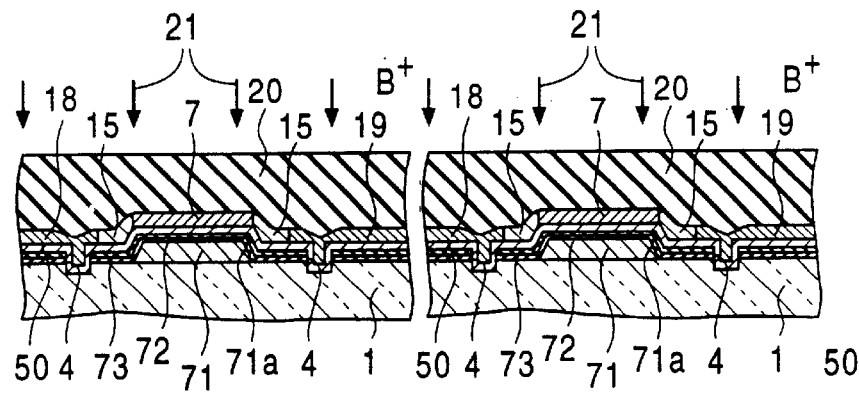

With reference to FIG. 20B (STEP 9), all of the nMOSTFTs are covered with a photoresist 20, and source sections and drain sections of P$^+$-type layers of the pMOSTFTs in the peripheral-driving-circuit section are formed by doping with boron ions 21, as in STEP 12 shown in FIG. 4B.

Figure 20C:
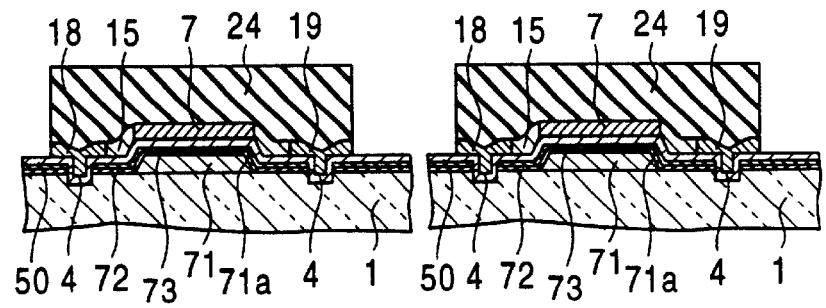

With reference to FIG. 20C (STEP 10), in order to island the active device sections and the passive device sections, photoresist layers 24 are provided and the single-crystalt silicon layer 7 is selectively removed by a conventional photolithographic process or an etching process, as in STEP 13 shown in FIG. 4C.

Figure 20D:
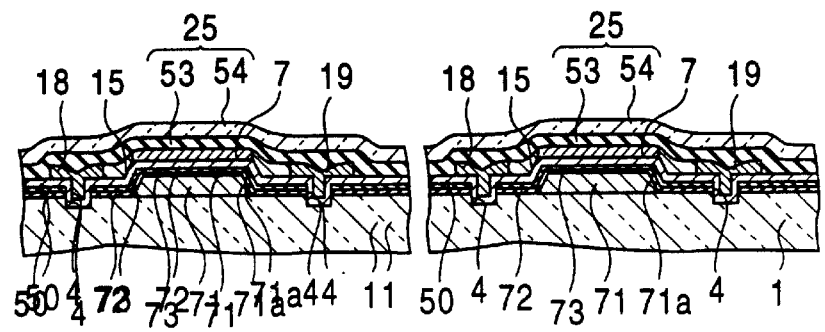

With reference to FIG. 20D (STEP 11), a SiO$_2$ film having a thickness of approximately 300 nm and then a phospho- silicate glass (PSG) film having a thickness of approximately 300 nm are continuously deposited on the entire surface by a plasma-enhanced CVD process, a high-density plasma-enhanced CVD process or a catalytic CVD process, as in STEP 14 shown in FIG. 5A. The SiO$_2$ film 53 and the PSG film 54 correspond to the above-described protective film 25. The single crystal silicon layer is activated.

Figure 21A:
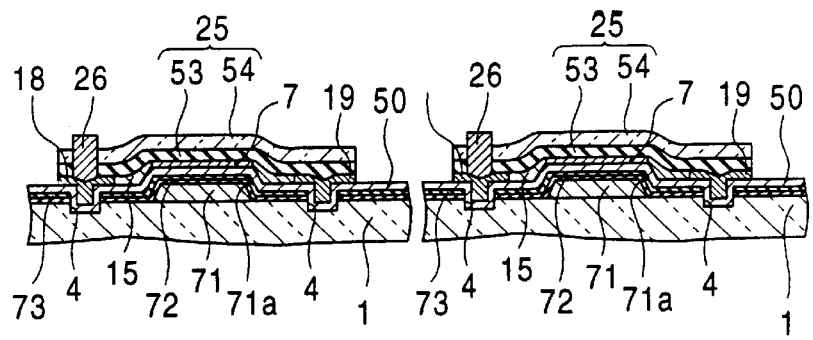
FIGS. 21A to 21D are cross-sectional views showing the subsequent production steps of the LCD in accordance with the third embodiment of the present invention.

With reference to FIG. 21A (STEP 12), contact holes are formed in the source sections by a conventional photolithographic process and an etching process, as in STEP 15 shown in FIG. 5B. An aluminum sputtering film with a thickness of 400 to 500 nm is formed on the entire surface and the source electrodes 26 of the TFTs, data lines and gate lines are simultaneously formed by general photolithography or etching. Next, sintering is performed in a forming gas at approximately 400° C. for 1 hour.

Figure 21B:
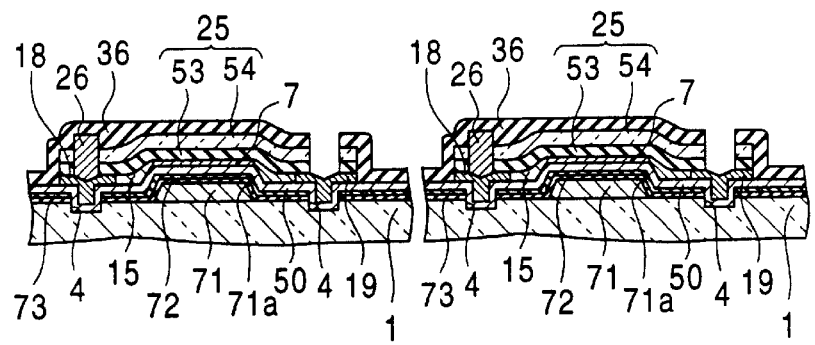

With reference to FIG. 21B (STEP 13), an insulating film 36 composed of a PSG film with a thickness of approximately 300 nm and a SiN film with a thickness of approximately 300 nm is formed on the entire surface by a plasma-enhanced CVD process, a high-density plasma-enhanced CVD process, or a catalytic CVD process, and then contact holes are formed in the drain sections of display TFTs, as in STEP 16 shown in FIG. 5C.

Figure 21C:
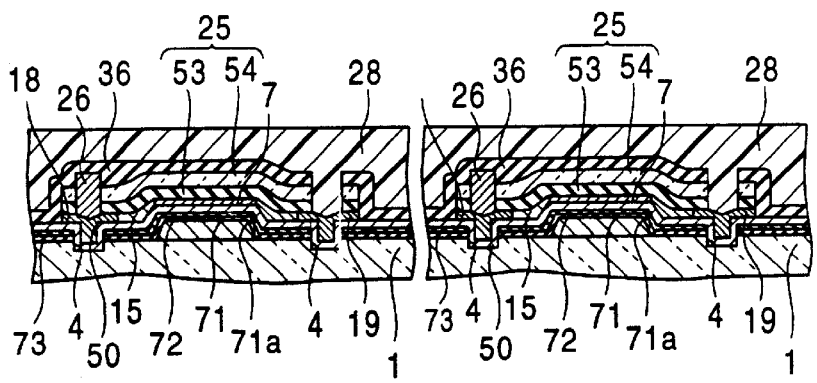
Figure 21D:
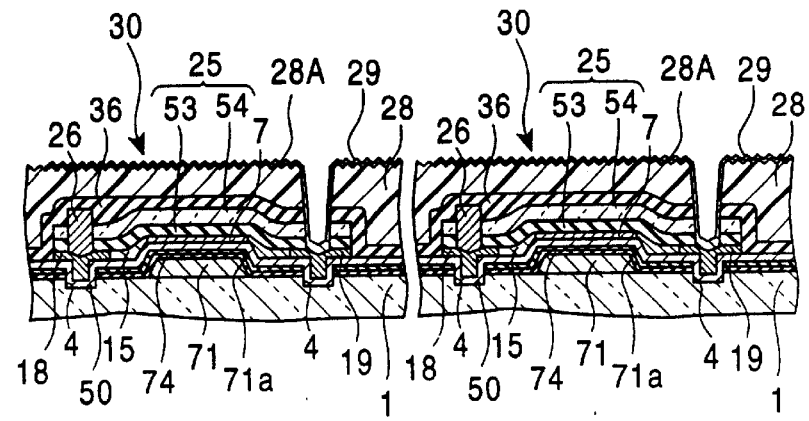

With reference to FIG. 21C (STEP 14), a photosensitive resin film 28 having a thickness of 2 to 3 $\mu$m is formed on the entire surface by spin coating, as in STEP 17 shown in FIG. 6A. With reference to FIG. 21D (STEP 15), an uneven pattern is formed in at least the pixel region by a conventional photolithographic process and an etching process so that the pixel section has optimized reflective characteristics and viewing-angle characteristics. The uneven pattern is subjected to reflow to form a lower portion of the reflective face of an uneven surface 28A. Contact holes are simultaneously formed in the resin film in the drain sections of display TFTS.

With reference to 21D (STEP 15), an aluminum sputtering film having a thickness of 400 to 500 nm is deposited on the entire surface, and uneven aluminum reflective sections 29 connected to the drain sections 19 of display TFTs are formed by a conventional photolithographic process and an etching process, as in STEP 19 shown in FIG. 6C.

The above process can produce an active matrix substrate 30 integrating a display section and a peripheral-driving-circuit section in which the display section includes bottom-gate nMOSLDD-TFTs using the single-crystal silicon layer 7 formed by low-temperature heteroepitaxy on the crystalline sapphire film 50 and the steps 4 as seeds and the peripheral-driving-circuit section includes a CMOS driving circuit of bottom-gate pMOSTFTs and nMOSTFTs.

Figure 22A:
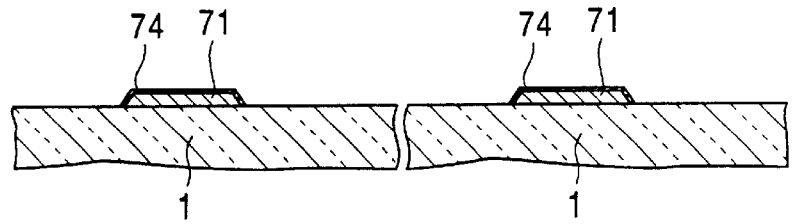
FIGS. 22A to 22C are cross-sectional views showing production steps of a LCD in accordance with the third embodiment of the present invention.
Figure 22B:
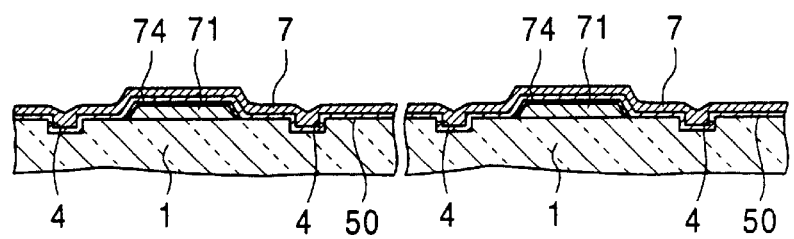
Figure 22C:
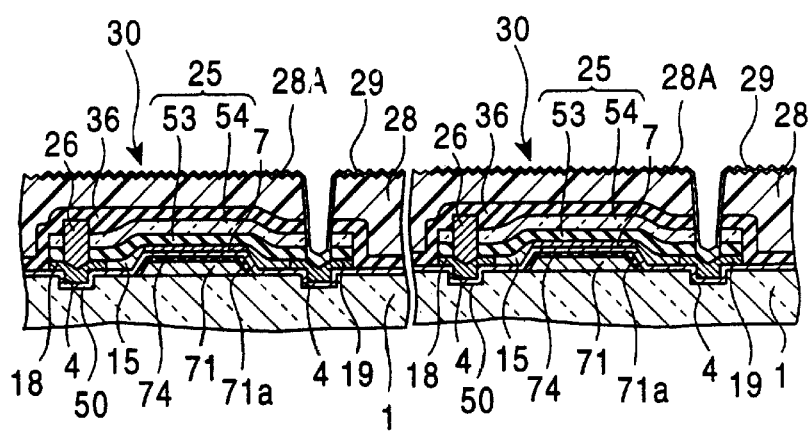

FIGS. 22A to 22C show the formation of a gate-insulating film of the bottom-gate MOSTFT in the display section by anodic oxidation of molybdenum-tantalum.

With reference to FIG. 22A (STEP 3) subsequent to STEP 2 shown in FIG. 18B, the molybdenum-tantalum alloy film 71 is subjected to a conventional anodic oxidation treatment to form a gate-insulating film 74 with a thickness of 100 to 200 nm composed of Ta$_2$O$_5$ on the surface.

With reference to FIG. 22B (STEP 4), steps 4 and a crystalline sapphire film 50 are formed, as in STEPS 4 to 6 shown in FIGS. 19A to 19C, and a single-crystal silicon layer 7 is heteroepitaxially deposited thereon by a catalytic CVD process. With reference to FIG. 22C (STEP 5), an active matrix substrate 30 is formed, as in STEPS 7 (FIG. 19D) to 15 (FIG. 21D).

When a dual-gate MOSTFTs are formed in the display section, STEPS 1 (FIG. 18A) to 6 (FIG. 19C) are performed, as described above.

With reference to FIG. 23A (STEP 7), steps 4 are formed on the insulating films 72 and 73 and a substrate 1, and then a single-crystal silicon layer 7 is heteroepitaxially deposited on a crystalline sapphire film 50 and the steps 4 as seeds. As in STEP 8 shown in FIG. 3A, a SiO$_2$ film with a thickness of approximately 200 nm and then a SiN film with a thickness of approximately 100 nm are formed on the entire single-crystal silicon layer 7 to form an insulating film 80 (corresponding to the above described insulating film 8). Furthermore, a molybdenum-tantalum alloy sputtering film 81 with a thickness of 500 to 600 nm (corresponding to the above described sputtering film 9) is formed thereon.

With reference to FIG. 23B (STEP 8), a photoresist pattern 10 is formed, as in STEP 9 shown in FIG. 3B. By continuous etching, top-gate electrodes 82 (corresponding to the above gate electrodes 12) of the Mo—Ta alloy and gate insulating films 83 (corresponding to the above gate insulating film 11) are formed and the single-crystal silicon layer 7 is exposed.

With reference to FIG. 23C (STEP 9), the top-gate sections of the nMOSTFTs are covered with a photoresist 13, and the exposed source and drain regions of the display nMOSTFTs are doped with phosphorus ions 14 to form LDD sections 15 of N$^-$-type layers, as in STEP 10 shown in FIG. 3C.

With reference to FIG. 23D (STEP 10), the gate sections and LDD sections of the nMOSTFTs are covered with a photoresist 16, and the exposed regions are doped with phosphorus or arsenic ions 17 to form source sections 18 and drain sections 19 of N$^+$-type layers of the nMOSTFTs, as in STEP 11 shown in FIG. 4A.

Figure 24A:
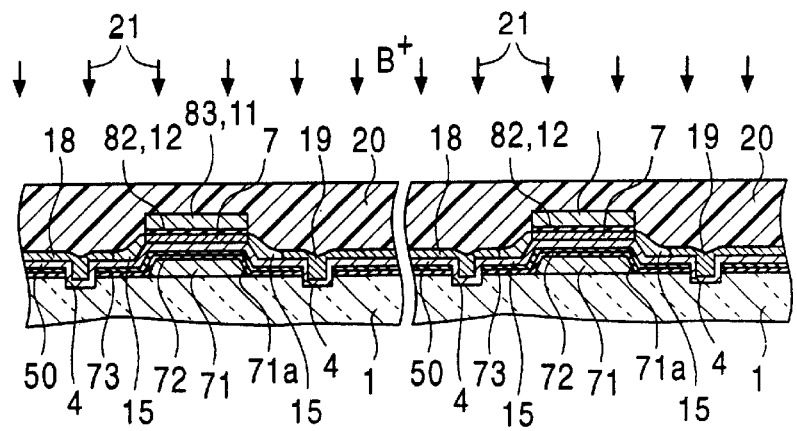
FIGS. 24A to 24D are cross-sectional views showing the subsequent production steps of the LCD in accordance with the third embodiment.

With reference to FIG. 24A (STEP 11), the gate sections of the pMOSTFTs are covered with a photoresist 20, and the exposed regions are doped with boron ions 21 to form source sections and drain sections of P$^+$-type layers of the pMOSTFTs in the peripheral-driving-circuit section, as in STEP 12 shown in FIG. 4B.

Figure 24B:
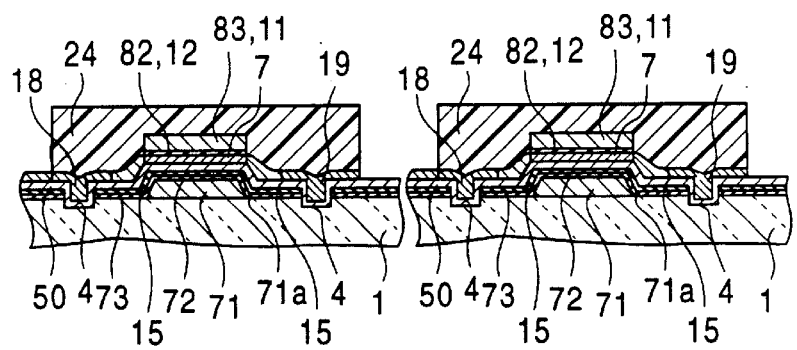

With reference to FIG. 24B (STEP 12), in order to island the active device sections and the passive device sections, photoresist layers 24 are provided on all of the active device sections and the passive device sections, and the single-crystal silicon layer 7 in other sections is selectively removed by a conventional photolithographic process or an etching process, as in STEP 13 shown in FIG. 4C.

Figure 24C:
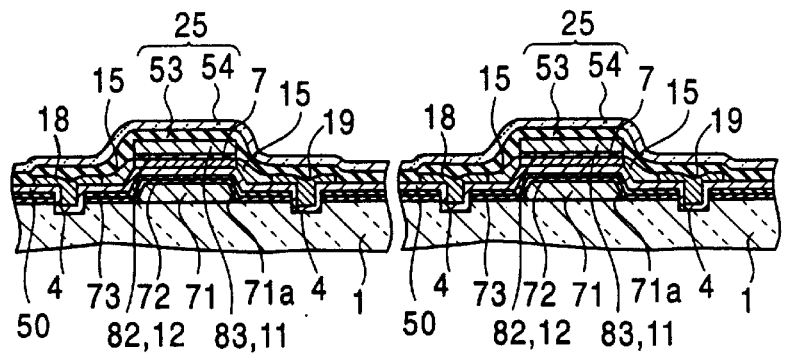

With reference to FIG. 24C (STEP 13), a SiO$_2$ film having a thickness of approximately 200 nm and then a phosphosilicate glass (PSG) film having a thickness of approximately 300 nm are deposited on the entire surface by a plasma-enhanced CVD process, a high-density plasma-enhanced CVD process or a catalytic CVD process, as in STEP 14 shown in FIG. 5A. These films 53 and 54 correspond to the above protective film 25. Next, the single-crystal silicon layer 7 is activated.

Figure 24D:
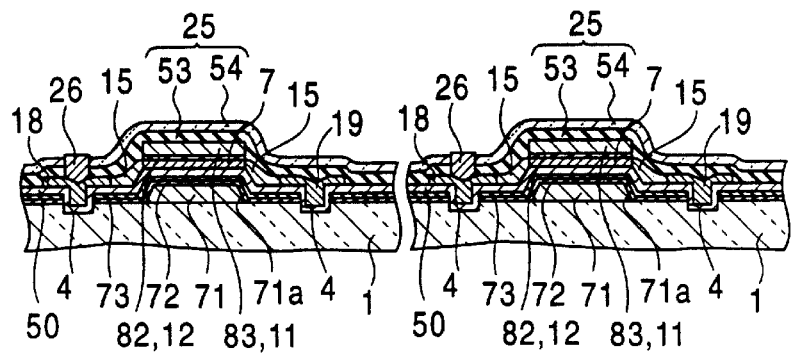

With reference to FIG. 24D (STEP 14), contact holes are formed in the source sections of the TFTS, as in STEP 15 shown in FIG. 5B. A sputtering film having a thickness of 500 to 600 nm composed of aluminum or the like is formed on the entire surface. By a conventional photolithographic process and an etching process, source electrodes 26, data lines and gate lines are simultaneously formed.

Figure 25A:
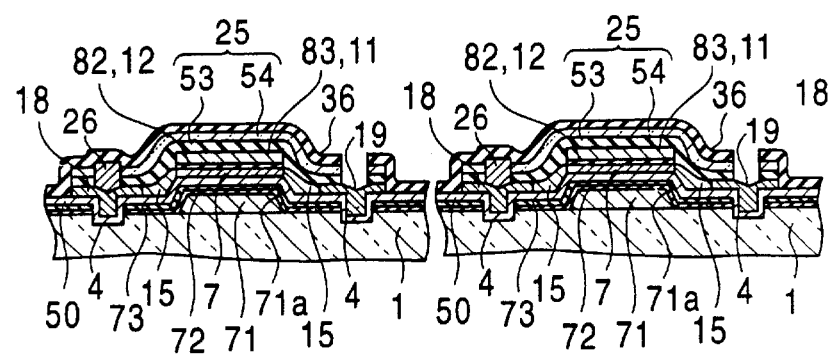
FIGS. 25A to 25C are cross-sectional views showing the subsequent production steps of the LCD in accordance with the third embodiment.

With reference to FIG. 25A (STEP 15), an insulating film 36 composed of a PSG film with a thickness of approximately 300 nm and a SiN film with a thickness of approximately 300 nm is formed on the entire surface, and then contact holes are formed in the drain sections of display TFTs, as in STEP 16 shown in FIG. 5C.

Figure 25B:
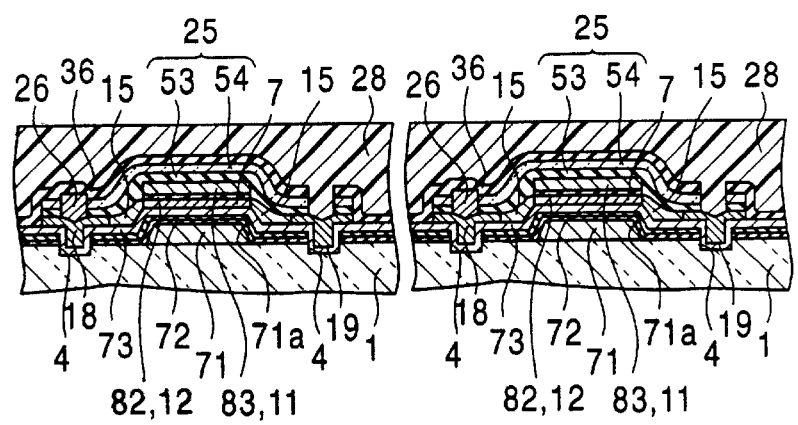
Figure 25C:
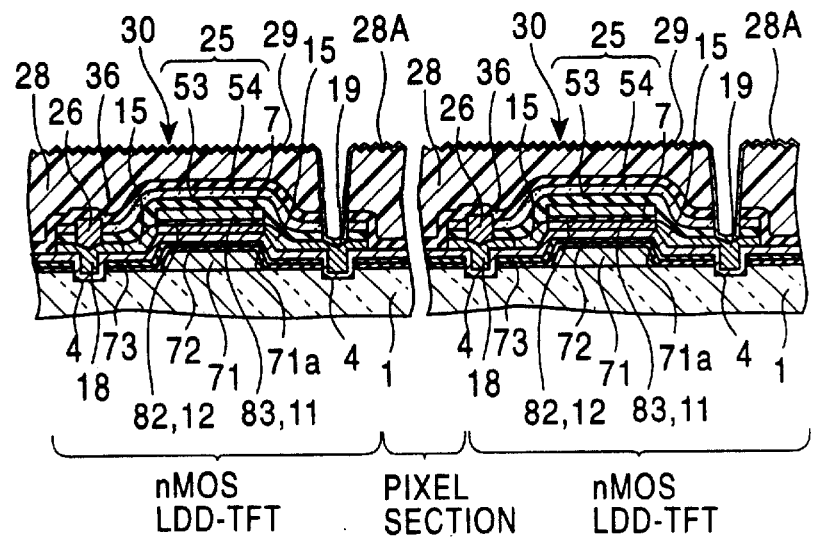

With reference to FIG. 25B (STEP 16), a photosensitive resin film 28 having a thickness of 2 to 3 μm is formed on the entire surface by spin coating. With reference to FIG. 25C (STEP 17), an uneven pattern is formed in at least the pixel region so that the pixel section has optimized reflective characteristics and viewing-angle characteristics. The uneven pattern is subjected to reflow to form a lower portion of the reflective face of an uneven surface 28A. Contact holes are simultaneously formed in the resin film in the drain sections 19 of TFTs in the display region.

The above process can produce an active matrix substrate 30 integrating a display section and a peripheral-driving-circuit section in which the display section includes dual-gate nMOSLDD-TFTs using the single-crystal silicon layer 7 formed by heteroepitaxy on the crystalline sapphire film 50 and the steps 4 as seeds and the peripheral-driving-circuit section includes a CMOS driving circuit of bottom-gate pMOSTFTs and nMOSTFTs.

Fourth Embodiment

FIGS. 26A to 31C show a fourth embodiment of the present invention.

In this embodiment, the gate electrode at the top-gate section is composed of a material having relatively low thermal resistance, such as aluminum, unlike the above embodiments.

When top-gate MOSTFTs are provided in the display section and the bottom-gate MOSTFTs are provided in the peripheral-driving-circuit section, STEPS 1 to 7 shown in FIGS. 1A to 2D, respectively, are performed to form an N-type well 7A at the pMOSTFT section in the peripheral-driving-circuit section, as shown in FIG. 26A (STEP 7).

With reference to FIG. 26B (STEP 8), all of the nMOSTFTs and pMOSTFTs in the peripheral-driving-circuit section and the gate section of the nMOSTFTs in the display section are covered with a photoresist 13, and the exposed source and drain regions of the nMOSTFTs are doped with phosphorus ions 14 by ion implantation, for example, at 20 kV and at a dose of 5×10$^{13}$ atoms/cm$^2$ to form a LDD section 15 composed of an N$^-$-type layer by self-alignment.

Figure 27A:
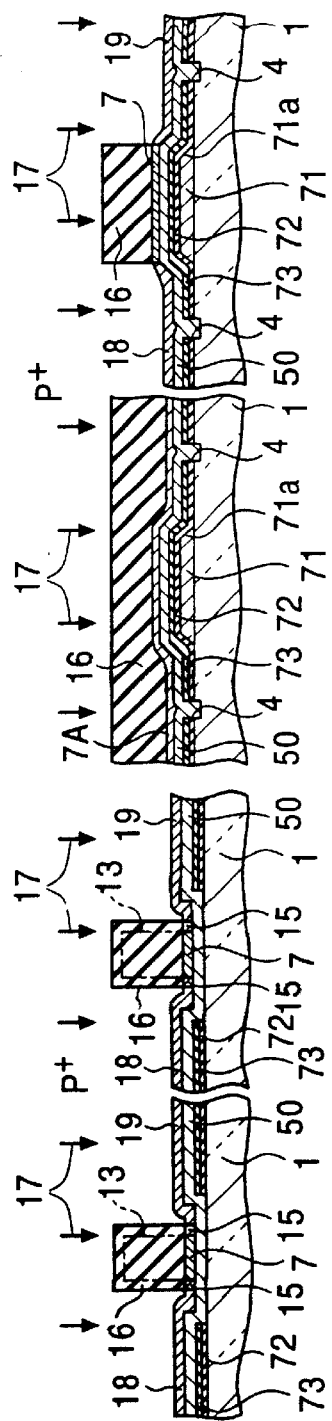
FIGS. 27A to 27C are cross-sectional views showing the subsequent production steps of the LCD in accordance with the fourth embodiment of the present invention.

With reference to FIG. 27A (STEP 9), all of the pMOSTFTs in the peripheral-driving-circuit section, the gate sections of the nMOSTFTs in the peripheral-driving-circuit section, and the gate section and the LDD section of the nMOSTFTs in the display section are covered with a photoresist 16. The exposed region is doped with phosphorus or arsenic ions 17, for example, at 20 kV and at a dose of 5×10$^{15}$ atoms/cm$^2$ by ion implantation to form a source section 18, a drain section 19 and a LDD section 15 of nMOSTFT composed of an N$^+$-type layer. Preferably, the resist 13 is retained, as shown by the dotted line in the drawing, and the resist 16 is provided so as to cover the resist 13. In the formation process of the resist 16, a mask is readily aligned with high accuracy with reference to the resist 13.

Figure 27B:
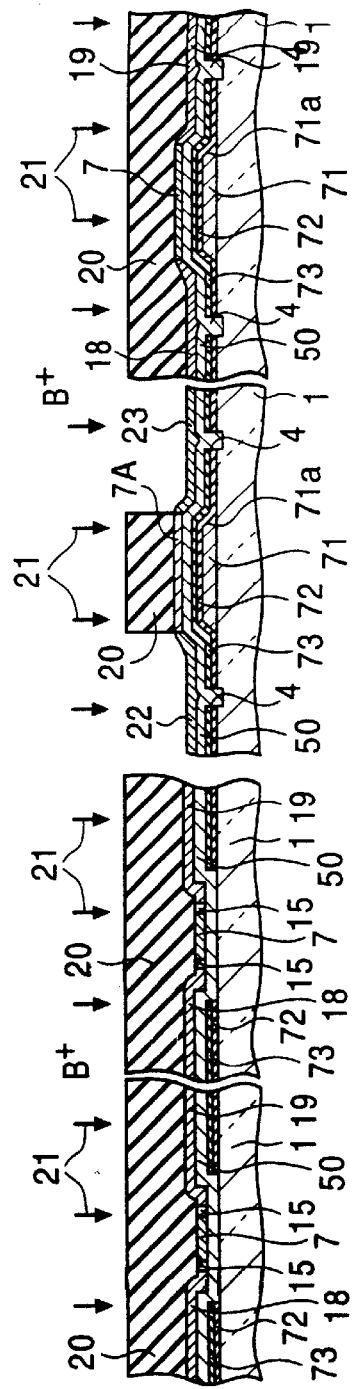

With reference to FIG. 27B (STEP 10), all of the nMOSTFTs in the peripheral-driving-circuit section and the display section and the gate sections of the pMOSTFTs are covered with a photoresist 20. The exposed regions are doped with boron ions 21 by ion implantation at 10 kV and at a dose of 5×10$^{15}$ atoms/cm$^2$ to form source sections 22 and drain sections 23 of the pMOSTFTs composed of a P$^+$-type layer.

Figure 27C:
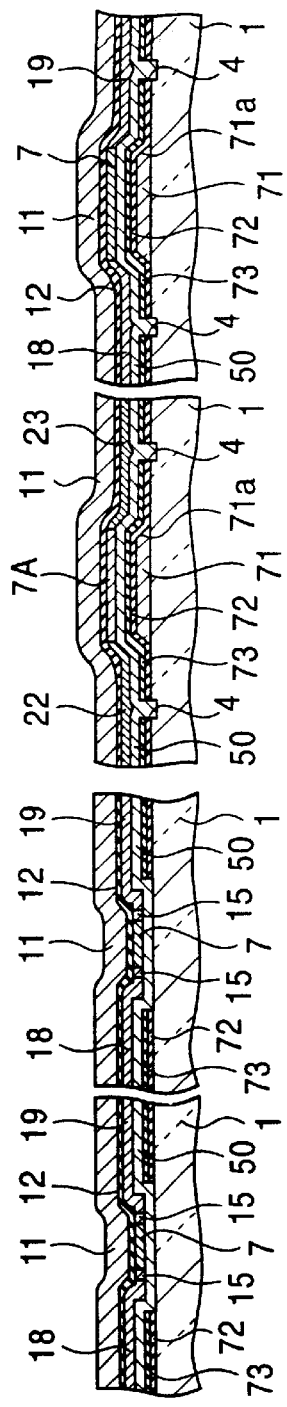

With reference to FIG. 27C (STEP 11), the resist 20 is removed, and then the single-crystal silicon layers 7 and 7A are activated as described above. Furthermore, a gate insulating film 12, and a gate electrode layer 11 (composed of pure aluminum or 1%-silicon containing aluminum) are formed. The gate electrode layer 11 may be formed by a vacuum evaporation process or a sputtering process.

Figure 28A:
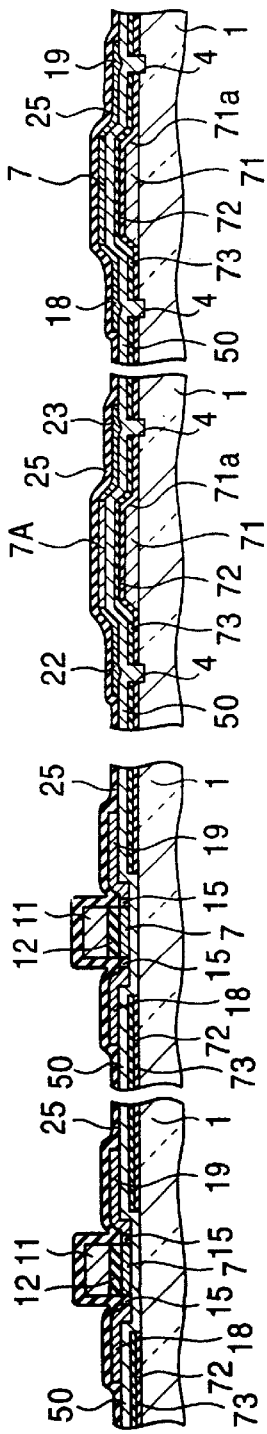
FIGS. 28A and 28B are cross-sectional views showing the subsequent production steps of the LCD in accordance with the fourth embodiment of the present invention.

The gate section is patterned, and the active device section and the passive device section are isolated. With reference to FIG. 28A (STEP 12), a $SiO_2$ film having a thickness of approximately 200 nm and then a phosphosilicate glass (PSG) film having a thickness of approximately 300 nm are deposited on the entire surface to form a protective film 25.

Figure 28B:
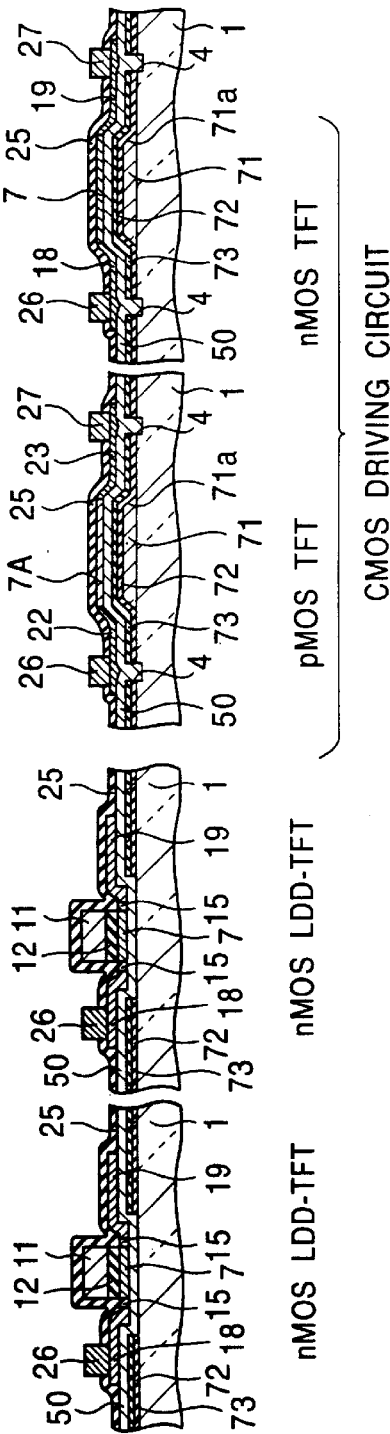

With reference to FIG. 28B (STEP 13), contact holes are formed at the source and drain sections of all TFTs in the peripheral-driving-circuit section and the source sections of the display TFTs by conventional photolithography and etching.

A sputtering film having a thickness of 500 to 600 nm, which is composed of pure aluminum or 1%-silicon containing aluminum, is formed on the entire surface. Source electrodes 26 of all TFTs in the peripheral-driving-circuit section and the display section, drain electrodes 27 in the peripheral-driving-circuit section, data lines and gate lines are simultaneously formed by conventional photolithography and etching. The substrate is subjected to sintering treatment in a forming gas (nitrogen and hydrogen) at approximately 400° C. for 1 hour.

As in STEPS 16 to 19 shown in FIG. 5C to FIG. 6C, an active-matrix substrate 30 integrating a display section and a peripheral-driving-circuit section is produced, in which the display section and the peripheral-driving-circuit section include top-gate nMOSLDD-TFTs having pure-aluminum or 1%-silicon-containing-aluminum gate electrodes, and a CMOS driving circuit having bottom-gate pMOSTFTs and nMOSTFTs using the single-crystal silicon layer 7.

Since the pure-aluminum or 1%-silicon-containing-aluminum gate electrodes 11 are formed after the activation treatment of the single-crystal silicon layer 7, the gate electrode material is not subject to the activation treatment. Any inexpensive material having relatively low heat resistance, such as pure aluminum or 1%-silicon-containing aluminum, may be used for the gate electrode. This process can also be applied when the display section includes bottom-gate MOSTFTs.

When dual-gate MOSTFTs and bottom-gate MOSTFTs are formed in the display section and the peripheral-driving-circuit section, respectively, the processes shown in FIG. 18A (STEP 1) to 19C (STEP 6) are performed, and then an N-type well 7A is formed at the pMOSTFT section in the peripheral-driving-circuit section, as shown in FIG. 29A (STEP 6).

With reference to FIG. 29B (STEP 7), the TFT s in the display section are doped with phosphorus ions 14 to form LDD sections 15, as in STEP 8 shown in FIG. 26B.

With reference to FIG. 30A (STEP 8), the nMOSTFT sections in the display section and the peripheral-driving-circuit section are doped with phosphorus ions 17 to form $N^+$-type source regions 18 and drain regions 19, as in STEP 9 shown in FIG. 27A.

With reference to FIG. 30B (STEP 9), the pMOSTFT section in the peripheral-driving-circuit section is doped with boron ions 21 to form a $P^+$-type source region 22 and a $P^+$-type drain region 23, as in STEP 10 shown in FIG. 27B.

Figure 31A:
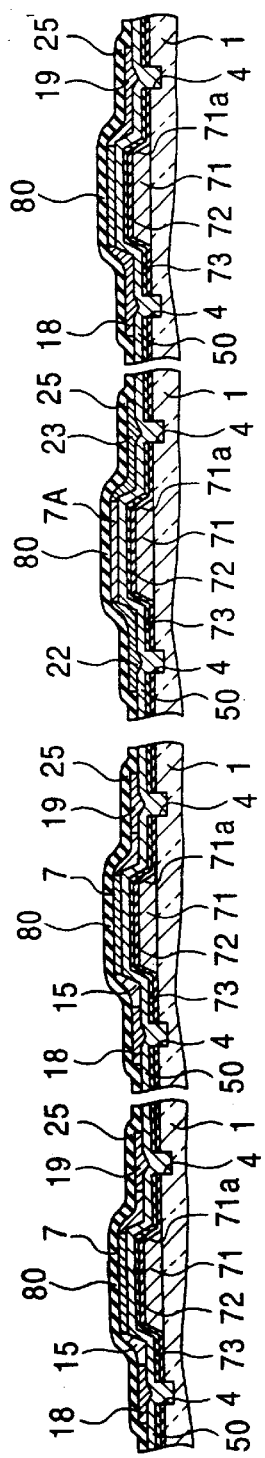
FIGS. 31A to 31C are cross-sectional views showing the subsequent production steps of the LCD in accordance with the fourth embodiment of the present invention.

With reference to FIG. 30C (STEP 10), the resist 20 is removed, and then the single-crystal silicon layer 7 is patterned to island the active device section and the passive device section. With reference to FIG. 31A (STEP 11), the single-crystal silicon layers 7 and 7A are activated as described above. Furthermore, a gate insulating film 80 is formed on the surface.

Figure 31B:
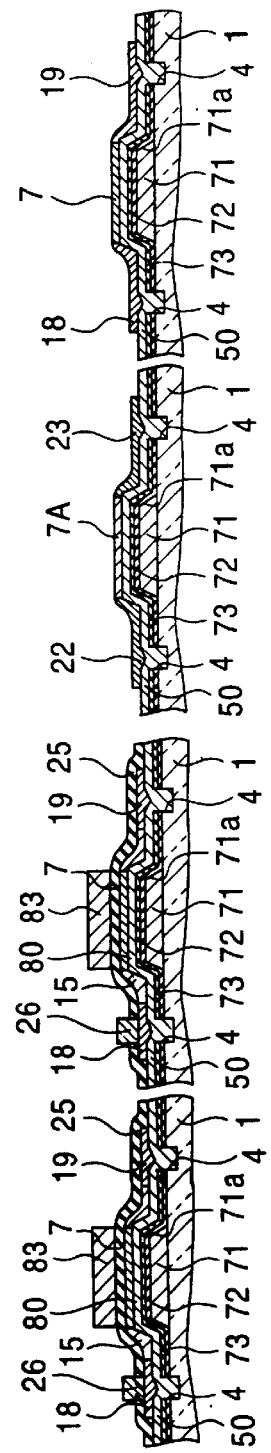

With reference to FIG. 31B (STEP 12), an aluminum film formed on the entire surface by a sputtering process is patterned to form upper-gate electrodes 83 in the display section.

Figure 31C:
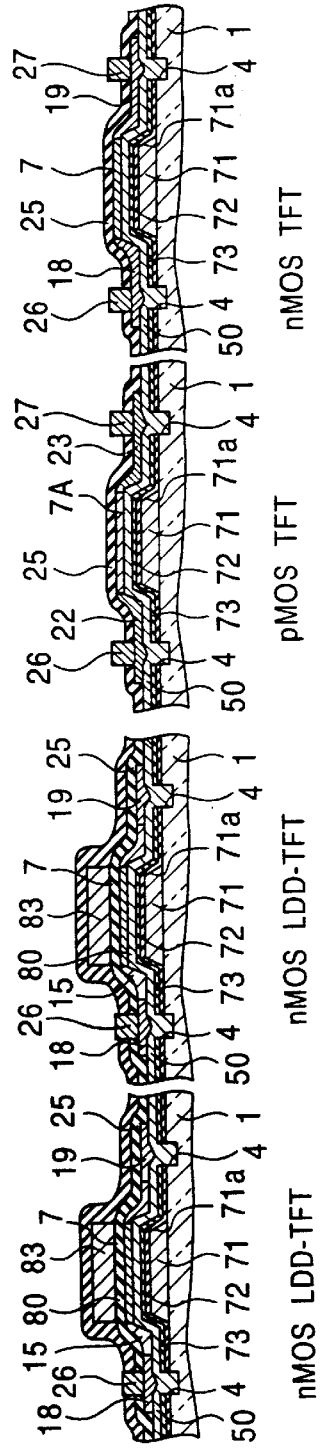

With reference to FIG. 31C (STEP 13), a $SiO_2$ film having a thickness of approximately 200 nm and then a PSG film having a thickness of approximately 300 nm are deposited to form a protective film 25.

Source electrodes 26 of all TFTs in the peripheral-driving-circuit section and the display section and a drain electrode 27 in the peripheral-driving-circuit section are formed as above to form an active-matrix substrate 30 integrating the display section and the peripheral-driving-circuit section including a CMOS driving circuit having dual-gate nMOSLDD-TFTs, bottom-gate pMOSTFTs and bottom-gate nMOSTFTs using aluminum etc., as gate electrodes.

Since the gate electrodes 83 are formed after the activation treatment of the single-crystal silicon layer 7 in this embodiment, any inexpensive material having relatively low heat resistance, such as aluminum, may be used for the gate electrode. The source electrodes 26 (and the drain electrodes 27) may be simultaneously formed in STEP 12 shown in FIG. 31B, and this simplified process is advantageous.

Figure 32A:
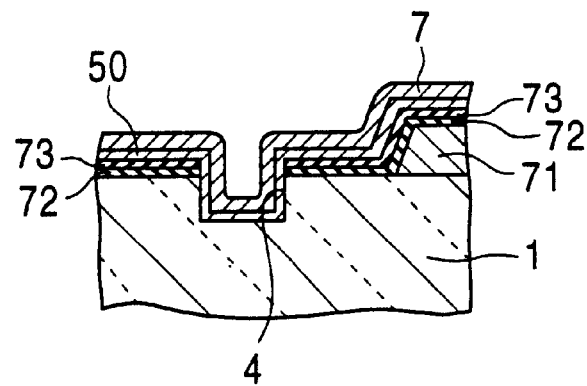
FIGS. 32A to 32C are cross-sectional views of main section of the LCD in the production steps in accordance with the fourth embodiment.
Figure 32B:
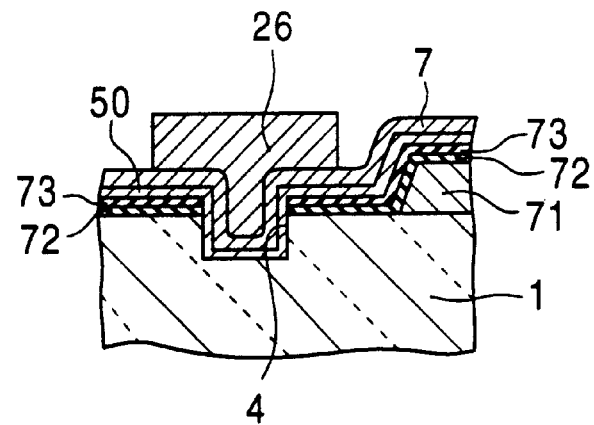
Figure 32C:
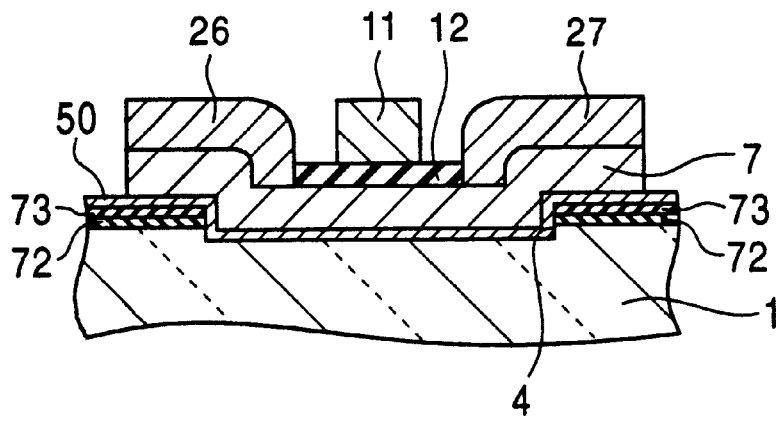

When the bottom-gate, top-gate or dual-gate MOSTFTs are formed in the above-described embodiments, the thin single-crystal silicon layer 7 deposited on the step 4 may have discontinued or thin portions causing disconnection or increased resistance, as schematically shown in FIG. 32A. Thus, the source electrode 26 (or the drain electrode 27) is preferably provided in a region including the step 4 in order to ensure the connection to the single-crystal silicon layer 7, as shown in FIGS. 32B and 32C.

As an alternative to STEP 8 shown in FIG. 26B or STEP 7 shown in FIG. 29B, after the formation of the top-gate insulating film on the single-crystal silicon layer 7, ion implantation and activation treatment may be performed and then the top-gate electrodes and source and drain electrodes may be simultaneously formed.

The steps 4 are formed on the substrate 1 (and the overlying SiN film) in the above embodiments, as shown in FIG. 33A. Alternatively, the steps 4 may be formed on the crystalline sapphire film 50 on the substrate 1, as shown in FIG. 33B, in which the crystalline sapphire film 50 inhibits diffusion of ions from the glass substrate 1. Instead, the steps 4 may be formed on the gate insulating films 72 and 73 formed below the crystalline sapphire film 50. FIGS. 33C, 33D and 33E show steps 4 provided on the crystalline sapphire film 50.

Fifth Embodiment

FIG. 34A to FIG. 36B show a fifth embodiment of the present invention.

In this embodiment. TFTs are formed at the exterior of the steps 4, that is, in regions other than the steps 4. In these drawings, the single-crystal silicon layer 7 and the gate electrodes 11, source electrodes 26 and drain electrodes 27 are simplified.

Figure 34A:
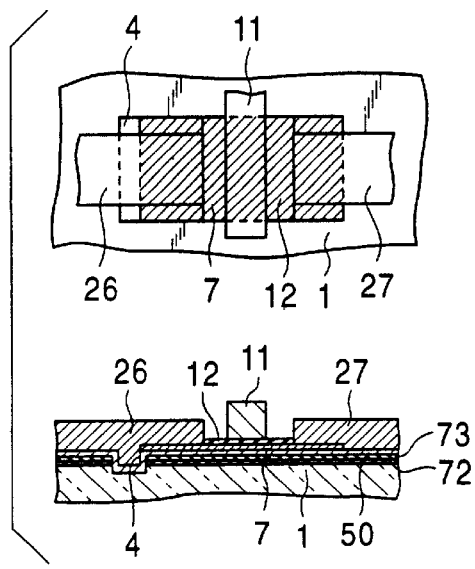
FIGS. 34A to 34E are plan views and cross-sectional views of various TFTs in a LCD in accordance with a fifth embodiment of the present invention.
Figure 34B:
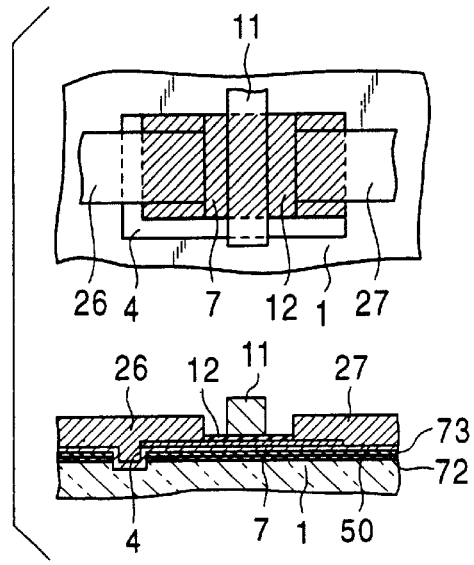
Figure 34C:
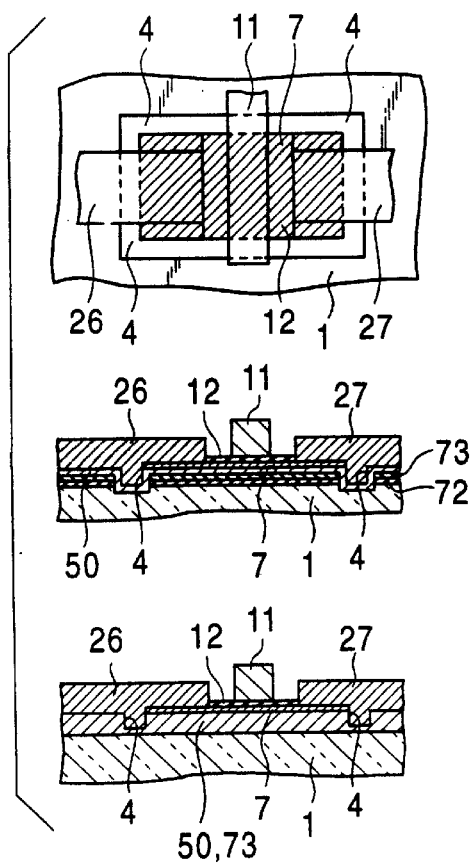

FIGS. 34A to 34E show bottom-gate MOSTFTs. In FIG. 34A, the gate insulating film 12 and the gate electrode 11 are formed on the flat portion of the single-crystal silicon layer 7 on the substrate. In FIG. 34B, the step 4 has an L shape and extends from the source region to the edge of the drain region in the longitudinal direction of the channel. In FIG.

Figure 34D:
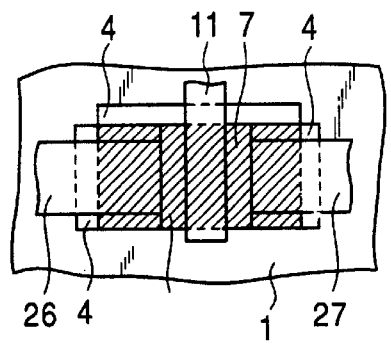
Figure 34E:
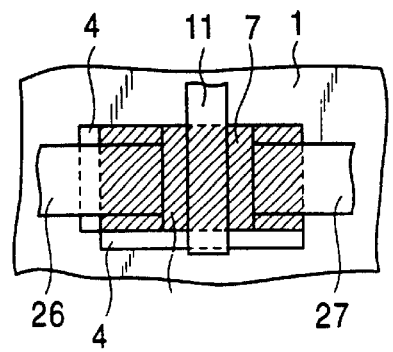

34C, the step 4 is rectangular and extends so that the TFT active region is entirely surrounded by the step. In FIG. 34D, three sides of the step 4 surround the TFT active region, and in FIG. 34E, two sides of the step 4 surround the TFT active region. In any case, two adjacent steps 4 are not continuous.

Accordingly, the TFT can be readily provided on the flat surface in the exterior of the step 4 having any shape.

Figure 35A:
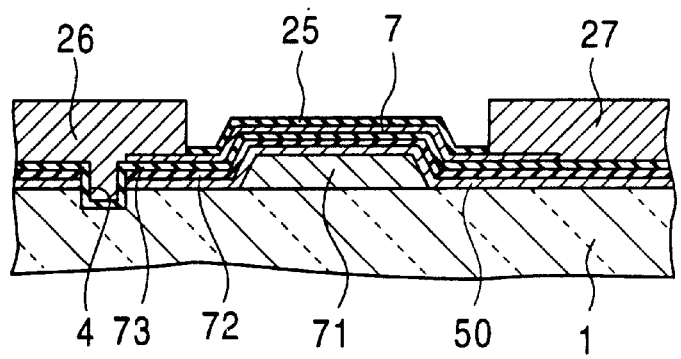
FIGS. 35A to 35D are cross-sectional views of various TFTs in production steps of the fifth embodiment of the present invention.
Figure 35B:
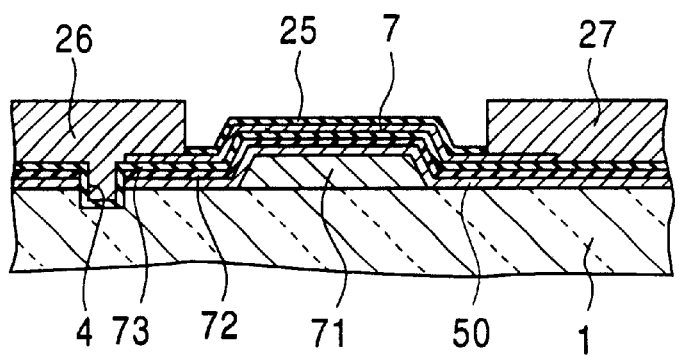
Figure 35C:
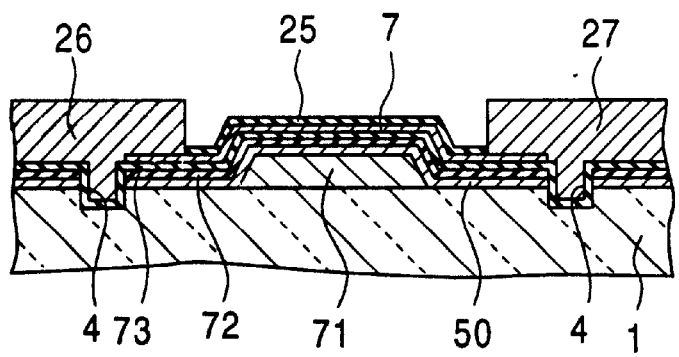
Figure 35D:
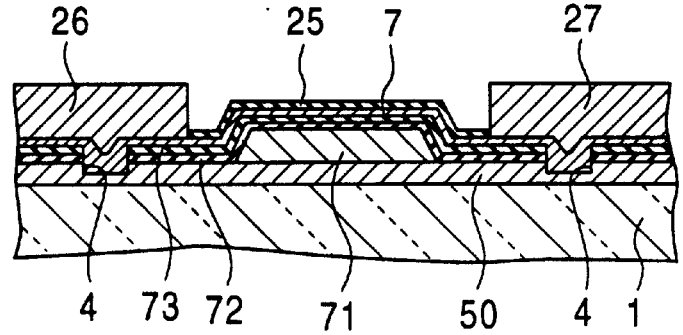

FIGS. 35A to 35D show bottom-gate MOSTFTs. Any step or indented section 4 shown in FIGS. 34A to 34E may also be formed in this type. In FIG. 35A corresponding to FIG. 34A, the bottom-gate MOSTFT is formed on the flat portion in the exterior of the step 4. FIG. 35B corresponds to FIG. 34B, and FIG. 35C corresponds to FIG. 34C or 34D. FIG. 35D shows a step 4 provided on the crystalline sapphire film 50.

Figure 36A:
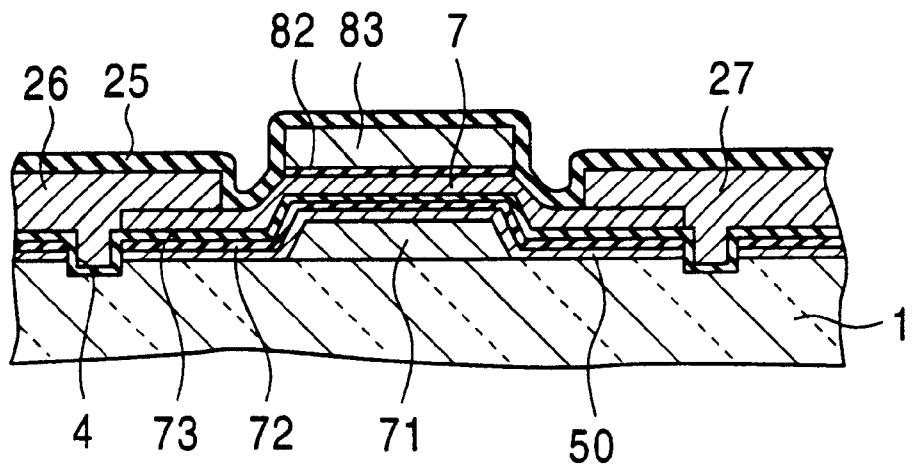
FIGS. 36A and 36B are cross-sectional views of main sections of the LCD of the fifth embodiment.
Figure 36B:
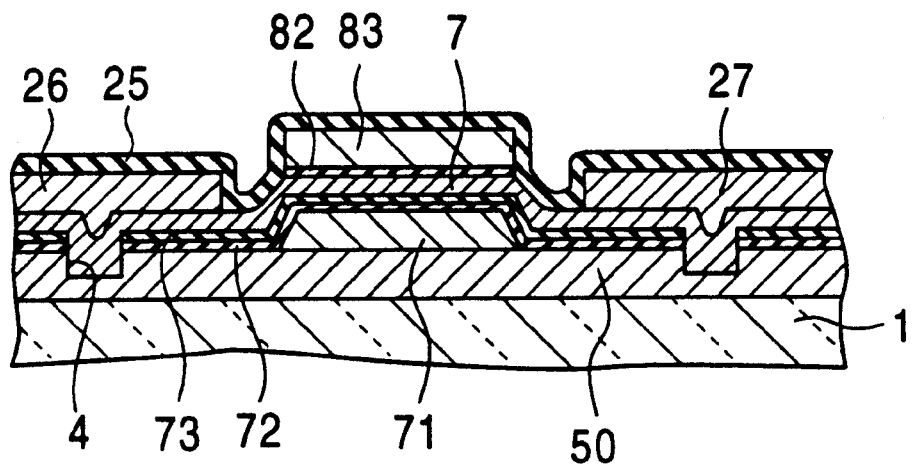

FIGS. 36A and 26B show dual-gate MOSTFTs. Any step 4 shown in FIGS. 34A to 34E may also be formed in this type. For example, the dual-gate MOSTFT may be formed on the flat portion in the interior of the step 4 shown in FIG. 34C.

Sixth Embodiment

FIGS. 37A to 39B show a sixth embodiment of the present invention.

FIGS. 37A and 37B show a self-alignment type LDD-TFT, for example, a double-gate MOSTFT including a plurality of top-gate LDD-TFTs.

A gate electrode 11 has two branches, that is, a first gate 11A and a second gate 11B. The first gate 11A is used for a first LDD-TFT 51 and the second gate is used for a second LDD-TFT 52. An N$^+$-type region 100 is provided in the center of the single-crystal silicon layer between these gates in order to decrease resistance. Different voltages may be applied to these gates. If one gate is not operable for any reason, the other gate will perform transfer of carriers between the source and the drain. Thus, the double-gate configuration has high reliability. The first LDD-TFT 51 and the second LDD-TFT 52 are connected in series and function as thin-film transistors for driving a pixel. In an OFF mode, a voltage applied between the source and the drain of each thin-film transistor can be significantly reduced. Thus, the leakage current in the OFF mode can be reduced, resulting in improved contrast and image quality in the liquid crystal display. Since these two LDD transistors are connected with the semiconductor layer which is the same as the low-concentration drain region, the conductive distance between the transistors can be reduced. Thus, this configuration can avoid an increase in the transistor area regardless of a dual LDD transistor configuration. The first and second gates may be isolated for independent operation.

Figure 38A:
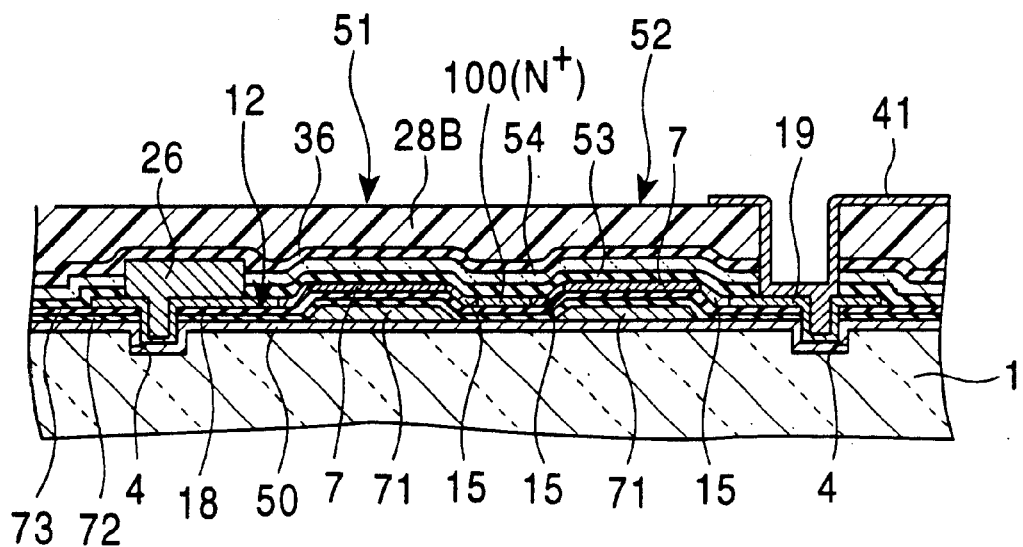
FIGS. 38A and 38B are cross-sectional views of various TFTs in the LCD of the sixth embodiment of the present invention.
Figure 38B:
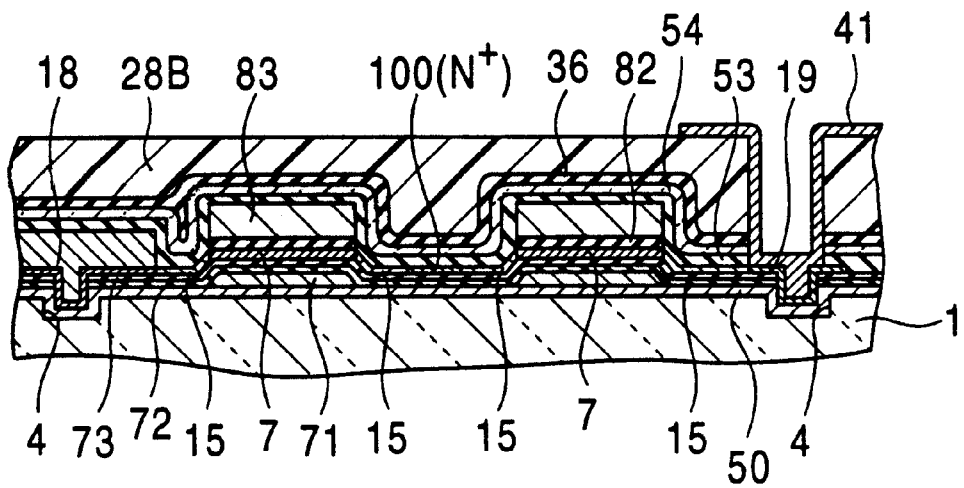

FIG. 38A shows a double-gate configuration of bottom-gate MOSTFTs, and FIG. 38B shows a double-gate configuration of dual-gate MOSTFTs.

These double-gate MOSTFTs have the same advantages as those in the above-described top-gate type. If one gate section is not operable in the dual-gate type, the other gate section can be used.

Figure 39A:
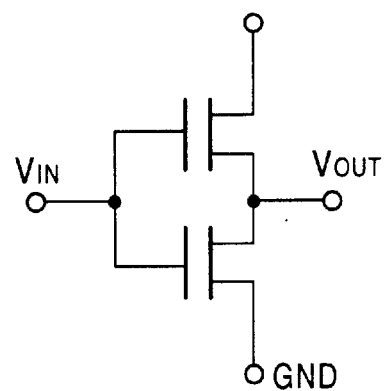
FIGS. 39A and 39B are equivalent circuit diagrams of various TFTs in the LCD of the sixth embodiment of the present invention.
Figure 39B:
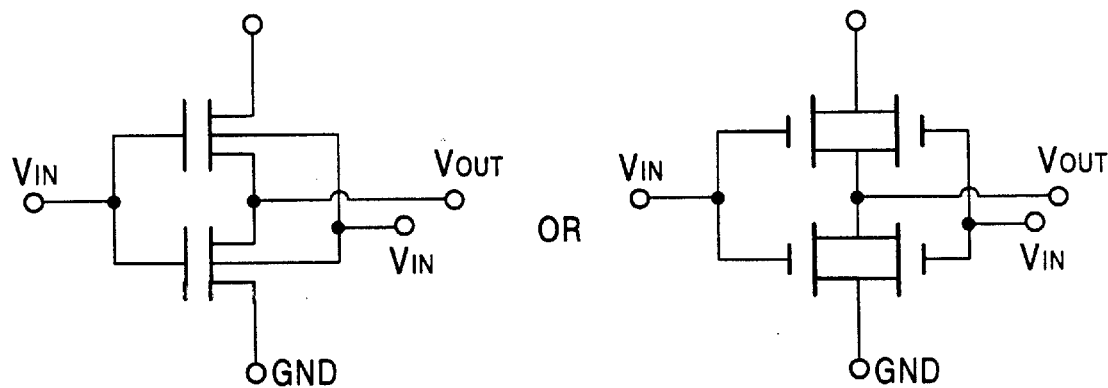

FIG. 39A is an equivalent circuit diagram of a top-gate or bottom-gate MOSTFT having a double-gate configuration. FIG. 39B is an equivalent circuit diagram of a dual-gate MOSTFT having a double-gate configuration. In each circuit diagram, the gate may be divided into three or more. In the multi-gate configuration, the branched gate electrodes having the same potential may be provided or isolated gate electrodes having the same potential or different potentials may be provided in the channel region.

Seventh Embodiment

Figure 40A:
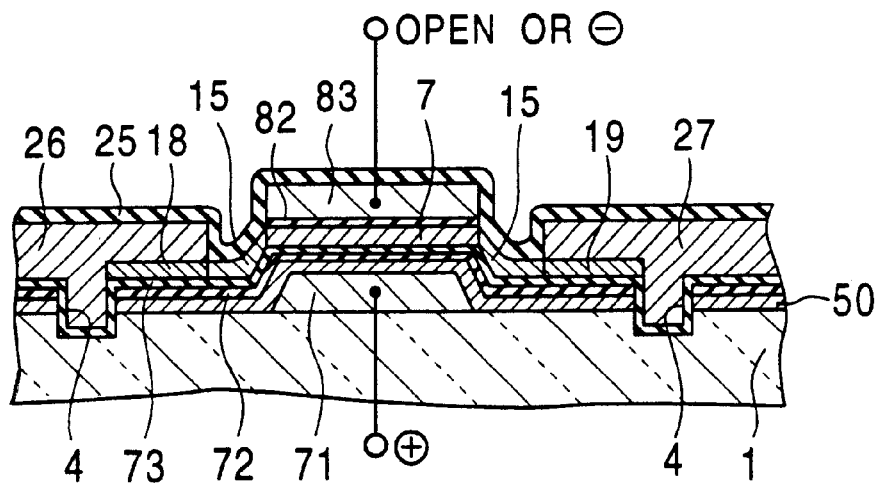
FIGS. 40A and 40B are cross-sectional views of main sections of the LCD of a seventh embodiment.
Figure 40B:
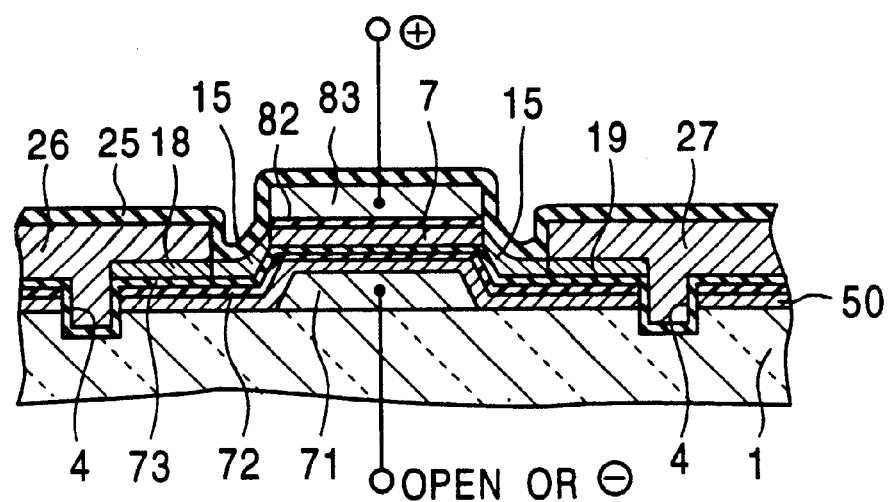

FIGS. 40A and 40B show an eleventh embodiment of the present invention. In a dual-gate type nMOSTFT, one of the upper and lower-gate sections is used in a transistor operation, whereas the other operates as follows.

In an nMOSTFT shown in FIG. 40A, an appropriate negative voltage is always applied to the gate electrode at the top-gate side to reduce the leakage current in the back channel. When the top-gate electrode is opened, this is used as a bottom-gate type. In FIG. 40B, an appropriate negative voltage is always applied to the gate electrode at the bottom-gate side to reduce the leakage current in the back channel. When the bottom-gate electrode is opened, this is used as a top-gate type. In a pMOSTFT, an appropriate positive voltage is applied to the gate electrode to reduce the leakage current in the back channel.

The interface between the single-crystal silicon layer 7 and the insulating film has low crystallinity which readily causes a leakage current. The above-mentioned negative voltage applied to the gate electrode can reduce the leakage current. Furthermore, the bottom-gate electrode shades the light incident on the substrate 1. Thus, the leakage current caused by the incident light can be reduced.

Eighth Embodiment

FIG. 41A to FIG. 47 shows an eighth embodiment of the present invention.

In this embodiment, no step is formed on the substrate, and the above-described compound layer, for example, a crystalline sapphire film is formed on the flat surface of the substrate. A single-crystal silicon layer is heteroepitaxially deposited on the compound layer as a seed by a catalytic CVD process. The single-crystal silicon layer is used for top-gate MOSTFTs in a display section and bottom-gate MOSTFTs in a peripheral-driving-circuit section of an active-matrix reflective liquid crystal device (LCD).

With reference to FIGS. 41A to 47, the production steps of the active-matrix reflective LCD will be described. In FIGS. 41A to 46C, the right side represents the display section and the right side represents the peripheral-driving-circuit section.

With reference to FIG. 41A (STEP 1), a molybdenum-tantalum sputtering film 71 with a thickness of 500 to 600 nm is formed on a main surface of an insulating substrate 1 composed of borosilicate glass, quartz glass or transparent crystallized glass.

With reference to FIG. 41B (STEP 2), a photoresist 70 having a predetermined pattern is formed thereon and then the Mo—Ta film is subjected to taper etching through the photoresist 70 as a mask to form a trapezoidal gate electrode 71 having side faces 71a which has a gentle slope of 20 to 45 degrees.

With reference to FIG. 41C (STEP 3), the photoresist 70 is removed, and a SiN film 72 with a thickness of approximately 100 nm and then a SiO$_2$ film 73 with a thickness of approximately 200 nm are deposited on the entire substrate 1 including the Mo—Ta film 71 by a plasma enhanced CVD process to form a gate insulating film.

With reference to FIG. 42A (STEP 4), a crystalline sapphire film 50 with a thickness of 20 to 200 nm is formed in at least TFT-forming region on the insulating substrate 1. The crystalline sapphire film 50 may be formed by oxidation of gaseous trimethylaluminum with an acidic gas such as oxygen or moisture and then crystallization by a high-density plasma enhanced CVD process or a catalytic CVD process (disclosed in, for example, Japanese Patent Application Laid-Open No. 63-40314). As the insulating substrate 1, a highly heat-resistant glass substrate with a diameter of 8 to 12 inches and a thickness of 700 to 800 μm may be used.

With reference to FIG. 42B (STEP 5), a single-crystal silicon film 7 with a thickness of several μm to 0.005 μm (typically 0.1 μ) is heteroepitaxially deposited thereon by a catalytic CVD process, as in STEP 6 shown in FIG. 2C. In this step, the substrate temperature is generally 200 to 600° C. when the substrate 1 is composed of borosilicate glass or 600 to 800° C. when the substrate 1 is composed of quartz glass, crystallized glass, or ceramic.

Since the deposited single-crystal silicon layer 7 shows high lattice matching with the crystalline sapphire film 50, for example, a (100) plane heteroepitaxially grows on the substrate.

Top-gate or bottom-gate MOSTFTs using the single-crystal silicon layer 7 as the channel region are formed, as described above.

The entire surface of the single-crystal silicon layer 7 is doped with a P-type impurity, for example, adequate amounts of boron ions to adjust the specific resistance. Furthermore, the pMOSTFT-forming region is selectively doped with an N-type impurity to form an N-type well. For example, the p-channel TFT section is masked with a photoresist (not shown in the drawing) and is doped with P-type impurity ions such as $B^+$ at 10 kV and at a dose of $2.7 \times 10^{11}$ atoms/cm$^2$ to adjust the specific resistance. With reference to FIG. 42C (STEP 6), in order to control the concentration of the impurity in the pMOSTFT-forming region, the nMOSTFT section is masked with a photoresist 60 and is doped with N-type impurity ions 65 such as $P^+$ at 10 kV and at a dose of $1 \times 10^{11}$ atoms/cm$^2$ to form an n-type well 7A.

With reference to FIG. 43A (STEP 7), a $SiO_2$ film having a thickness of approximately 200 nm and then a SiN film having a thickness of approximately 100 nm are continuously deposited on the entire single-crystal silicon layer 7 by a plasma-enhanced CVD process, a high-density plasma-enhanced CVD process or a catalytic CVD process to form a gate insulating film 8. A molybdenum-tantalum (Mo—Ta) alloy film 9 having a thickness of 500 to 600 nm is formed thereon by a sputtering process.

With reference to FIG. 43B (STEP 8), a photoresist pattern 10 is formed in the step regions (indented sections) of the TFT sections in the display region and the peripheral driving region by any conventional photolithographic process. By continuous etching, gate electrodes 11 of the Mo—Ta alloy film 9 and gate insulating films 12 of SiN—$SiO_2$ are formed and the single-crystal silicon layer 7 is exposed. The Mo—Ta alloy film 9 is etched using an acidic solution, SiN is etched by plasma etching using gaseous $CF_4$, and $SiO_2$ is etched using a hydrofluoric acid solution.

With reference to FIG. 43C (STEP 9), all of the nMOST-FTs and pMOSTFTs in the peripheral driving region and the gate sections of the nMOSTFTs in the display region are covered with a photoresist 13. The exposed source and drain regions of the nMOSTFTs are doped with, for example, phosphorus ions 14 by ion implantation at 20 kV and at a dose of $5 \times 10^{13}$ atoms/cm$^2$ to form LDD sections 15 of an $N^-$-type layer by self-alignment.

With reference to FIG. 44A (STEP 10), all of the pMOST-FTs in the peripheral driving region, the gate sections of the nMOSTFTs in the peripheral driving region, and the gate sections and the LDD sections of the nMOSTFTs in the display region are covered with a photoresist 16. The exposed regions are doped with phosphorus or arsenic ions 17 by ion implantation at 20 kV and at a dose of $5 \times 10^{15}$ atoms/cm$^2$ to form source sections 18, drain sections 19 and the LDD sections 15 of an $N^+$-type layer of the nMOSTFTs.

With reference to FIG. 44B (STEP 11), all of the nMOST-FTs in the peripheral driving region and the display region and the gate sections of the pMOSTFTs in the peripheral driving region are covered with a photoresist 20. The exposed regions are doped with boron ions 21 by ion implantation at 10 kV and at a dose of $5 \times 10^{15}$ atoms/cm$^2$ to form source sections 22 and drain sections 23 of a $P^+$-type layer of the pMOSTFTs. In the case of an nMOS peripheral driving circuit, this step is not necessary since the circuit does not have a pMOSTFT.

With reference to FIG. 44C (STEP 12), in order to island the active device sections including TFTs and diodes and the passive device sections including resistors and inductors, photoresist layers 24 are provided on all of the active device sections and the passive device sections in the peripheral driving region and the display section, and the single-crystal silicon layer 7 in other sections is removed by a conventional photolithographic process or an etching process using a hydrofluoric acid solution.

With reference to FIG. 45A (STEP 13), a $SiO_2$ film having a thickness of approximately 200 nm and then a phosphosilicate glass (PSG) film having a thickness of approximately 300 nm are continuously deposited to form a protective film 25 on the entire surface by a plasma-enhanced CVD process, a high-density plasma-enhanced CVD process or a catalytic CVD process.

In such a state, the single-crystal silicon layer is activated. Since activation treatment is performed at approximately 1,000° C. for approximately 10 seconds using, for example, a halogen lamp, the gate electrode composed of the Mo—Ta alloy having a high melting point is durable during the annealing for activation. The Mo—Ta alloy having a high melting point is suitable for such an electrode material. The Mo—Ta alloy can be used for not only the gate section but also lead lines over a wide range. In the activation, excimer laser annealing requiring high process costs is generally not used. If excimer laser annealing is used, overlapping scanning of 90% or more is preferably performed on the entire surface or selectively the active device section and the passive device section using XeCl (wavelength: 308 nm).

With reference to FIG. 45B (STEP 14), contact holes are formed in all of the source-drain sections of the TFTs in the peripheral driving circuit and the source sections of the TFTs in the display region, by a conventional photolithographic process and an etching process.

A pure-aluminum or 1%-copper-containing aluminum sputtering film having a thickness of 500 to 600 nm is formed on the entire surface. By a conventional photolithographic process and an etching process, source electrodes 26 of all TFTs in the peripheral driving circuit and the display region and drain electrodes 27 in the peripheral driving circuit are formed, and data lines and gate lines are simultaneously formed. Next, these are subjected to sintering at approximately 400° C. for 1 hour in a forming gas containing nitrogen and hydrogen.

With reference to FIG. 45C (STEP 15), an insulating film 36 composed of a PSG film with a thickness of approximately 300 nm and a SiN film with a thickness of approximately 300 nm is formed on the entire surface by a plasma-enhanced CVD process, a high-density plasma-enhanced CVD process, or a catalytic CVD process. Next, contact holes are formed in the drain sections of display TFTs. It is not necessary to remove the $SiO_2$, PSG and SiN films in the pixel sections.

Figure 46A:
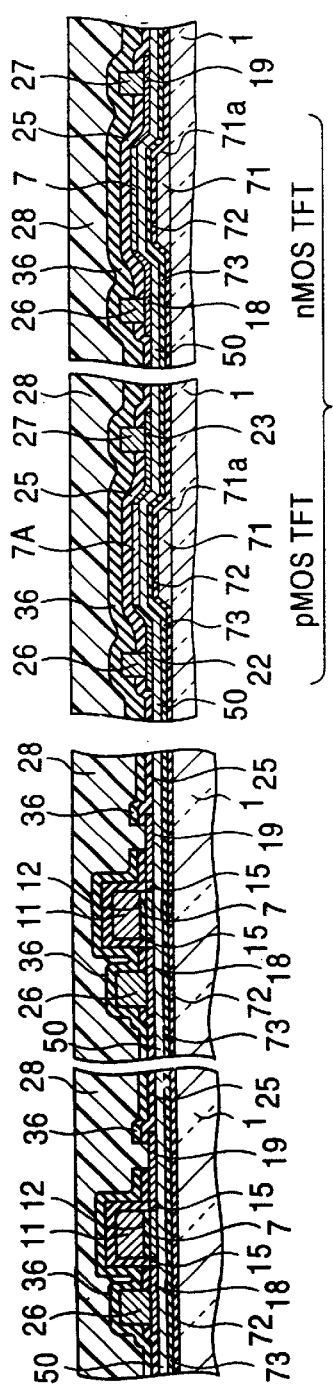
FIGS. 46A to 46C are cross-sectional views showing the subsequent production steps of the LCD in accordance with the eighth embodiment of the present invention.
Figure 46B:
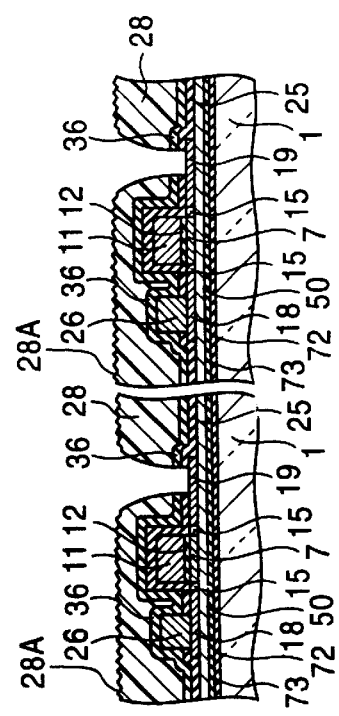
Figure 46C:
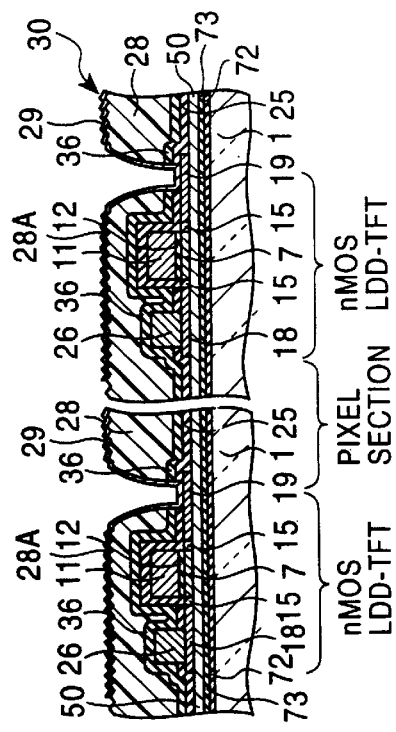

With reference to FIG. 46A (STEP 16), a photosensitive resin film 28 having a thickness of 2 to 3 μm is formed on the entire surface by spin coating, as in STEP 17 shown in FIG. 6A. With reference to FIG. 46B (STEP 17), an uneven pattern is formed in at least the pixel region by a conventional photolithographic process and an etching process so that the pixel section has optimized reflective characteristics and viewing-angle characteristics. The uneven pattern is subjected to reflow to form a lower portion of the reflective face of an uneven surface 28A. Contact holes are simultaneously formed in the resin film in the drain sections of TFTs in the display region.

With reference to 46C (STEP 18), a pure aluminum or 1%-silicon-containing aluminum sputtering film having a thickness of 400 to 500 nm is deposited on the entire surface. The sputtering film at the region other than the pixel sections is removed by a general photolithographic process and an etching process to form uneven aluminum reflective sections 29 which are connected to the drain sections 19. The reflective sections 29 are used as pixel electrodes for displaying. Next, these are subjected to sintering at approximately 300° C. for 1 hour in a forming gas to enhance the contact. Pure silver or a silver alloy may be used instead of the pure aluminum or aluminum alloy to increase the reflectance.

As described above, an active-matrix substrate 30 integrating a display section and a peripheral-driving-circuit section is produced by forming a single-crystal silicon layer 7 on the crystalline sapphire film 50 as a seed for low-temperature heteroepitaxy by a catalytic CVD process and by forming CMOS circuits, each including top-gate nMOSLDD-TFTs, and bottom-gate pMOSTFTs and nMOSTFTs, in the display section and the peripheral-driving-circuit section using the single-crystal silicon layer 7.

Figure 47:
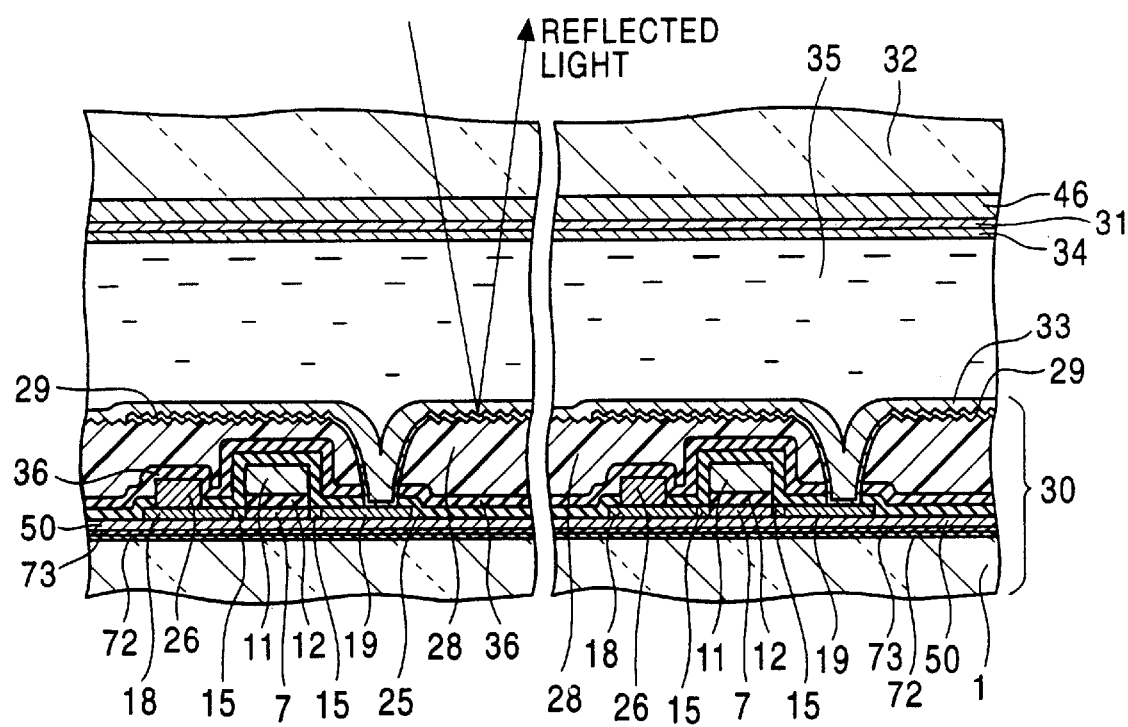
FIG. 47 is a cross-sectional view of a main section of the LCD of the eighth embodiment.

Using the active-matrix substrate (driving substrate) 30, a reflective LCD shown in FIG. 47 is produced, as in FIG. 7.

This embodiment has the same advantages as those in the first embodiment. In addition, the single-crystal silicon layer 7 is deposited by heteroepitaxy on the crystalline sapphire film 50 without forming steps on the substrate 1. Thus, the production steps can be simplified and the deposited single-crystal silicon layer does not have discontinued sections due to the steps.

Ninth Embodiment

A ninth embodiment of the present invention will be described with reference to FIGS. 48A to 50D.

This embodiment relates to a transmissive LCD. The display section includes top-gate MOSTFTs and the peripheral-driving-circuit section include bottom-gate MOSTFTs, as in the eighth embodiment. Subsequent to STEPS 1 (FIG. 41A) to 15 (FIG. 45C), contact holes 19 for the drain sections of the display TFTs are formed in the insulating films 25 and 36, as show in FIG. 48A (STEP 16), and the unnecessary $SiO_2$, PSG and SiN films at the pixel opening section are removed to improve transmittance.

Figure 48A:
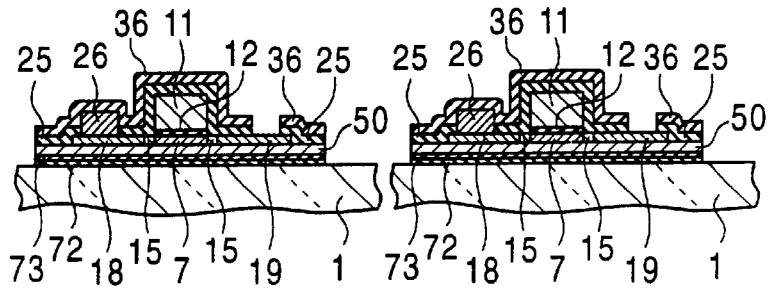
FIGS. 48A to 48C are cross-sectional views showing production steps of a LCD in accordance with a ninth embodiment of the present invention.
Figure 48B:
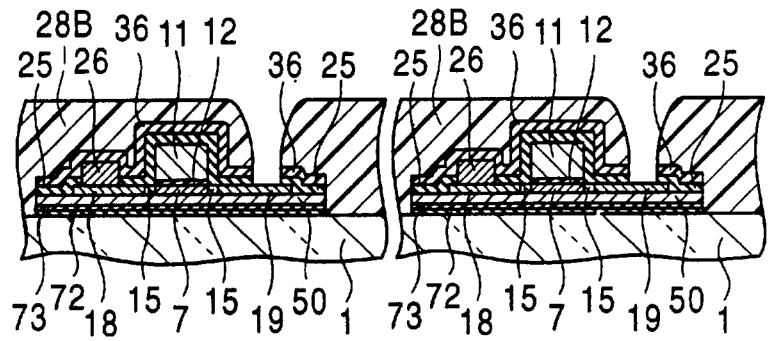

With reference to FIG. 48B (STEP 17), a planarization film 28B, which is composed of an acrylic photosensitive transparent resin and has a thickness of 2 to 3μ, is formed on the entire surface by spin coating etc., and then contact holes for drains of display TFTs are formed in the transparent resin 28B. The transparent resin 28B is cured at a given condition.

Figure 48C:
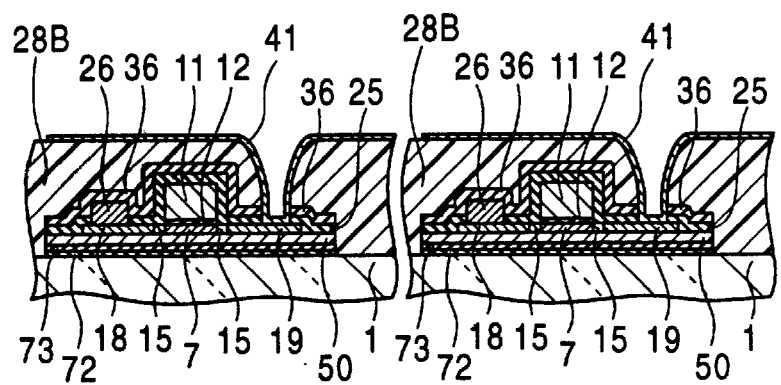

With reference to FIG. 48C (STEP 18), an ITO sputtering film having a thickness of 130 to 150 nm is formed on the entire surface, and then an ITO transparent electrode 41 in contact with the drain section 19 of the display TFT is formed by photolithography and etching. Next, annealing in a forming gas at 200 to 250° C. for 1 hour is performed to reduce the contact resistance between the drain of each TFT in the display section and the ITO and to improve the transparency of the ITO.

Figure 49:
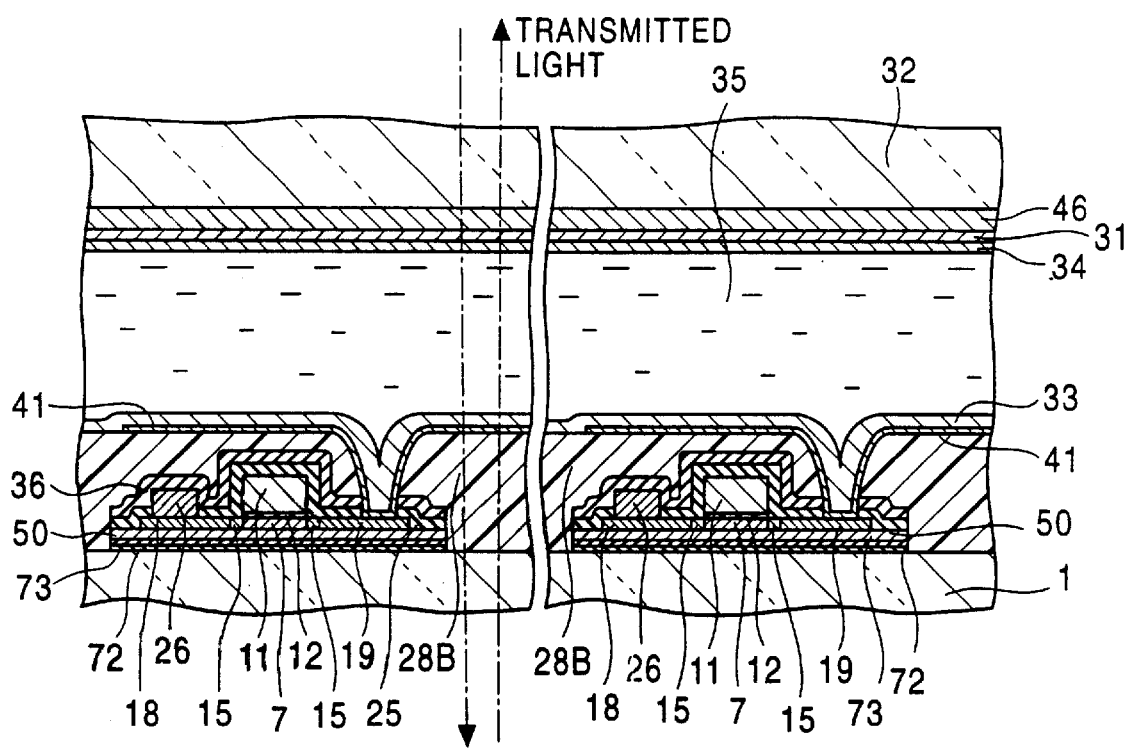
FIG. 49 is a cross-sectional view of a main section of the LCD of the ninth embodiment.

With reference to FIG. 49, a transmissive LCD is assembled using this TFT substrate 1 and a counter substrate 32 as in the eighth embodiment. In this embodiment, a polarizer is also provided on the TFT substrate 1. Although transmission light from the TFT substrate 1 is used in this transmissive LCD as shown by a solid line in the drawing, transmission light from the counter substrate 32 may be used as shown by a dotted line in the drawing.

An on-chip color-filter (OCCF) structure and an on-chip black (OCB) structure may be made from this transmissive LCD, as follows.

Figure 50A:
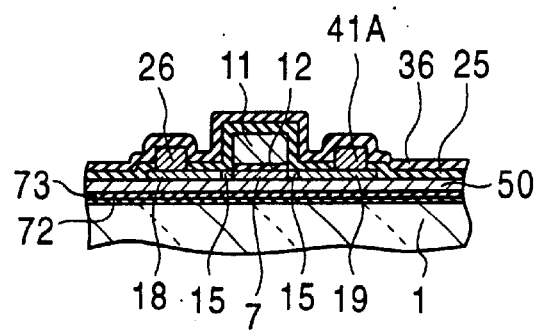
FIGS. 50A to 50D are cross-sectional views showing production steps of a LCD in accordance with a ninth embodiment of the present invention.

After performing STEPS 1 to 14 shown in FIGS. 41A to 45B, contact holes are also formed at the drain sections of the $PSG-SiO_2$ insulating film 25 as shown in FIG. 50A (STEP 15), and an aluminum layer 41A for a drain electrode is formed. Next, a SiN-PSG insulating film 36 is formed.

Figure 50B:
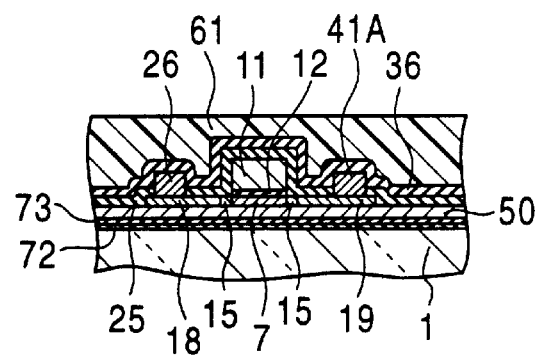
Figure 50C:
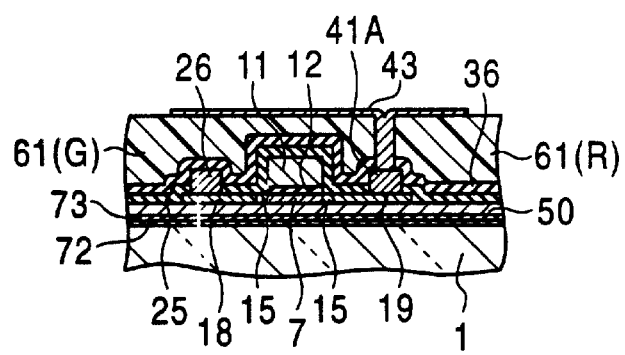

With reference to FIG. 50B (STEP 16), a photoresist 61 containing a red, green or blue pigment having a thickness of 1 to 1.5 μm is formed on the corresponding color segments. With reference to FIG. 50C (STEP 17), color filter layers 61(R), 61(G) and 61(B) are formed by patterning using a general photolithographic process (OCCF structure). Contact holes are also formed at the drain sections. An opaque ceramic substrate cannot be used.

With reference to FIG. 50C (STEP 17), a metal shading layer 43 as a black mask layer is formed over the contact holes connecting to the drains of the display TFTs and over the color filter layer by a patterning process. For example, a molybdenum film having a thickness of 200 to 250 nm is formed by a sputtering process and is then patterned to form a given shape for shading the display TFTs (OCB structure).

Figure 50D:
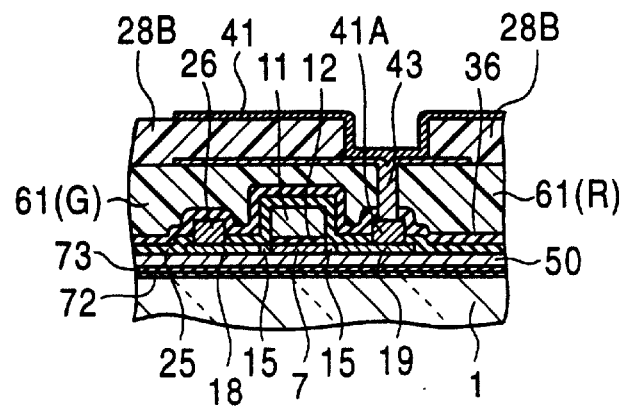

With reference to FIG. 50D (STEP 18), a planarization film 28B composed of a transparent resin is formed, and then an ITO transparent electrode 41 is formed so as to connect to the shading layer 43 through the contact holes provided in the planarization film.

The color filter 61 and the shading layer or black mask 43 formed on the display array section improves the aperture ratio of the liquid crystal display panel and decreases electrical power consumption of the display module including a back light.

Tenth Embodiment

In this embodiment, the peripheral-driving-circuit section includes a CMOS driving circuit including bottom-gate pMOSTFTs and nMOSTFTs, as in the eighth embodiment. The display section is a reflective type and includes various gate-types of TFTs.

Figure 51A:
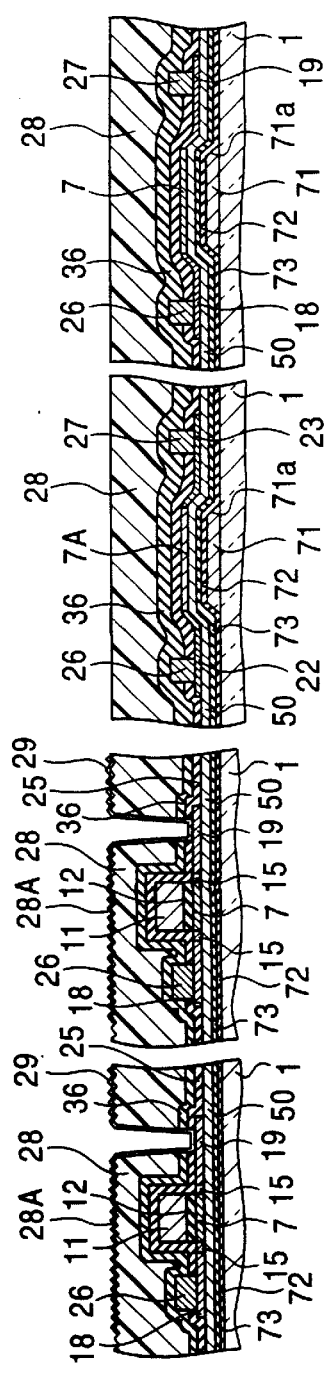
FIGS. 51A to 51C are cross-sectional views showing the subsequent production steps of the LCD in accordance with a tenth embodiment of the present invention.
Figure 51B:
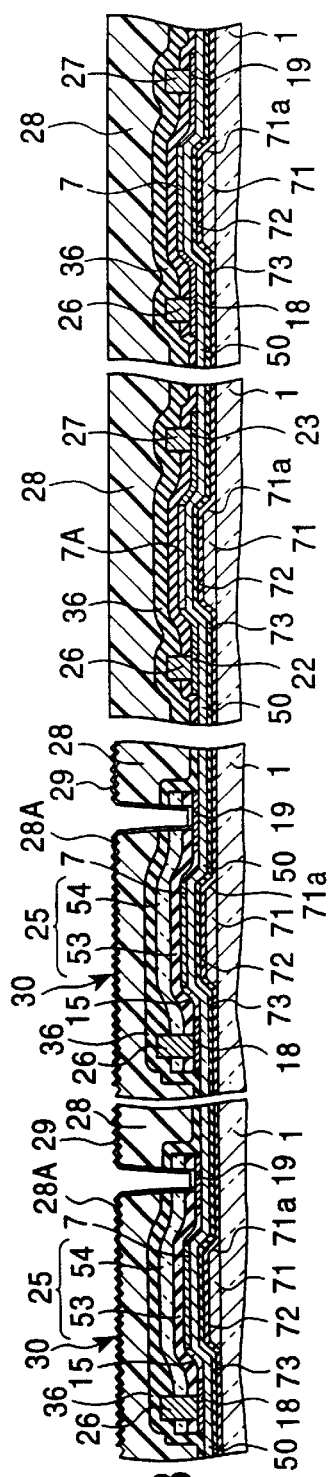
Figure 51C:
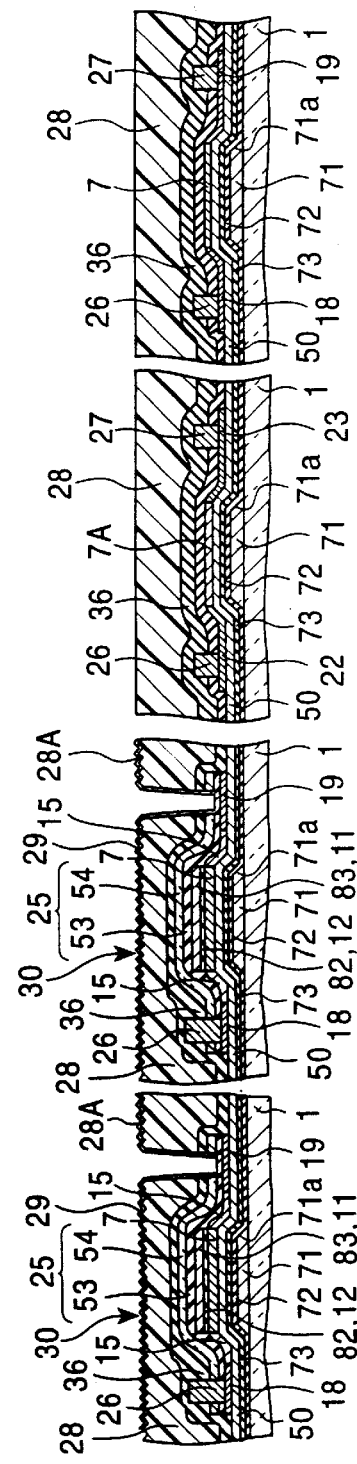

FIG. 51A shows a display section provided with top-gate nMOSLDD-TFTs, which are the same as those in the eighth embodiment. FIG. 51B shows a display section provided with bottom-gate nMOSLDD-TFTs, and FIG. 51C shows a display section provided with dual-gate nMOSLDD-TFTs. These bottom-gate and dual-gate MOSTFTs can be produced by the common steps for the bottom-gate MOSTFTs in the peripheral-driving-circuit section. The dual-gate type having the upper and lower gate sections shows high driving ability, and can be used as a top-gate or bottom-gate type by selectively using either the upper or lower gate section.

The bottom-gate MOSTFT shown in FIG. 51B has a gate electrode 71 of Mo—Ta alloy etc., and a gate-insulating film composed of a SiN film 72 and a SiO$_2$ film 73. A channel region and the like using the single-crystal silicon layer are formed on the gate-insulating film, as in the top-gate MOSTFT. The dual-gate MOSTFT shown in FIG. 51C has a lower gate section which is the same as that of the bottom-gate MOSTFT and an upper gate section including a gate-insulating film 73 composed of a SiO$_2$ film and a SiN film and an upper-gate electrode 74 provided thereon.

A method for making the bottom-gate MOSTFTs will now be described with reference to FIGS. 52A to 56C, and a method for making the dual-gate MOSTFTs will now be described with reference to FIGS. 57A to 59C. The bottom-gate MOSTFTs in the peripheral driving circuit are produced according to the steps shown in FIGS. 41A to 46C.

Figure 52A:
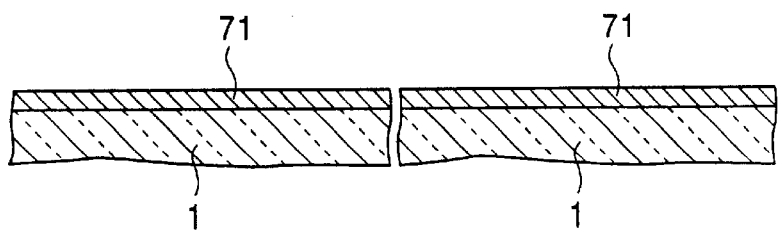
FIGS. 52A to 52C are cross-sectional views showing production steps of the LCD in accordance with the tenth embodiment.

With reference to FIG. 52A (STEP 1), in the production of the bottom-gate MOSTFT in the display section, a molybdenum-tantalum alloy sputtering film 71 having a thickness of 500 to 600 nm is formed on a substrate 1.

Figure 52B:
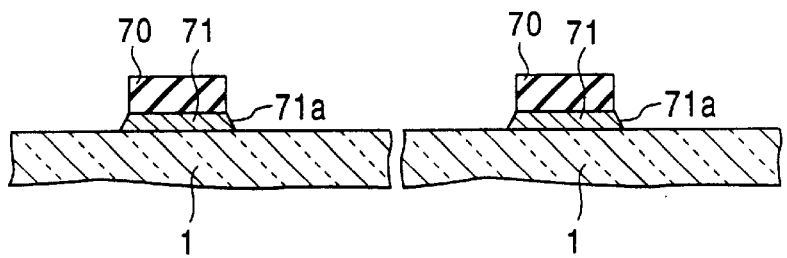

With reference to FIG. 52B (STEP 2), a photoresist 70 having a given pattern is formed and the molybdenum-tantalum alloy film 71 is subjected to taper etching through the photoresist 70 as a mask to form a gate electrode 71 having a trapezoidal side base 71a with a gentle angle of 20 to 45 degree.

Figure 52C:
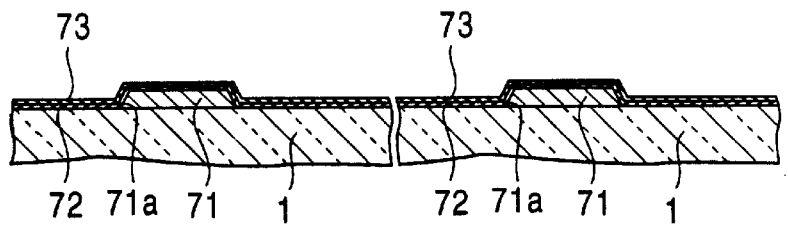

With reference to FIG. 52C (STEP 3), the photoresist 70 is removed, and then a SiN film 72 having a thickness of approximately 100 nm and then a SiO$_2$ film 73 having a thickness of approximately 200 nm are deposited on the substrate 1 including the molybdenum-tantalum alloy film 71 by a plasma-enhanced CVD process to form a gate insulating film.

Figure 53A:
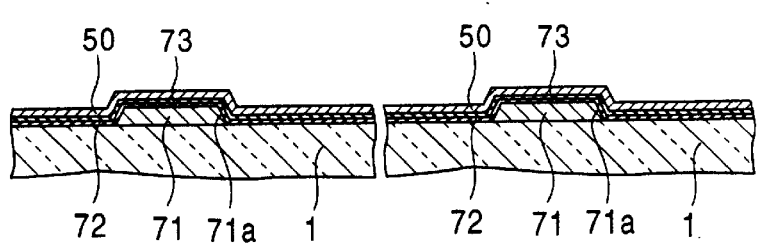
FIGS. 53A to 53C are cross-sectional views showing the subsequent production steps of the LCD in accordance with the tenth embodiment.

With reference to FIG. 53A (STEP 4), a crystalline sapphire film 50 with a thickness of 20 to 200 nm is formed in at least TFT-forming region on the insulating substrate 1, as in STEP 4 shown in FIG. 42A.

Figure 53B:
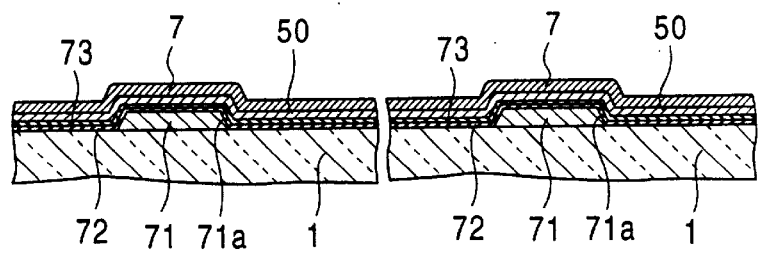

With reference to FIG. 53B (STEP 5), a single-crystal silicon film 7 with a thickness of, for example, 0.1 $\mu$ is heteroepitaxially deposited thereon by a catalytic CVD process, as in STEP 5 shown in FIG. 42B. Since the underlying gate electrode 71 has side faces 71a having a gentle slope, the single-crystal silicon layer 7 can be deposited without discontinuities at the steps 4.

Figure 53C:
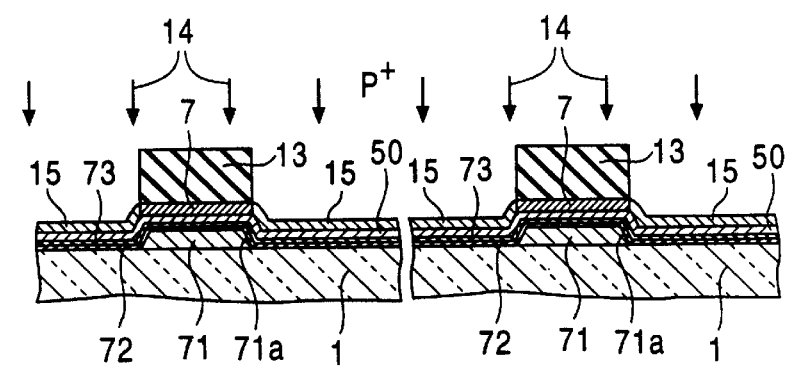

With reference to FIG. 53C (STEP 6), after performing STEPS 6 in FIG. 42C to STEP 8 in FIG. 43B, the gate sections of the nMOSTFTs in the display region are covered with a photoresist 13, and the exposed source and drain regions of the nMOSTFTs are doped with, for example, phosphorus ions 14 by ion implantation at 20 kV and at a dose of 5×10$^{13}$ atoms/cm$^2$ to form LDD sections 15 of an N$^-$-type layer by self-alignment, as in STEP 9 in FIG. 43C. The bottom gate electrode 71 facilitates alignment of the photoresist 13 as a mask and suppresses misalignment.

Figure 54A:
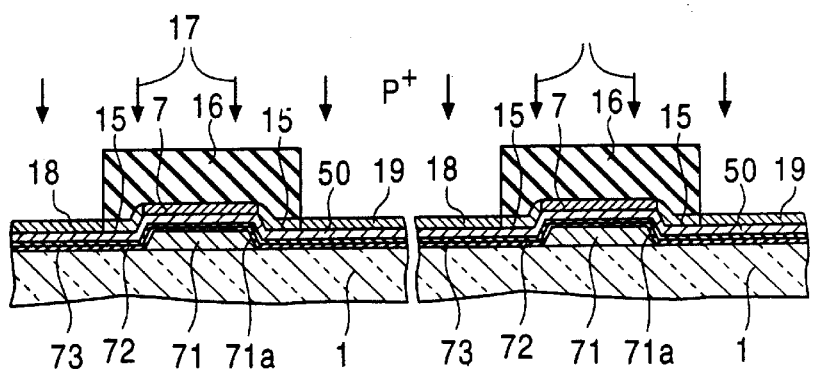
FIGS. 54A to 54D are cross-sectional views showing the subsequent production steps of the LCD in accordance with the tenth embodiment.

With reference to FIG. 54A (STEP 7), the gate sections and the LDD sections of the nMOSTFTs in the display region are covered with a photoresist 16, and the exposed regions are doped with phosphorus or arsenic ions 17 by ion implantation to form source sections 18 and drain sections 19 of an N$^+$-type layer of the nMOSTFTs, as in STEP 10 shown in FIG. 44A.

Figure 54B:
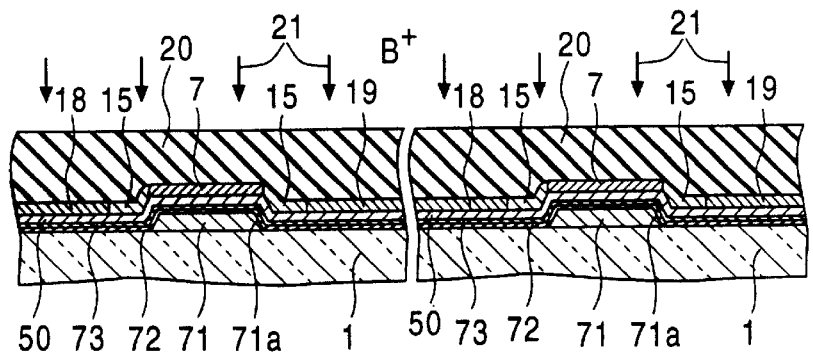

With reference to FIG. 54B (STEP 8), all of the nMOSTFTs are covered with a photoresist 20, and the exposed regions are doped with boron ions 21 by ion implantation to form source sections and drain sections of a P$^+$-type layer of the pMOSTFTs, as in STEP 11 shown in FIG. 44B.

Figure 54C:
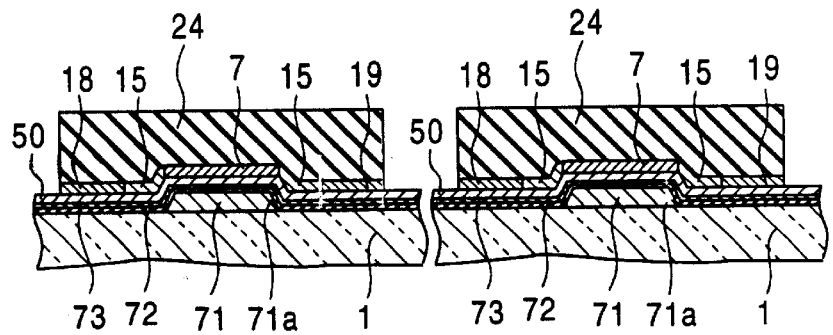
Figure 54D:
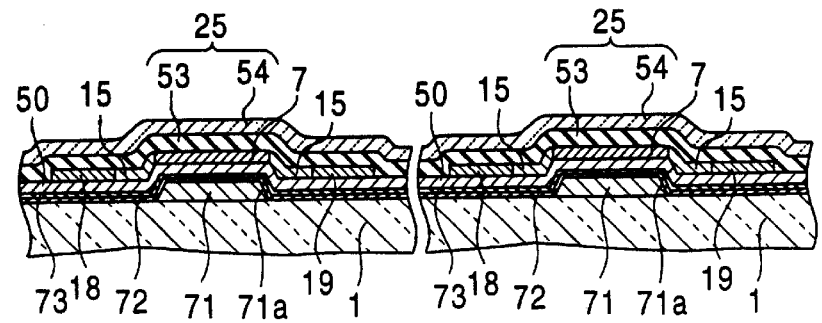

With reference to FIG. 54C (STEP 9), in order to island the active device sections and the passive device sections, photoresist layers 24 are provided to selectively remove the single-crystal silicon layer by a conventional photolithographic process or an etching process, as in STEP 12 shown in FIG. 44C.

With reference to FIG. 54A (STEP 10), a SiO$_2$ film having a thickness of approximately 300 nm and then a phosphosilicate glass (PSG) film having a thickness of approximately 300 nm are continuously deposited on the entire surface by a plasma-enhanced CVD process, a high-density plasma-enhanced CVD process or a catalytic CVD process, as in STEP 13 shown in FIG. 45A. The SiO$_2$ film 53 and the PSG film 54 correspond to the above-described protective film 25. In such a state, the single-crystal silicon layer is activated as described above.

With reference to FIG. 55A (STEP 11), contact holes are formed in the source sections by a conventional photolithographic process and an etching process, as in STEP 14 shown in FIG. 45B. A pure-aluminum or 1%-copper-containing aluminum sputtering film having a thickness of 400 to 500 nm is formed on the entire surface, source electrodes 26 of the TFTs, data lines and gate lines are simultaneously formed by a conventional photolithographic process and an etching process. Next, these are subjected to sintering at approximately 400° C. for 1 hour in a forming gas.

With reference to FIG. 55B (STEP 12), an insulating film 36 composed of a PSG film with a thickness of approximately 300 nm and a SiN film with a thickness of approximately 300 nm is formed on the entire surface by a plasma-enhanced CVD process, a high-density plasma-enhanced CVD process, or a catalytic CVD process, as in STEP 15 shown in FIG. 45C. Next, contact holes are formed in the drain sections of display TFTs.

With reference to FIG. 55C (STEP 13), a photosensitive resin film 28 having a thickness of 2 to 3 $\mu$m is formed on the entire surface by spin coating, as in STEP 16 shown in FIG. 46A. With reference to FIG. 55D (STEP 14), an uneven pattern is formed in at least the pixel region by a conventional photolithographic process and an etching process so that the pixel section has optimized reflective characteristics and viewing-angle characteristics. The uneven pattern is subjected to reflow to form a lower portion of the reflective face of an uneven surface 28A. Contact holes are simultaneously formed in the resin film in the drain sections of TFTs in the display region.

Figure 56A:
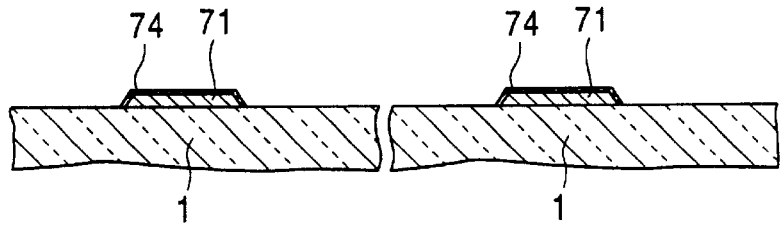
FIGS. 56A to 56C are cross-sectional views showing production steps of a LCD in accordance with the tenth embodiment of the present invention.
Figure 56B:
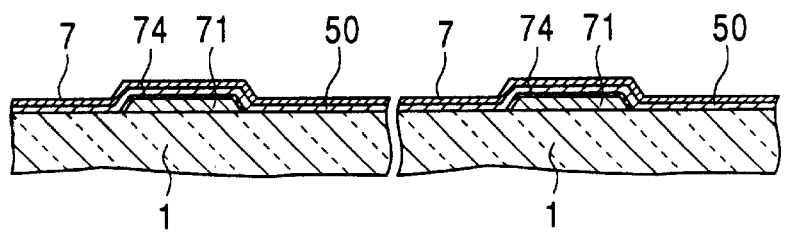
Figure 56C:
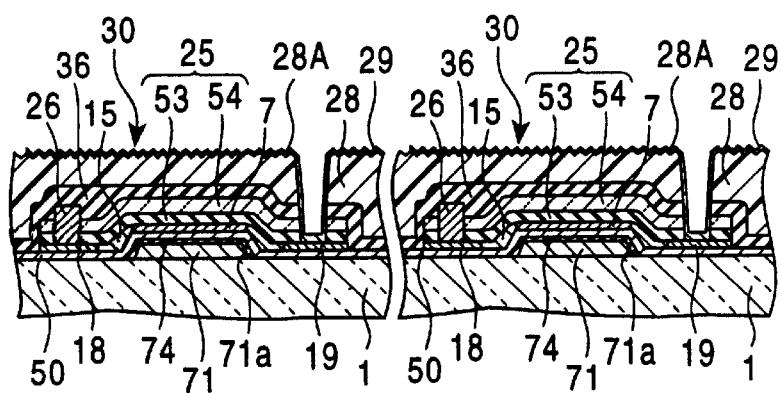

With reference to 55D (STEP 14), a pure aluminum or 1%-silicon-containing aluminum sputtering film having a thickness of 400 to 500 nm is deposited on the entire surface, and uneven aluminum reflective sections 29 which are connected to the drain sections 19 is formed by a general photolithographic process and an etching process, as in STEPS 18 shown in FIG. 56C.

As described above, an active-matrix substrate 30 integrating a display section and a peripheral-driving-circuit section is produced by forming a single-crystal silicon layer 7 on the crystalline sapphire film 50 as a seed for low-temperature heteroepitaxy by a catalytic CVD process and by forming bottom-gate nMOSLDD-TFTs in the display section and a CMOS driving circuit including bottom-gate pMOSTFTs and nMOSTFTs in the peripheral-driving-circuit section using the single-crystal silicon layer 7.

FIGS. 56A to 56C show the formation of a gate-insulating film of the bottom-gate MOSTFT in the display section by anodic oxidation of molybdenum-tantalum.

With reference to FIG. 56A (STEP 3) subsequent to STEP 2 shown in FIG. 52B, the molybdenum-tantalum alloy film 71 is subjected to a conventional anodic oxidation treatment to form a gate-insulating film 7A with a thickness of 100 to 200 nm composed of $Ta_2O_5$ on the surface.

With reference to FIG. 56B (STEP 4), a crystalline sapphire film 50 is formed, as in STEPS 4 and 5 shown in FIGS. 53A and 53B, and a single-crystal silicon layer 7 is heteroepitaxially deposited thereon by a catalytic CVD process. With reference to FIG. 56C (STEP 5), an active matrix substrate 30 is formed, as in STEPS 6 (FIG. 53C) to 14 (FIG. 55D).

When a dual-gate MOSTFTs are formed in the display section, STEPS 1 (FIG. 52A) to 5 (FIG. 53B) are performed, as described above.

Figure 57A:
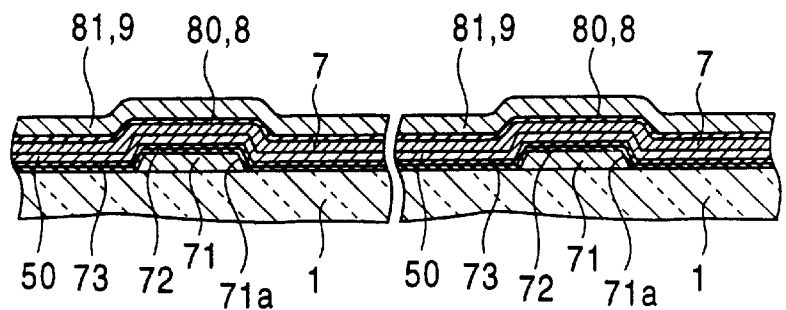
FIGS. 57A to 57D are cross-sectional views showing the subsequent production steps of the LCD in accordance with the tenth embodiment.

With reference to FIG. 57A (STEP 6), a crystalline sapphire film 50 is formed on the insulating films 72 and 73, and then a single-crystal silicon layer 7 is heteroepitaxially deposited on the crystalline sapphire film 50 as a seed. As in STEP 7 shown in FIG. 43A, a $SiO_2$ film with a thickness of approximately 200 nm and then a SiN film with a thickness of approximately 100 nm are formed on the entire single-crystal silicon layer 7 to form an insulating film 80 (corresponding to the above described insulating film 8). Furthermore, a molybdenum-tantalum alloy sputtering film 81 with a thickness of 500 to 600 nm (corresponding to the above described sputtering film 9) is formed thereon.

Figure 57B:
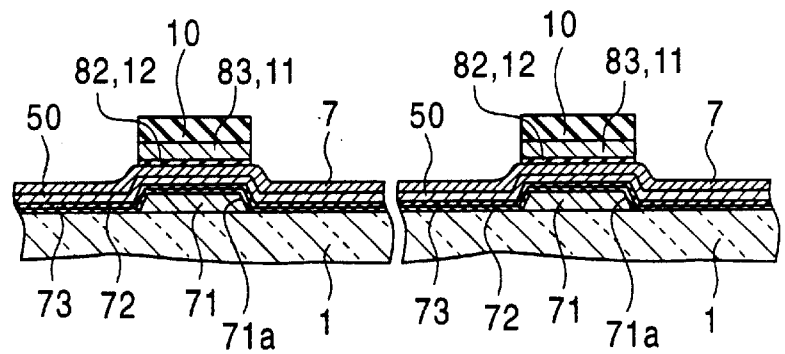

With reference to FIG. 57B (STEP 7), a photoresist pattern 10 is formed, and then top-gate electrodes 82 (corresponding to the above gate electrodes 12) of the Mo—Ta alloy and gate insulating films 83 (corresponding to the above gate insulating film 11) are formed whereas the single-crystal silicon layer 7 is exposed by continuous etching, as in STEP 8 shown in FIG. 43B.

Figure 57C:
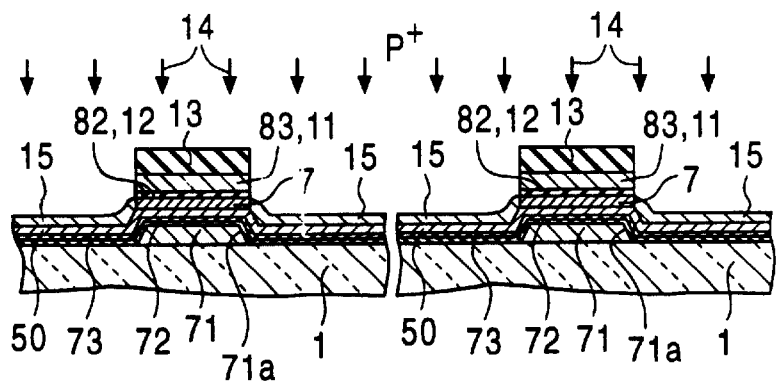

With reference to FIG. 57C (STEP 8), the top-gate sections of the nMOSTFTs are covered with a photoresist 13, and the exposed source and drain regions of the display nMOSTFTs are doped with phosphorus ions 14 to form LDD sections 15 of $N^-$-type layers, as in STEP 9 shown in FIG. 43C.

Figure 57D:
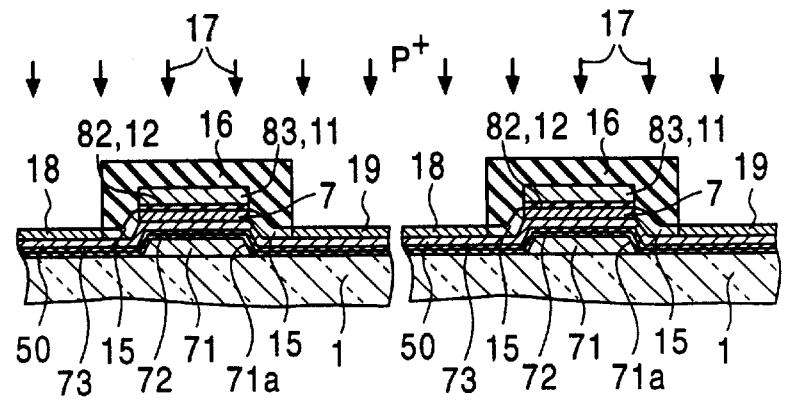

With reference to FIG. 57D (STEP 9), the gate sections and LDD sections of the nMOSTFTs are covered with a photoresist 16, and the exposed regions are doped with phosphorus or arsenic ions 17 to form source sections 18 and drain sections 19 of $N^+$-type layers of the nMOSTFTs, as in STEP 10 shown in FIG. 44A.

Figure 58A:
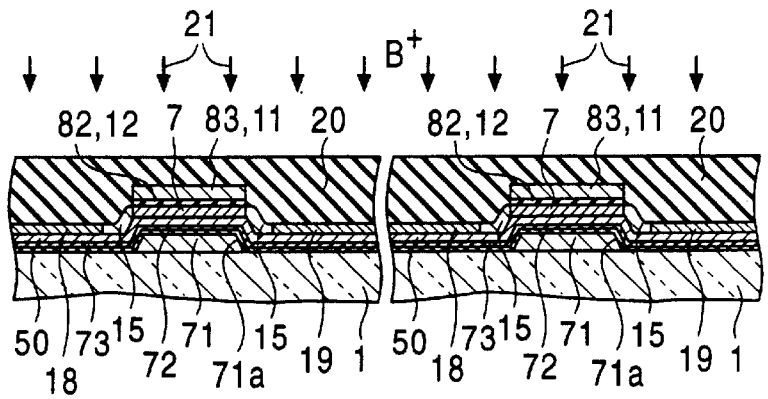
FIGS. 58A to 58D are cross-sectional views showing the subsequent production steps of the LCD in accordance with the tenth embodiment.

With reference to FIG. 58A (STEP 10), the gate sections of the pMOSTFTs are covered with a photoresist 20, and the exposed regions are doped with boron ions 21 to form source sections and drain sections of $P^+$-type layers of the pMOSTFTs in the peripheral-driving-circuit section, as in STEP 11 shown in FIG. 44B.

Figure 58B:
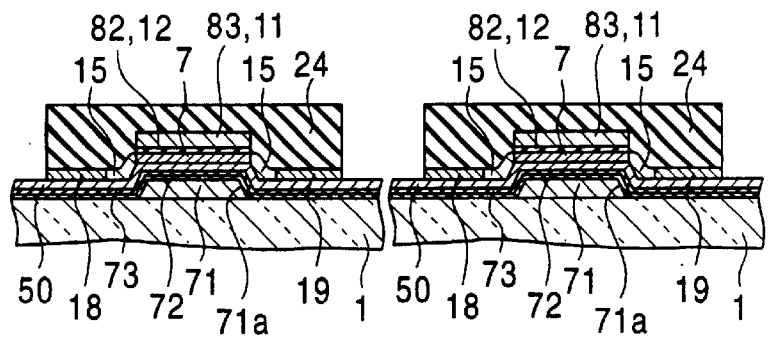

With reference to FIG. 58B (STEP 11), in order to island the active device sections and the passive device sections, photoresist layers 24 are provided on all of the active device sections and the passive device sections, and the single-crystal silicon layer 7 in other sections is selectively removed by a conventional photolithographic process or an etching process, as in STEP 12 shown in FIG. 44C.

Figure 58C:
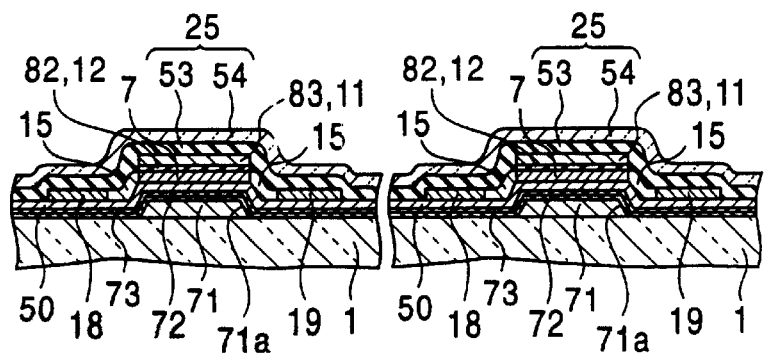

With reference to FIG. 58C (STEP 12), a $SiO_2$ film having a thickness of approximately 200 nm and then a phosphosilicate glass (PSG) film having a thickness of approximately 300 nm are deposited on the entire surface by a plasma-enhanced CVD process, a high-density plasma-enhanced CVD process or a catalytic CVD process, as in STEP 13 shown in FIG. 45A. These films 53 and 54 correspond to the above protective film 25. Next, the single-crystal silicon layer 7 is activated.

Figure 58D:
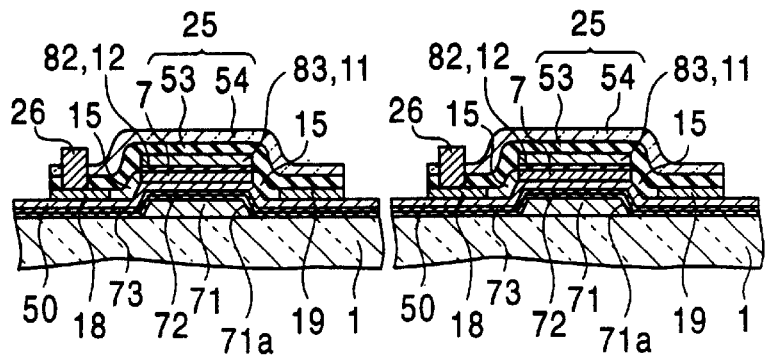

With reference to FIG. 58D (STEP 13), contact holes are formed in the source sections of the TFTs, as in STEP 14 shown in FIG. 45B. A sputtering film having a thickness of 500 to 600 nm composed of pure aluminum or 1%-silicon-containing aluminum is formed on the entire surface. By a conventional photolithographic process and an etching process, source electrodes 26, data lines and gate lines are simultaneously formed.

Figure 59A:
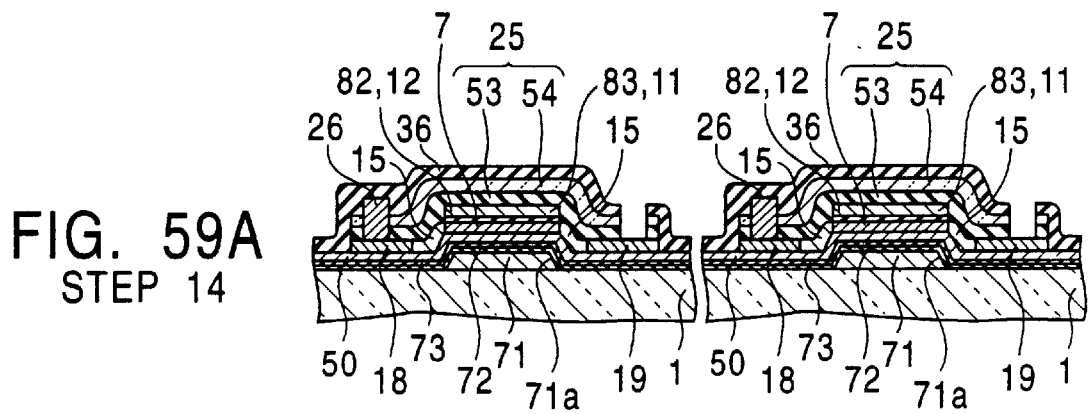
FIGS. 59A to 59C are cross-sectional views showing the subsequent production steps of the LCD in accordance with the tenth embodiment.

With reference to FIG. 59A (STEP 14), an insulating film 36 composed of a PSG film with a thickness of approximately 300 nm and a SiN film with a thickness of approximately 300 nm is formed on the entire surface, and then contact holes are formed in the drain sections of display TFTs, as in STEP 15 shown in FIG. 45C.

Figure 59B:
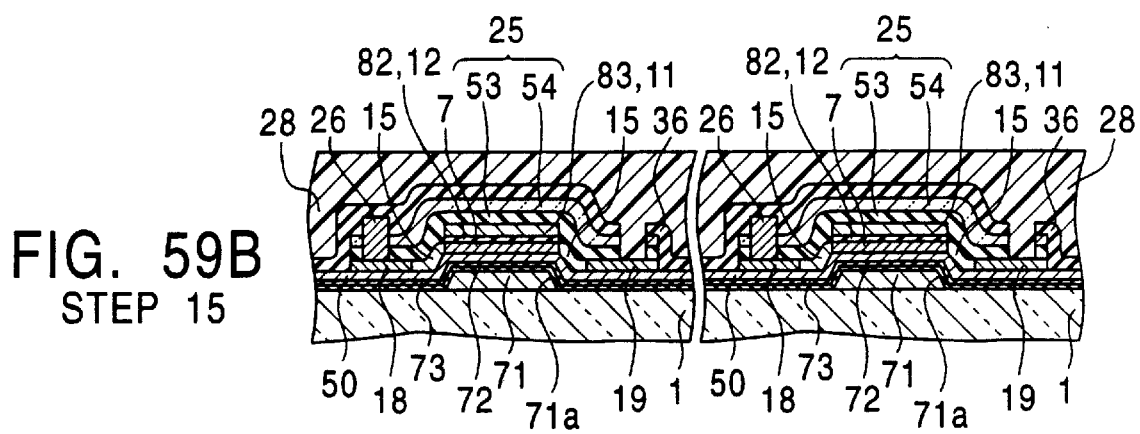
Figure 59C:
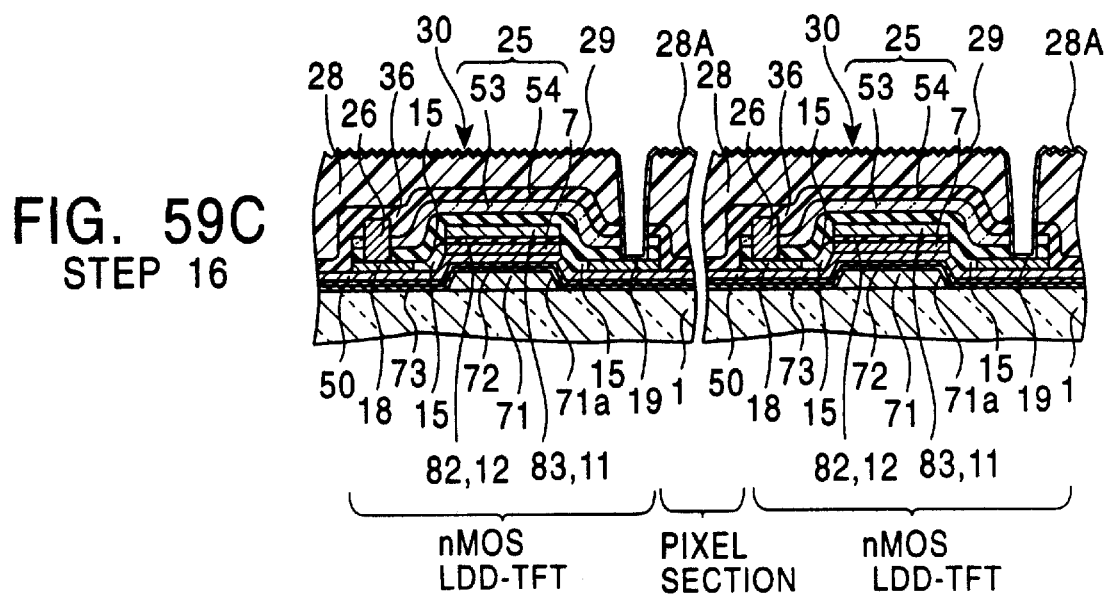

With reference to FIG. 59B (STEP 15), a photosensitive resin film 28 having a thickness of 2 to 3 $\mu$m is formed on the entire surface by spin coating. With reference to FIG. 59C (STEP 16), a lower portion of the reflective face of an uneven surface 28A is formed in at least the pixel region, contact holes are simultaneously formed in the resin film in the drain sections 19 of display TFTs, and an uneven reflection section 29 of aluminum or the like is formed so that the pixel section has optimized reflective characteristics and viewing-angle characteristics, as in STEPS 17 and 18 shown in FIGS. 46B and 46C.

The above process can produce an active matrix substrate 30 integrating a display section and a peripheral-driving-circuit section in which the display section includes dual-gate nMOSLDD-TFTs using the single-crystal silicon layer 7 formed on the crystalline sapphire film 50 as a seed by a heteroepitaxial catalytic CVD process and the steps 4 and the peripheral-driving-circuit section includes a CMOS driving circuit of bottom-gate pMOSTFTs and nMOSTFTs.

Eleventh Embodiment

FIGS. 60A to 62B show an eleventh embodiment of the present invention.

The gate electrode of the top-gate section is formed of a material having relatively low heat resistance, such as aluminum, in this embodiment.

When top-gate MOSTFTs are provided In both the display section and the peripheral-driving-circuit section, STEPS 1 to 6 shown in FIGS. 41A to 42C., respectively, are performed to form an N-type well 7A at the pMOSTFT section in the peripheral-driving-circuit section, as shown in FIG. 60A (STEP 6).

With reference to FIG. 60B (STEP 7), all of the nMOSTFTs and pMOSTFTs in the peripheral-driving-circuit section and the gate section of the nMOSTFTs in the display section are covered with a photoresist 13, and the exposed source and drain regions of the nMOSTFTs are doped with phosphorus ions 14 by ion implantation, for example, at 20 kV and at a dose of $5 \times 10^{13}$ atoms/cm$^2$ to form a LDD section 15 composed of an $N^-$-type layer by self-alignment.

With reference to FIG. 61A (STEP 8), all of the pMOSTFTs in the peripheral-driving-circuit section, the gate sections of the nMOSTFTs in the peripheral-driving-circuit section, and the gate section and the LDD section of the nMOSTFTs in the display section are covered with a photoresist 16. The exposed region is doped with phosphorus or arsenic ions 17, for example, at 20 kV and at a dose of $5 \times 10^{15}$ atoms/cm$^2$ by ion implantation to form a source section 18, a drain section 19 and a LDD section 15 of nMOSTFT composed of an N⁺-type layer. Preferably, the resist 13 is retained, as shown by the dotted line in the drawing, and the resist 16 is provided so as to cover the resist 13. In the formation process of the resist 16, a mask is readily aligned with high accuracy with reference to the resist 13.

With reference to FIG. 61B (STEP 9), all of the nMOSTFTs in the peripheral-driving-circuit section and the display section and the gate sections of the pMOSTFTs are covered with a photoresist 20. The exposed regions are doped with boron ions 21 by ion implantation at 10 kV and at a dose of $5 \times 10^{15}$ atoms/cm² to form source sections 22 and drain sections 23 of the pMOSTFTs composed of a P⁺-type layer.

With reference to FIG. 61C (STEP 10), the resist 20 is removed, and then the single-crystal silicon layers 7 and 7A are activated as described above. Furthermore, a gate insulating film 12, and a gate electrode layer 11 (composed of pure aluminum or 1%-silicon containing aluminum) are formed. The gate electrode layer 11 may be formed by a vacuum evaporation process or a sputtering process.

Figure 62A:
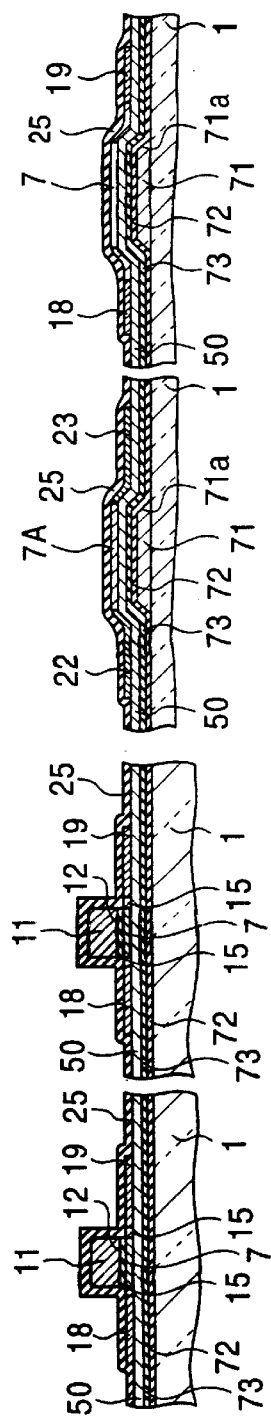
FIGS. 62A and 62B are cross-sectional views showing the subsequent production steps of the LCD in accordance with the tenth embodiment.

The gate section is patterned, and the active device section and the passive device section are isolated. With reference to FIG. 62A (STEP 11), a SiO₂ film having a thickness of approximately 200 nm and then a phosphosilicate glass (PSG) film having a thickness of approximately 300 nm are deposited on the entire surface to form a protective film 25.

Figure 62B:
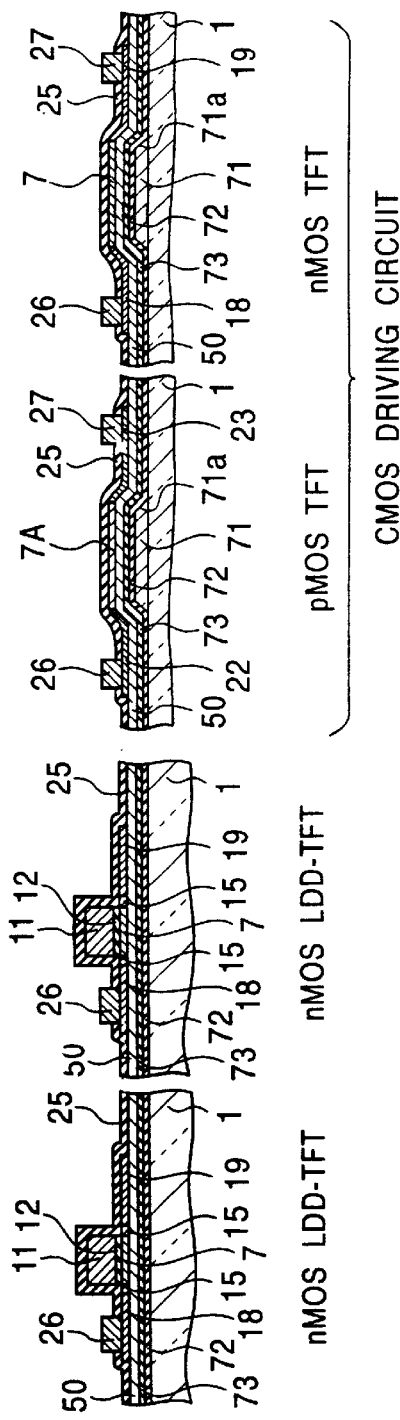

With reference to FIG. 62B (STEP 12), contact holes are formed at the source and drain sections of all TFTs in the peripheral-driving-circuit section and the source sections of the display TFTs by conventional photolithography and etching.

An aluminum sputtering film having a thickness of 500 to 600 nm is formed on the entire surface. Source electrodes 26 of all TFTs in the peripheral-driving-circuit section and the display section, drain electrodes 27 in the peripheral-driving-circuit section, data lines and gate lines are simultaneously formed by conventional photolithography and etching. The substrate is subjected to sintering treatment in a forming gas (nitrogen and hydrogen) at approximately 400° C. for 1 hour.

As in STEPS 15 to 18 shown in FIG. 45C to FIG. 46C, an active-matrix substrate 30 integrating a display section and a peripheral-driving-circuit section is produced, in which the display section and the peripheral-driving-circuit section include top-gate nMOSLDD-TFTs having pure-aluminum or 1%-silicon-containing-aluminum gate electrodes, and a CMOS driving circuit having bottom-gate pMOSTFTs and nMOSTFTs using the single-crystal silicon layer 7.

Since the pure-aluminum or 1%-silicon-containing-aluminum gate electrodes 11 are formed after the activation treatment of the single-crystal silicon layer 7, the gate electrode material is not subject to the activation treatment. Any inexpensive material having relatively low heat resistance, such as pure aluminum or 1%-silicon-containing aluminum, may be used for the gate electrode.

This process can also be applied when the display section includes bottom-gate MOSTFTs.

When dual-gate MOSTFTs and bottom-gate MOSTFTs are formed in the display section and the peripheral-driving-circuit section, respectively, the processes shown in FIG. 29A (STEP 6) to 31C (STEP 13) in the third embodiment are performed to form an active-matrix substrate 30 integrating a display section and a peripheral-driving-circuit section having CMOS driving circuits including dual-gate nMOSLDD-TFTs, pMOSTFTs and nMOSTFTs using aluminum etc., as a gate electrode.

Twelfth Embodiment

FIGS. 63A to 64B show a twelfth embodiment of the present invention.

FIGS. 63A and 63B show a self-alignment type LDD-TFT, for example, a double-gate MOSTFT including a plurality of top-gate LDD-TFTs.

Figure 64A:
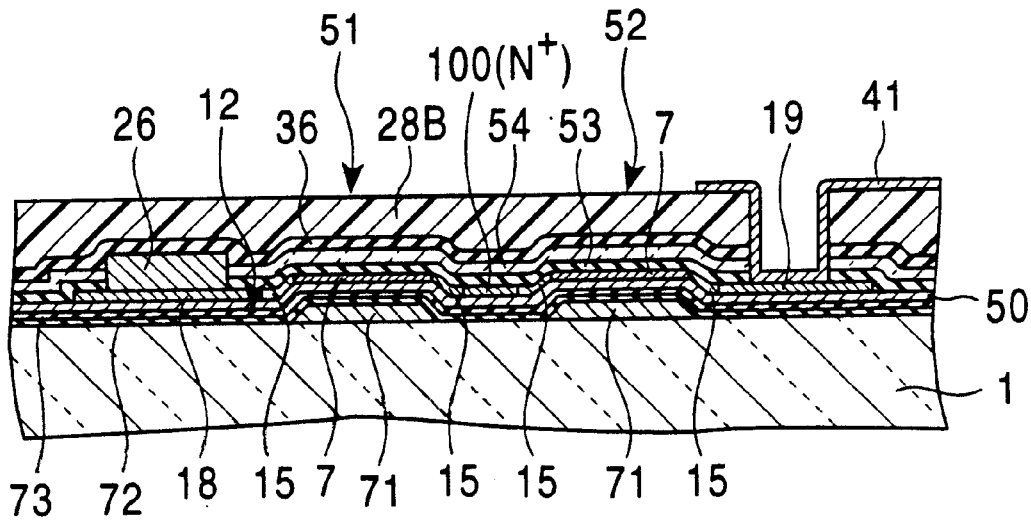
FIGS. 64A and 64B are cross-sectional views of TFTs in the LCD in accordance with the twelfth embodiment of the present invention.
Figure 64B:
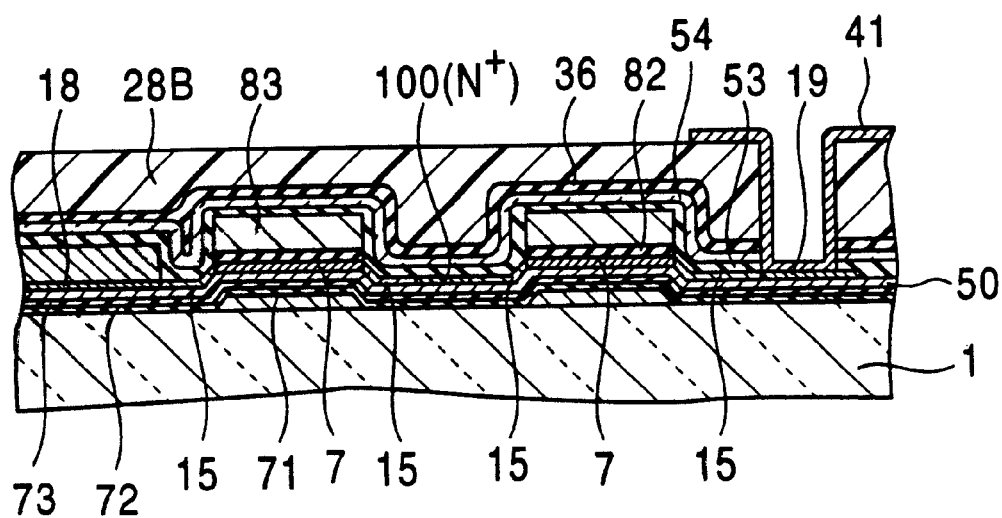

FIG. 64A shows a double-gate configuration of bottom-gate MOSTFTs, and FIG. 64B shows a double-gate configuration of dual-gate MOSTFTs.

These double-gate MOSTFTs have the same advantages as those of the sixth embodiment.

Thirteenth Embodiment FIGS. 65 to 73 show a thirteenth embodiment of the present embodiment.

As described above, the top-gate, bottom-gate and dual-gate TFTs have different structures, functions and characteristics. A variety of combinations of these TFTs may be employed in the display section and the peripheral-driving-circuit section.

For example, as shown in FIG. 65, when any one of the top-gate MOSTFT, the bottom-gate MOSTFT and the dual-gate MOSTFT is used in the display section, the bottom-gate type is used alone or in a combination with at least one of the other types in the peripheral-driving-circuit section. In this case, there are 12 types of combination. When a dual-gate structure is employed in the MOSTFT in the peripheral-driving-circuit section, this dual-gate structure functions as a top-gate type or a bottom-gate type by selecting the upper or lower gate. If the peripheral driving circuit requires TFTs having large driving power, the dual-gate type is preferable. For example, electrooptical devices using organic EL or FED will require the dual-gate type.

FIGS. 66 and 67 show possible combinations when the MOSTFTs in the display section do not have a LDD structure. FIGS. 68 and 69 show possible combinations when the MOSTFTs in the display section have a LDD structure. FIGS. 70 and 71 show possible combinations when the peripheral-driving-circuit section includes TFTs having a LDD structure. FIGS. 72 and 73 show possible combinations when the peripheral-driving-circuit section and the display section include TFTs having a LDD structure.

The details of the combinations shown in FIG. 65 are shown in FIGS. 66 to 73. These combinations are also available when the peripheral-driving-circuit section includes the top-gate MOSTFT and the other-type MOSTFT(s). These combinations are also applicable when the channel region of the TFT is formed of polycrystalline silicon or amorphous silicon (only in the display section).

Fourteenth Embodiment

Figure 74A:
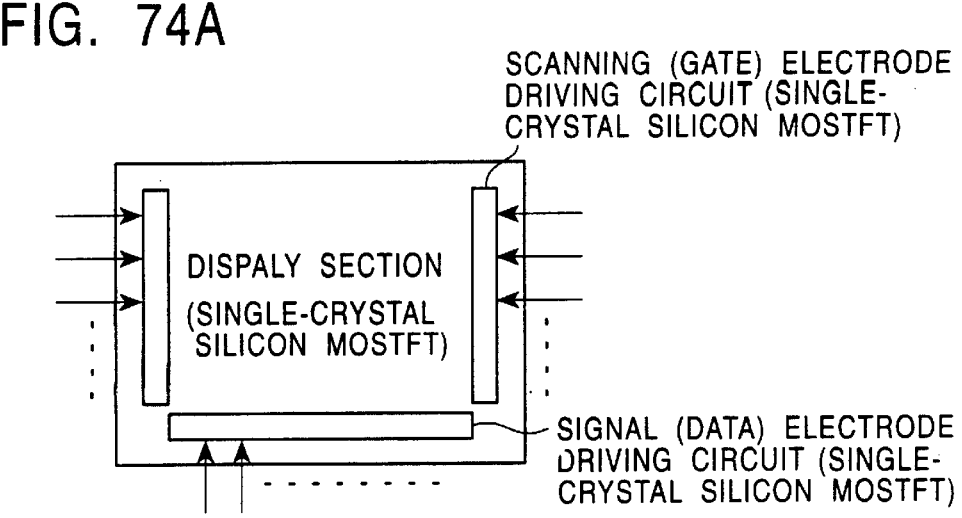
FIGS. 74A to 74C are outline schematic views of LCDs in accordance with a fourteenth embodiment of the present invention.

FIG. 74A to FIG. 75 show a fourteenth embodiment of the present invention.

This embodiment relates to an active-matrix LCD which includes TFTs having high driving power and using the above-mentioned single-crystal silicon layer in the peripheral-driving-circuit section. Other gate types may be included, in addition to the bottom-gate type. Any channel conductive type may be employed. Furthermore, MOSTFTs using a polycrystalline silicon layer may be included. In contrast, a single-crystal silicon layer is preferably used for MOSTFTs in the display section; however, a polycrystalline or amorphous silicon layer may be usable. Alternatively, two or three types of silicon layers may be present. When the display section is formed of nMOSTFTs, a single-crystal or polycrystalline silicon layer is preferable due to a smaller TFT area and reduced pixel defects compared with an amorphous silicon layer. Polysilicon, in addition to single-crystal silicon, may be formed during heteroepitaxy to form a continuous grain silicon (CGS) structure which can be advantageously used for the formation of the active device and the passive device in some cases.

Figure 74B:
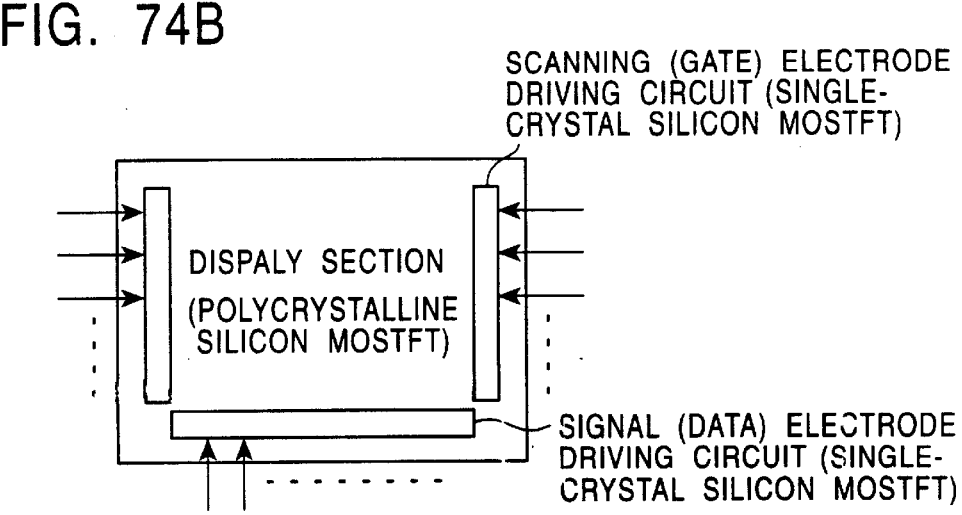
Figure 74C:
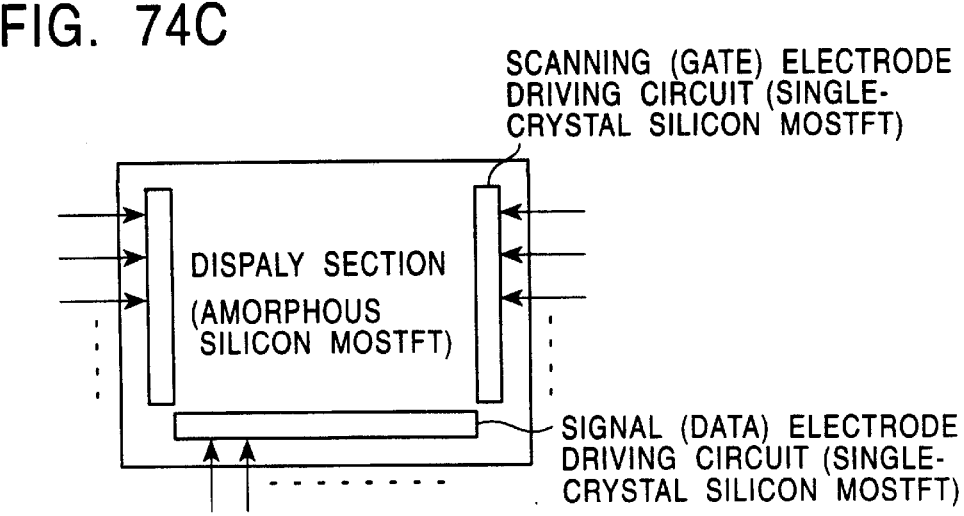

FIGS. 74A to 74C show possible combinations of various MOSTFTs in the display section and the peripheral-driving-circuit section. FIG. 75 shows the details of these combinations. The use of single-crystal silicon causes improved current driving ability. Thus, the size of the device can be decreased, the size of the screen can be increased, and the aperture ratio in the display section can be improved.

In the peripheral-driving-circuit section, an electric circuit integrating diodes, capacitors, resistors, and inductors, in addition to the MOSTFTs can be formed on the insulating substrate such as a glass substrate.

Fifteenth Embodiment

Figure 76:
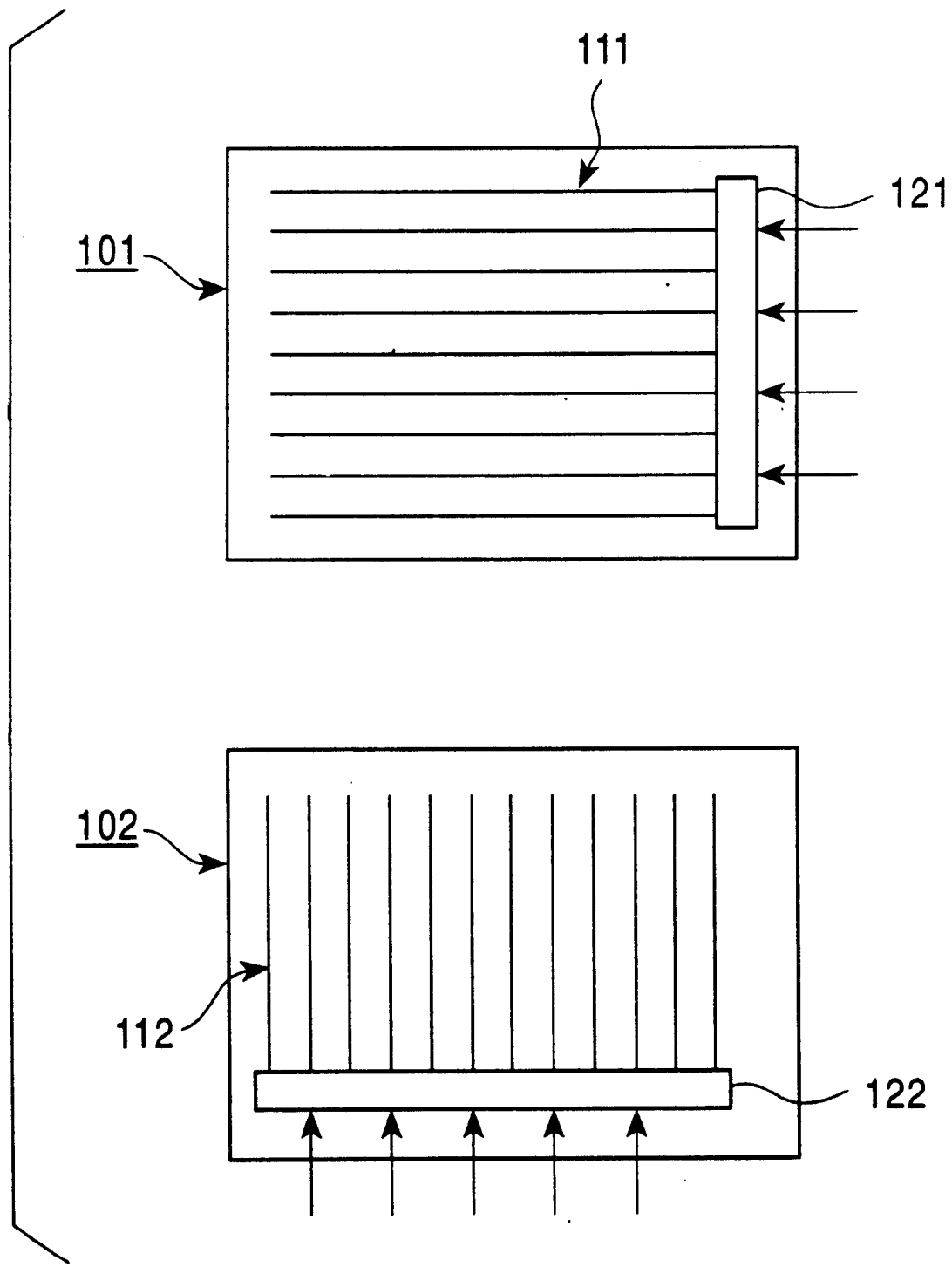
FIG. 76 is an outline schematic view of a device in accordance with a fifteenth embodiment of the present invention.

FIG. 76 shows a fifteenth embodiment of the present invention. This embodiment relates to a passive-matrix drive. The display section does not have switching devices such as MOSTFTs, and modulation of the incident or reflected light in the display section is performed by only the difference in voltage applied to a pair of electrodes formed on two opposing substrates. That is, an upper glass substrate 101 has signal or data electrodes 111 connected to a signal-electrode driving circuit 121 including, for example, single-crystal silicon MOSTFTS, and a lower glass substrate 102 has scanning or gate electrodes 112 connected to a scanning-electrode driving circuit 122 including, for example, single-crystal silicon MOSTFTS. Examples of such modulation devices include reflective or transmissive LCDS, organic EL devices, FEDs, LEPDS, and LEDs.

Sixteenth Embodiment

Figure 77A:
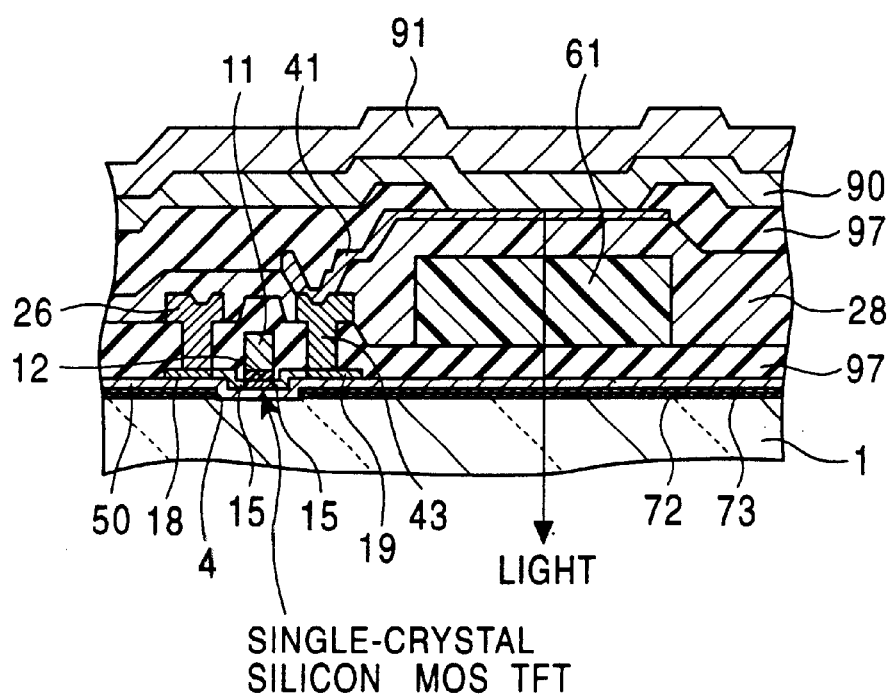
FIGS. 77A and 77B are cross-sectional views of an EL device and a FED, respectively, in accordance with a sixteenth embodiment of the present invention.
Figure 77B:
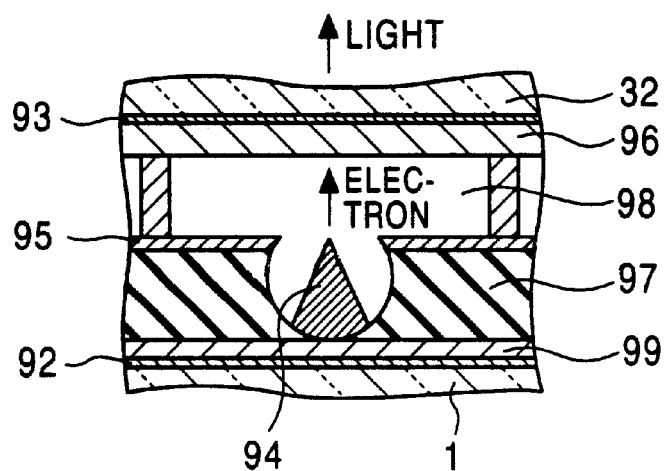

FIGS. 77A and 77B show a sixteenth embodiment of the present invention.

FIG. 77A shows one pixel portion of an active-matrix EL device. An EL layer 90 composed of an amorphous organic compound or an inorganic compound, such as ZnS:Mn, is formed on a substrate 1. A transparent ITO electrode 41 is provided below the EL layer 90, and a cathode 91 is formed on the EL layer 90. When a voltage is applied to these electrodes 41 and 91, colored light is emitted through a color filter 61.

In order to apply a data voltage to the transparent electrode 41 by active-matrix drive, a substrate 1 is provided with a single-crystal silicon MOSTFT, that is, nMOSLDD-TFT, using a single-crystal silicon layer deposited by heteroepitaxy on a sapphire film 50 and a step 4 as seeds on the substrate 1. Similar TFTs are also formed in a peripheral driving circuit. In FIG. 55A, numeral 28 represents a transparent planarization layer, and numeral 97 represents an insulating film. Other numerals assigned for the single-crystal silicon MOSTFT are the same as in the above embodiments. Since this EL device is driven by MOSLDD-TFTs using the single-crystal silicon layer, the EL device has a high switching rate and a reduced leakage current. The color filter 61 may be omitted if the EL layer 90 emits a specified color.

Since the EL device requires a high driving voltage, the peripheral driving circuit preferably has driver devices having high voltage resistance, such as cMOSTFTs and bipolar devices, in addition to the MOSTFTs.

FIG. 77B shows one pixel portion of a passive-matrix FED. When a voltage is applied between an emitter line 92 and an anode 93, electrons are emitted from a cold cathode 94 in a vacuum section 98 between two opposing glass substrates 1 and 32, and are incident on a fluorescent layer 96 via selection by a gate line 95 to emit light having a predetermined color. The emitter line 92 is connected to a peripheral driving circuit and is driven by a data voltage. The peripheral driving circuit includes MOSTFTs using a single-crystal silicon layer based on the present invention and contributes to high-speed driving of the emitter line 92. In FIG. 77B, numeral 99 represents a resistance film. In this FED, the above-mentioned MOSTFT may be connected to each pixel electrode so that the FED is driven by an active-matrix system.

When a conventional light-emitting polymer is used instead of the EL layer 90 in the EL device shown in FIG. 77A, this device becomes a passive-matrix or active-matrix light-emitting polymer device (LEPD). In the FED shown in FIG. 77B, a diamond thin-film may be used as the cathode. In a light emitting diode, a light emitting section composed of a gallium-based film, such as gallium-aluminum-arsenic, may be driven by MOSTFTs of epitaxial single-crystal silicon. The light-emitting film may be formed by epitaxy in accordance with the present invention.

The above-described embodiments of the present invention may have the following modifications.

When the polycrystalline silicon film 7 is deposited by a catalytic CVD process, a gas, such as diborane ($B_2H_6$). phosphine ($PH_3$), arsine ($AsH_3$) or stibine ($SbH_3$) may be supplied so that the film 7 is doped with an adequate amount of boron, phosphorus, antimony or arsenic to control the channel conductive type (P or N) of and the carrier content in the epitaxial silicon layer 7. The single-crystal silicon layer 7 may be formed by any high-density plasma-enhanced CVD process, for example, electron cyclotron resonance (ECR) plasma-enhanced CVD process. n order to avoid diffusion of ions from the glass substrate, a SiN film having a thickness of, for example, 50 to 200 nm and an optional $SiO_2$ film having a thickness of, for example, 100 nm may be formed on the substrate surface. The above-described steps 4 may be formed on these films. The steps may be formed by ion milling instead of the above-mentioned RIE process. The steps may be formed on the crystalline sapphire film or on a sapphire substrate.

The sapphire ($Al_2O_3$) may be replaced with any spinel substance having excellent lattice matching to the single crystal silicon, e.g., magnesia spinel ($MgO \cdot Al_2O_3$), calcium fluoride ($CaF_2$), strontium fluoride ($SrF_2$), barium fluoride ($BaF_2$), boron phosphide (BP), and yttrium oxide (($Y_2O_3$) mn)-zirconium oxide (($ZrO_2)_{1-}m$). The single-crystal silicon layer 7 in accordance with the present invention can also be used in an active device region including diodes etc., and a passive device region including resistors, capacitors and inductors.

What is claimed is:

1. An electrooptical device comprising:
    a first substrate comprising a display section provided with pixel electrodes and a peripheral-driving-circuit section provided on the periphery of the display section, a second substrate, and an optical material disposed between the first substrate and the second substrate;
    wherein a gate section comprising a gate electrode and a gate-insulating film is formed on one surface of the first substrate and a step is formed on said one surface of the first substrate;

a single-crystal silicon layer is formed on the first substrate including the step and the gate section, the single-crystal silicon layer constituting a channel region, a source region, and a drain region; and a first bottom-gate thin-film transistor having the gate section is formed below the channel region, the first bottom-gate thin-film transistor constituting at least a part of the peripheral-driving-circuit section.

2. An electrooptical device according to claim 1, wherein the step forms an indented section having a cross-section in which a side face is perpendicular to or slanted to the bottom face, and the step functions as a seed for graphoepitaxy of the single-crystal silicon layer.

3. An electrooptical device according to claim 1, wherein the step is formed on at least one of the first substrate and the film formed on the first substrate, and the first thin-film transistor is formed on at least one of the interior and the exterior of the indented section formed by the step.

4. An electrooptical device according to claim 1, wherein at least one of the type and the concentration of a Group III or V impurity in the single-crystal silicon layer is controlled.

5. An electrooptical device according to claim 1, wherein the step is formed along at least one side of a device region including the channel region, the source region and the drain region of the first thin-film transistor.

6. An electrooptical device according to claim 1, wherein the gate electrode below the single-crystal silicon layer is trapezoidal at the side end section.

7. An electrooptical device according to claim 1, wherein a diffusion-barrier layer is provided between the first substrate and the single-crystal silicon layer.

8. An electrooptical device according to claim 1, wherein the peripheral-driving-circuit section further comprises at least one of a top-gate thin-film transistor, a bottom-gate thin-film transistor and a dual-gate thin-film transistor, each having a channel region of a polycrystalline or amorphous silicon layer and a gate section formed above or below the channel region, and which comprises at least one of a diode, a resistor, a capacitor and an inductor, each comprising a single-crystal, polycrystalline or amorphous silicon layer.

9. An electrooptical device according to claim 1, wherein the display section comprises a switching device provided on the first substrate for switching the pixel electrodes.

10. An electrooptical device according to claim 9, wherein the first thin-film transistor comprises at least the bottom-gate type among a bottom-gate type having a gate section above the channel region, a bottom-gate type having a gate section below the channel region, and a dual-gate type having one gate section above and one below the channel region, and the switching device is one of a bottom-gate second thin-film transistor, a bottom-gate second thin-film transistor and a dual-gate second thin-film transistor.

11. An electrooptical device according to claim 10, wherein the gate electrode formed below the channel region comprises a heat resistant material.

12. An electrooptical device according to claim 10, wherein thin-film transistors in the peripheral-driving-circuit section and the display section constitute n-channel, p-channel or complementary insulating-gate field-effect transistors.

13. An electrooptical device according to claim 12. wherein the thin-film transistor in the peripheral-driving-circuit section comprises a combination of a complementary type and an n-channel type, a complementary type and a p-channel type, or a complementary type, an n-channel type and a p-channel type.

14. An electrooptical device according to claim 10, wherein at least a part of the thin-film transistors in the peripheral-driving-circuit section and the display section has a lightly-doped drain (LDD) structure.

15. An electrooptical device according to claim 10, wherein the step is formed on said one surface of the first substrate, a single-crystal, polycrystalline or amorphous silicon layer is formed on the surface having the step, the single-crystal, polycrystalline or amorphous silicon layer serves as a channel region, a source region and a drain region of the second thin-film transistor, and at least one gate section is provided above and/or below the channel region.

16. An electrooptical device according to claim 15, wherein the step forms an indented section having a cross-section in which a side face is perpendicular to or slanted to the bottom face, and the step functions as a seed for graphoepitaxy of the single-crystal silicon layer.

17. An electrooptical device according to claim 15, wherein source or drain electrodes of the first and/or second thin-film transistors are formed In a region including the step.

18. An electrooptical device according to claim 15, wherein the step is formed on at least one of the first substrate and a film formed on the first substrate, and the second thin-film transistor is formed on at least one of the interior and the exterior of the indented section formed by the step.

19. An electrooptical device according to claim 15, wherein at least one of the type and the concentration of a Group III or V impurity in the single-crystal, polycrystalline or amorphous silicon layer is controlled.

20. An electrooptical device according to claim 15, wherein the step is formed along at least one side of a device region including the channel region, the source region and the drain region of the second thin-film transistor.

21. An electrooptical device according to claim 15, wherein a gate electrode below the single-crystal, polycrystalline or amorphous silicon layer is trapezoidal at the side end section.

22. An electrooptical device according to claim 15, wherein a diffusion-barrier layer is provided between the first substrate and the single-crystal, polycrystalliene or amorphous silicon layer.

23. An electrooptical device according to claim 10, wherein thin-film transistors in the peripheral-driving-circuit section and/or the display section have a multi-gate configuration, and at least two branched gate electrodes having the same potential or at least two divided gate electrodes having the same potential or different potentials are provided in the channel region.

24. An electrooptical device according to claim 10, wherein n- or p-type thin-film transistors in the peripheral-driving-circuit section and/or the display section are the dual-gate type, and one of the upper and lower-gate electrodes is electrically open, or a given voltage is applied so that the dual-gate type thin-film transistors operate as bottom- or top-gate type thin-film transistors.

25. An electrooptical device according to claim 10, wherein the thin-film transistor in the peripheral-driving-circuit section is one of the n-channel, p-channel and complementary first thin-film transistors, and the thin-film transistor in the display section is an n-channel, p-channel or complementary type when the channel region is a single-crystal silicon layer, a polycrystalline silicon layer, or an amorphous silicon layer.

26. An electrooptical device according to claim 1, wherein the first substrate comprises one of a glass substrate and a heat-resistant organic material.

27. An electrooptical device according to claim 1, wherein the first substrate is optically opaque or transparent.

28. An electrooptical device according to claim 1, wherein the pixel electrodes are provided for a reflective or transmissive display.

29. An electrooptical device according to claim 1, wherein the display section has a laminated configuration of the pixel electrodes and a color filter layer.

30. An electrooptical device according to claim 1, wherein unevenness is formed on a resin film and the pixel electrodes are formed thereon when the pixel electrodes are reflective electrodes, or the surface is planarized by a transparent planarization film and the pixel electrodes are formed on the planarized plane when the pixel electrodes are transparent electrodes.

31. An electrooptical device according to claim 9, wherein the display section is illuminated or dimmed by driving the switching device.

32. An electrooptical device according to claim 9, wherein a plurality of the pixel electrodes are arranged in a matrix in the display section and the switching device is connected to each of the plurality of pixel electrodes.

33. An electrooptical device according to claim 1, wherein the display section comprises one of a liquid crystal display, an electroluminescent display, a field emission display, a light-emitting polymer display and a light-emitting diode display.

34. A driving substrate for an electrooptical device comprising:
- a display section provided with pixel electrodes: and
- a peripheral-driving-circuit section provided on the periphery of the display section;
- wherein a gate section comprising a gate electrode and a gate-insulating film is formed on one surface of the driving substrate and a step is formed on said one surface of the substrate;
- a single-crystal silicon layer is formed on the surface including the step, and the single-crystal silicon layer constitutes a channel region, a source region and a drain region; and
- a bottom-gate first thin-film transistor having the gate section below the channel region constitutes at least a part of the peripheral-driving-circuit section.

* * * * *